US012664244B1

(12) United States Patent
Jain

(10) Patent No.: US 12,664,244 B1
(45) Date of Patent: Jun. 23, 2026

(54) BIOMETRIC RECOGNITION AND TRANSACTION ENGINE APPARATUSES, PROCESSES AND SYSTEMS

(71) Applicant: Payfave Inc., Plano, TX (US)

(72) Inventor: Deepak Jain, Murphy, TX (US)

(73) Assignee: Wink Inc., Plano, TX (US)

( * ) Notice: Subject to any disclaimer, the term of this patent is extended or adjusted under 35 U.S.C. 154(b) by 0 days.

(21) Appl. No.: 18/645,331

(22) Filed: Apr. 24, 2024

Related U.S. Application Data

(63) Continuation-in-part of application No. 17/853,897, filed on Jun. 29, 2022, now abandoned.

(60) Provisional application No. 63/297,203, filed on Jan. 6, 2022, provisional application No. 63/217,711, filed on Jul. 1, 2021.

(51) Int. Cl.
　　*G06F 21/00* 　　(2013.01)
　　*G06F 21/32* 　　(2013.01)

(52) U.S. Cl.
　　CPC ..................................... *G06F 21/32* (2013.01)

(58) Field of Classification Search
　　CPC ....................................................... G06F 21/32
　　See application file for complete search history.

(56) References Cited

U.S. PATENT DOCUMENTS

| | | | | |
|---|---|---|---|---|
| 10,019,561 | B1 * | 7/2018 | Shelton | ................... G10L 17/00 |
| 2013/0066749 | A1 | 3/2013 | Cooke | |
| 2013/0174237 | A1 * | 7/2013 | Zises | ................... H04L 67/1095 |
| | | | | 709/217 |
| 2014/0120981 | A1 | 5/2014 | King | |
| 2014/0168716 | A1 | 6/2014 | King | |
| 2016/0162893 | A1 * | 6/2016 | Kamal | ................... G06Q 20/34 |
| | | | | 705/44 |
| 2019/0050865 | A1 * | 2/2019 | Sheets | ..................... G06F 21/83 |
| 2019/0098004 | A1 * | 3/2019 | Mars | ..................... H04W 12/06 |
| 2019/0147434 | A1 * | 5/2019 | Leung | ................. H04L 63/0861 |
| | | | | 705/41 |
| 2020/0387904 | A1 * | 12/2020 | Gosalia | .............. H04L 63/0428 |

* cited by examiner

*Primary Examiner* — William A Corum, Jr.
(74) *Attorney, Agent, or Firm* — Hanchuk Kheit LLP.; Walter G. Hanchuk

(57) ABSTRACT

The Biometric Recognition and Transaction Engine Apparatuses, Processes and Systems ("BRTE") transforms enrollment input, authentication input datastructure/inputs via BRTE components into enrollment output, authentication output outputs. A device identifying datastructure associated with a user's device is obtained. A device search is executed on a device graph database to determine a device record corresponding to the device and a device token is retrieved. A user identifying media datastructure structured as a media stream is obtained. A face print datastructure and a voice print datastructure are generated. A user seed identifying datastructure is obtained and analyzed to determine a user token. A set of face token records and a set of voice token records linked with the user token are determined. A face match score and a voice match score are determined and analyzed to authenticate the user. A login token indicating successful authentication is generated and provided for the device.

22 Claims, 26 Drawing Sheets

BRTE ARCHITECTURE

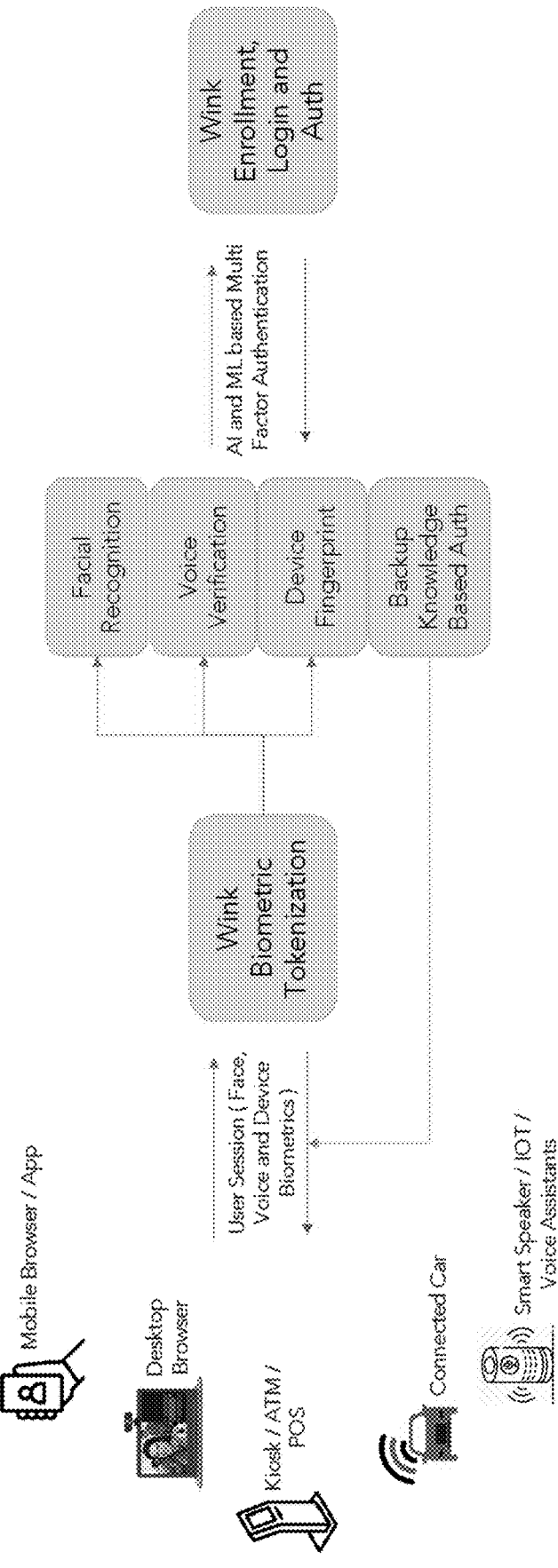
FIGURE 1: BRTE ARCHITECTURE

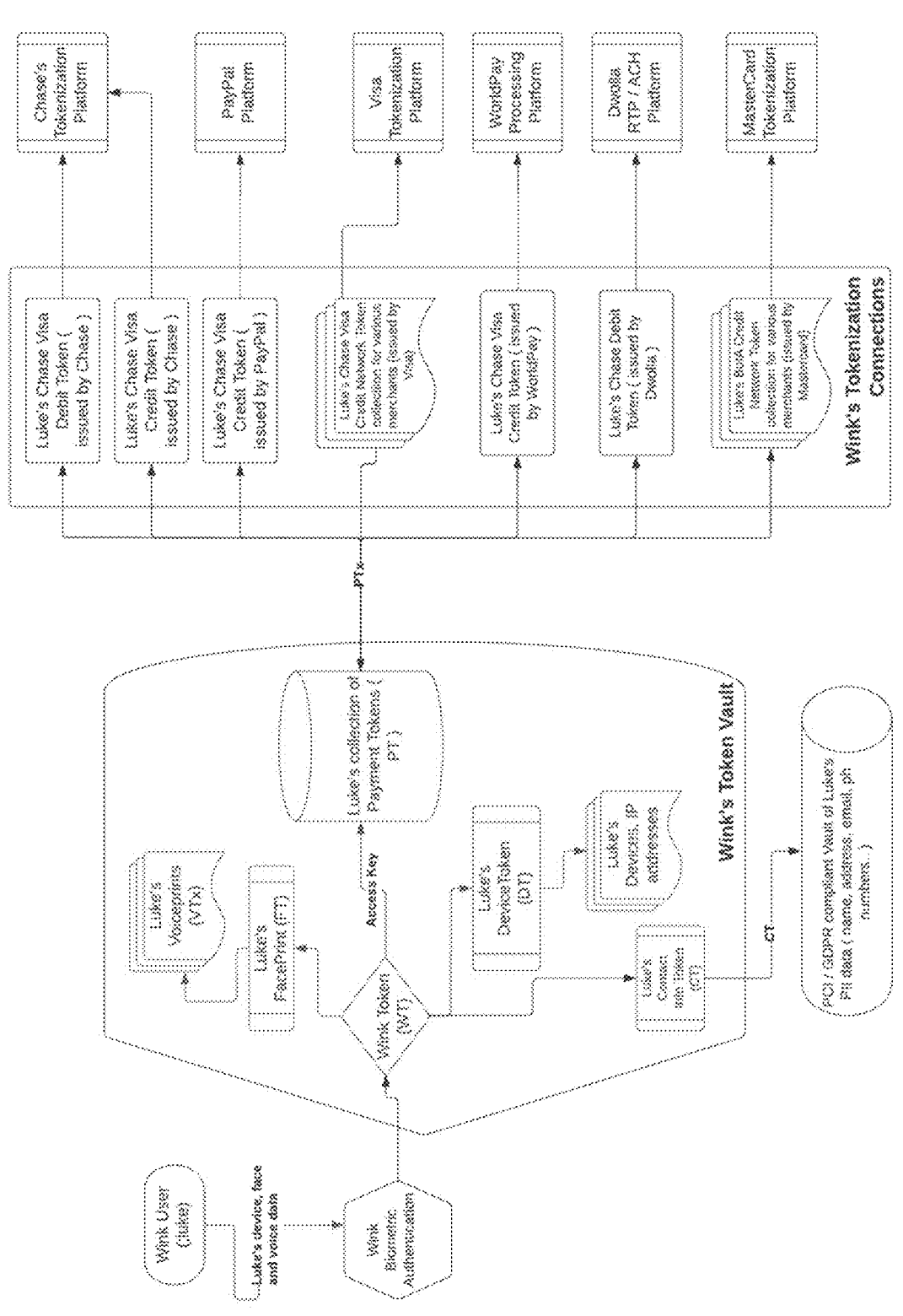
FIGURE 2: BRTE ARCHITECTURE

FIGURE 3: BRTE ARCHITECTURE
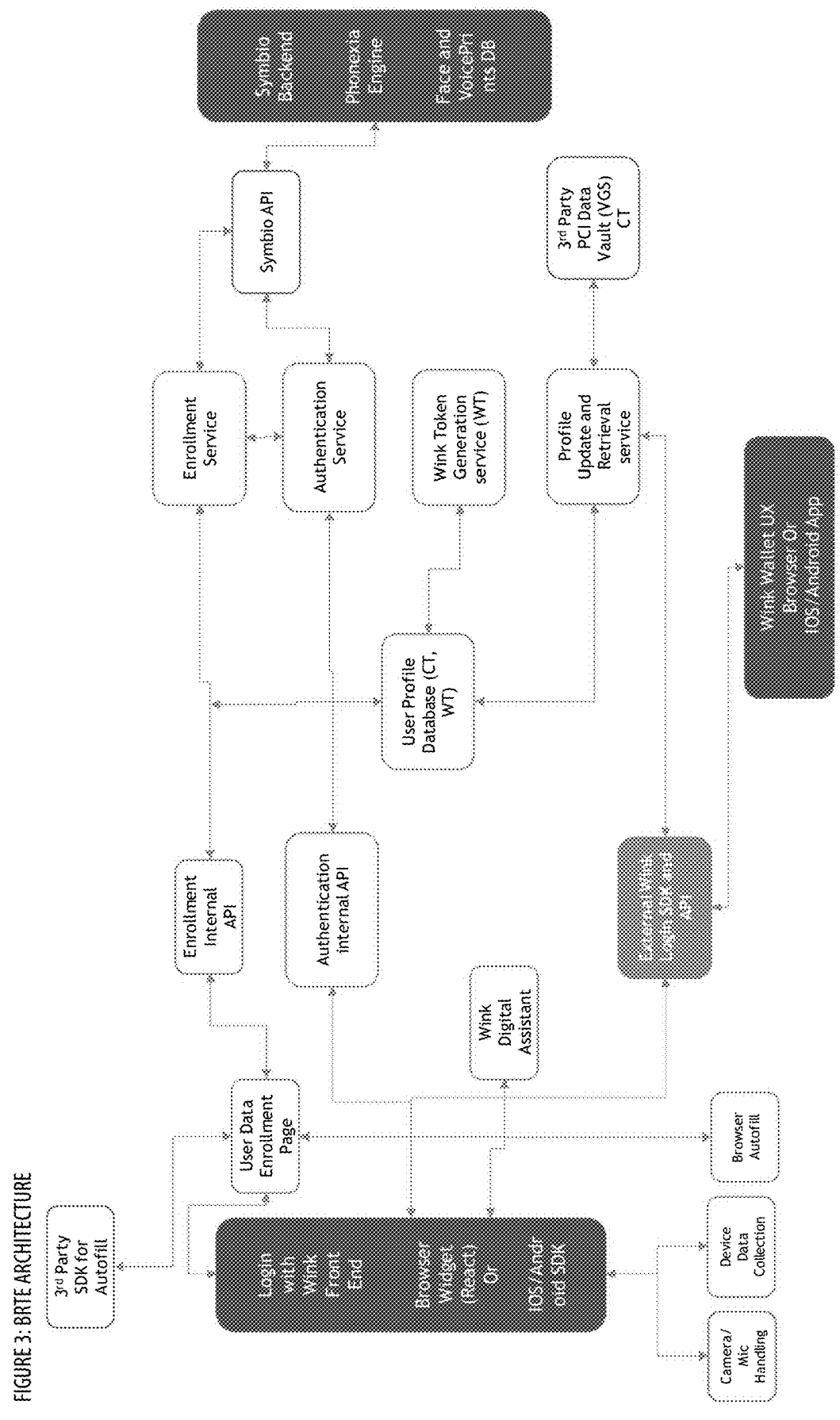

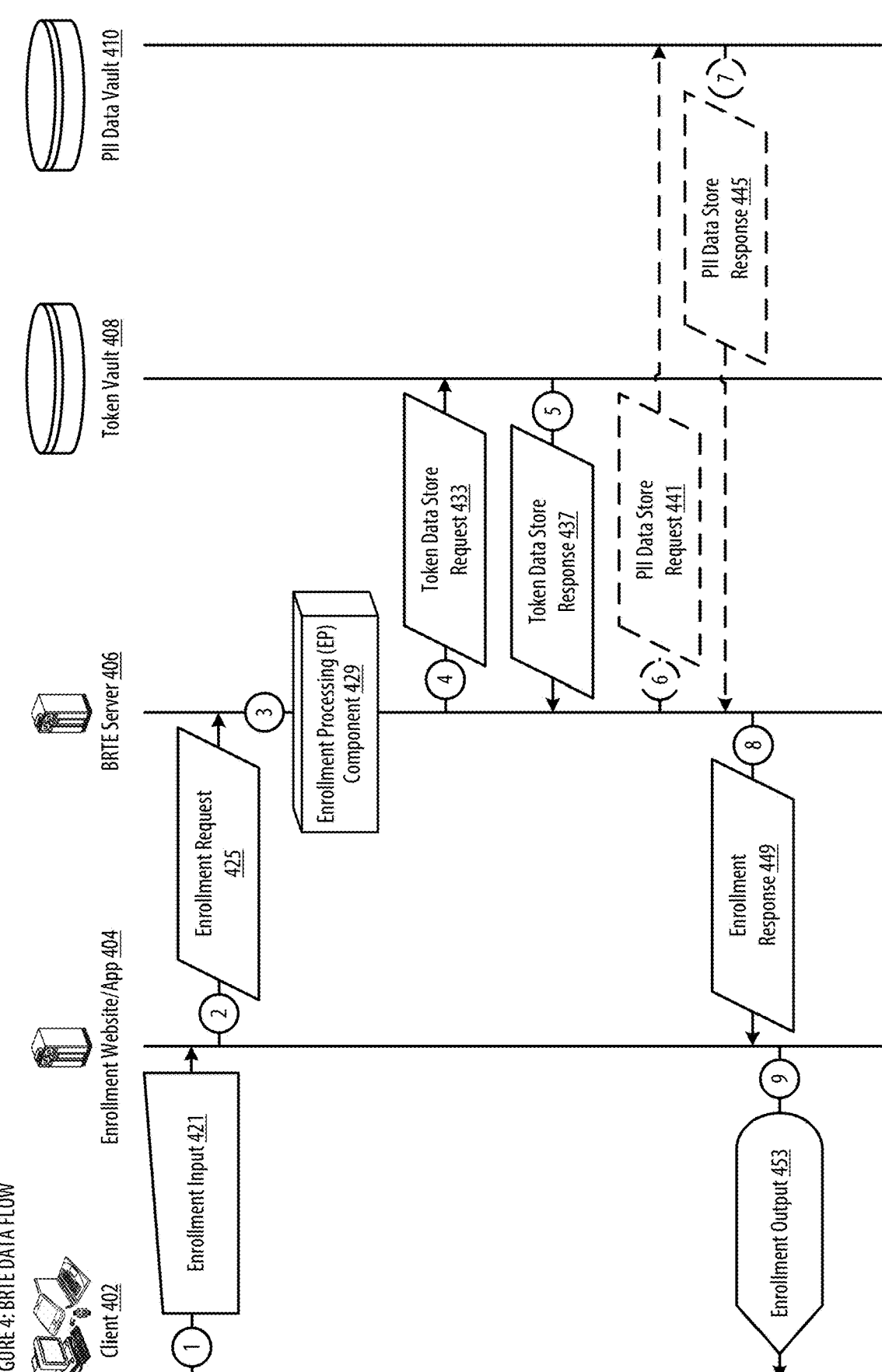
FIGURE 4: BRTE DATA FLOW

Figure 5:
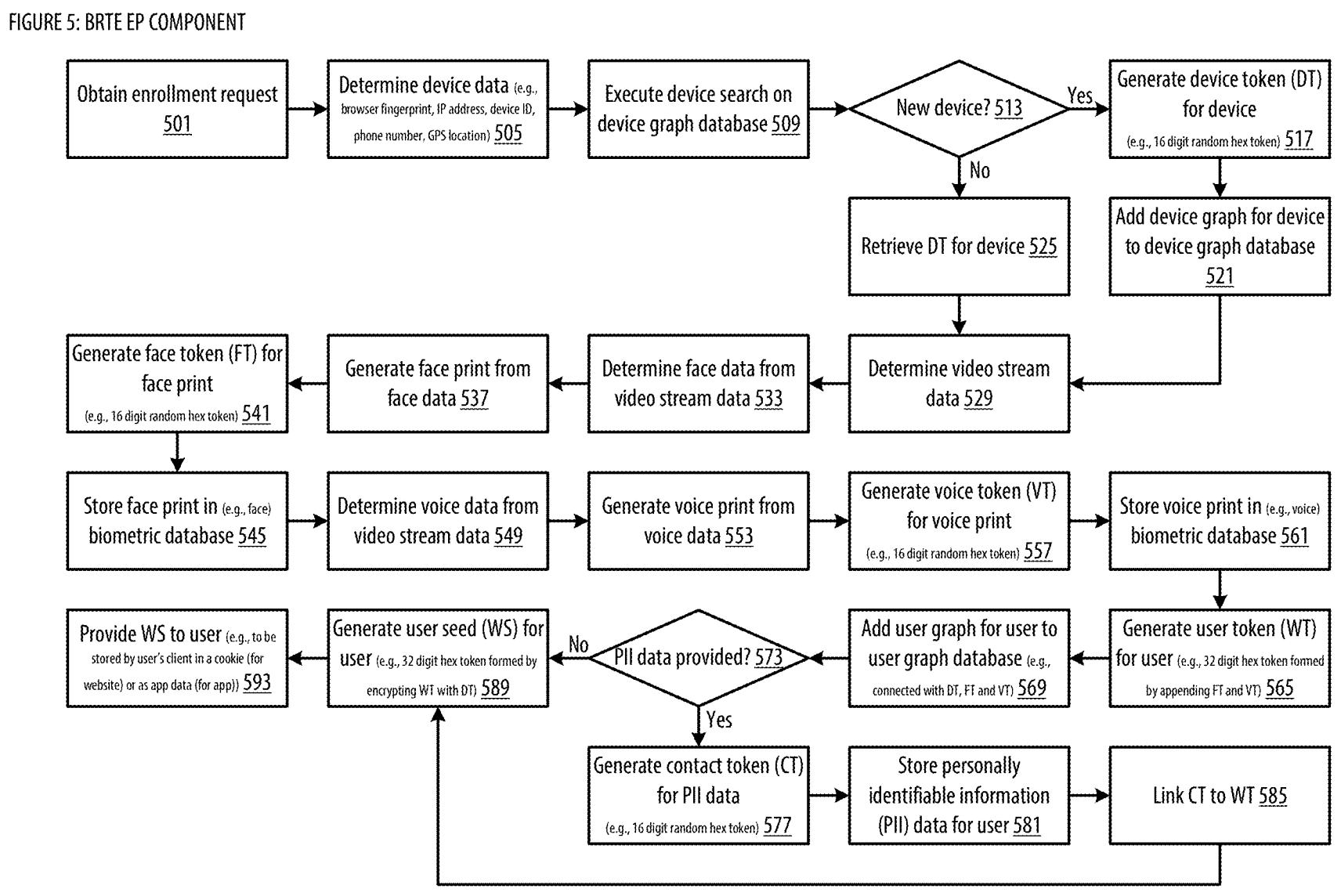

FIGURE 5: BRTE EP COMPONENT

Obtain enrollment request 501

Determine device data (e.g., browser fingerprint, IP address, device ID, phone number, GPS location) 505

Execute device search on device graph database 509

New device? 513

Yes → Generate device token (DT) for device (e.g., 16 digit random hex token) 517

Add device graph for device to device graph database 521

No → Retrieve DT for device 525

Determine video stream data 529

Determine face data from video stream data 533

Generate face print from face data 537

Generate face token (FT) for face print (e.g., 16 digit random hex token) 541

Store face print in (e.g., face) biometric database 545

Determine voice data from video stream data 549

Generate voice print from voice data 553

Generate voice token (VT) for voice print (e.g., 16 digit random hex token) 557

Store voice print in (e.g., voice) biometric database 561

Generate user token (WT) for user (e.g., 32 digit hex token formed by appending FT and VT) 565

Add user graph for user to user graph database (e.g., connected with DT, FT and VT) 569

PII data provided? 573

No → Generate user seed (WS) for user (e.g., 32 digit hex token formed by encrypting WT with DT) 589

Yes → Generate contact token (CT) for PII data (e.g., 16 digit random hex token) 577

Store personally identifiable information (PII) data for user 581

Link CT to WT 585

Provide WS to user (e.g., to be stored by user's client in a cookie (for website) or as app data (for app)) 593

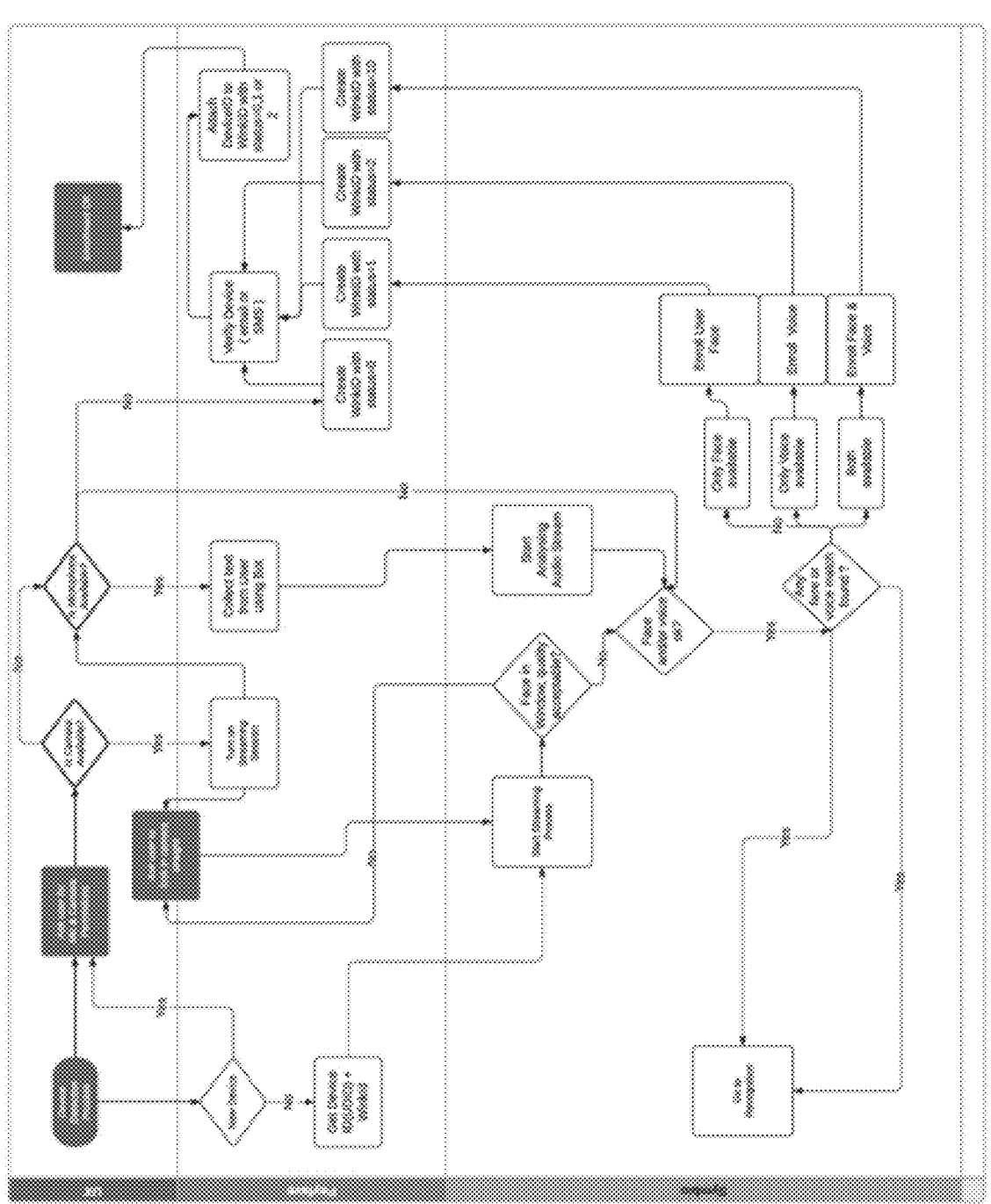
FIGURE 6: BRTE IMPLEMENTATION CASE

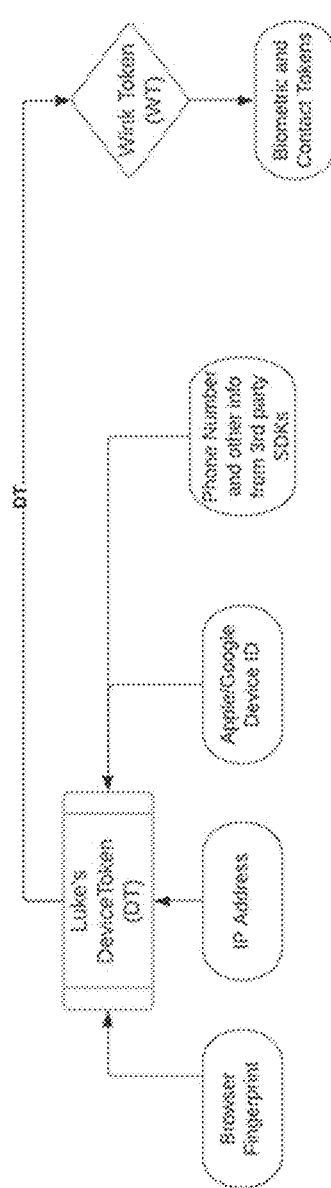
FIGURE 7: BRTE IMPLEMENTATION CASE

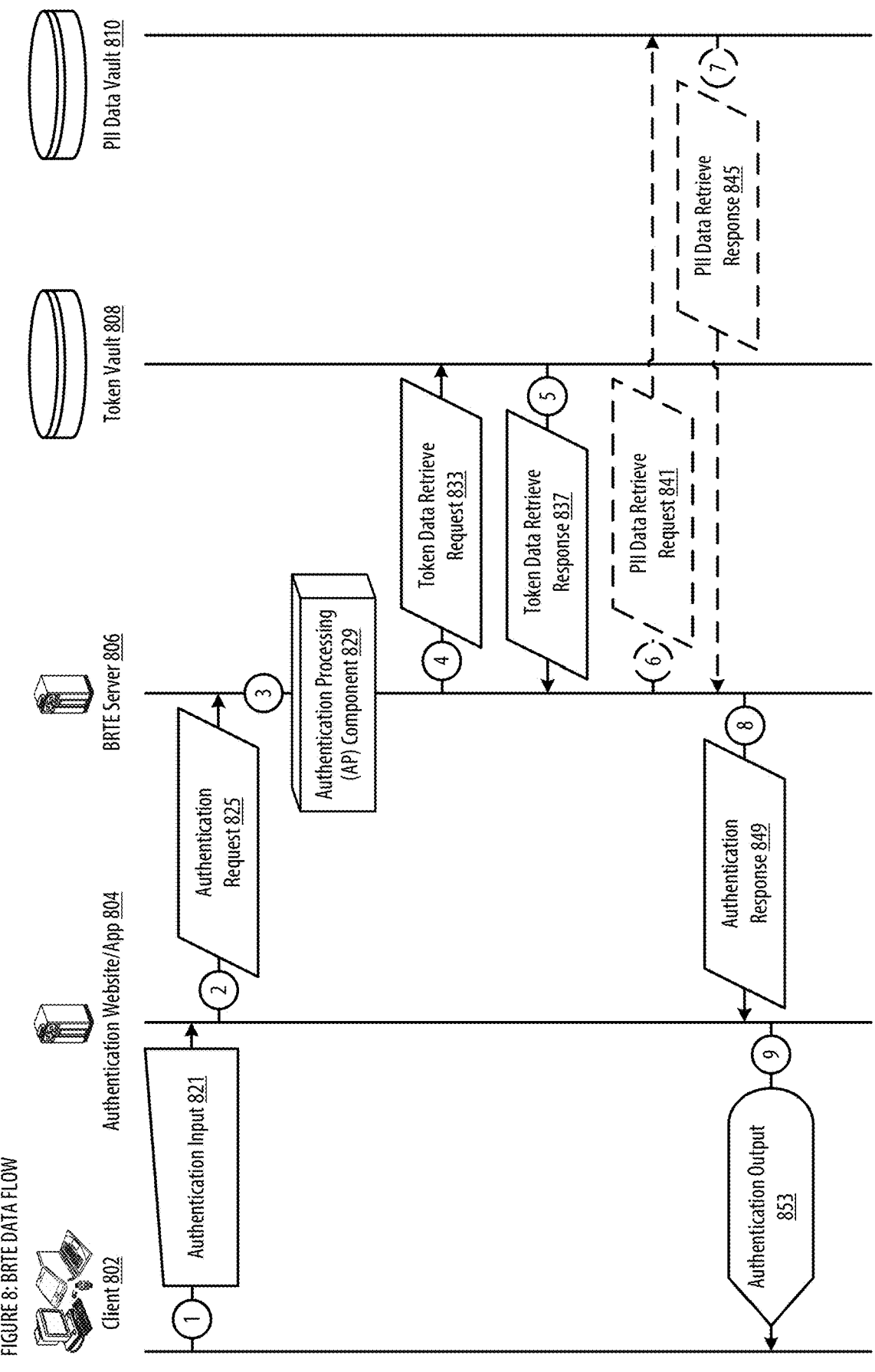
FIGURE 8: BRTE DATA FLOW

FIGURE 9A: BRTE AP COMPONENT
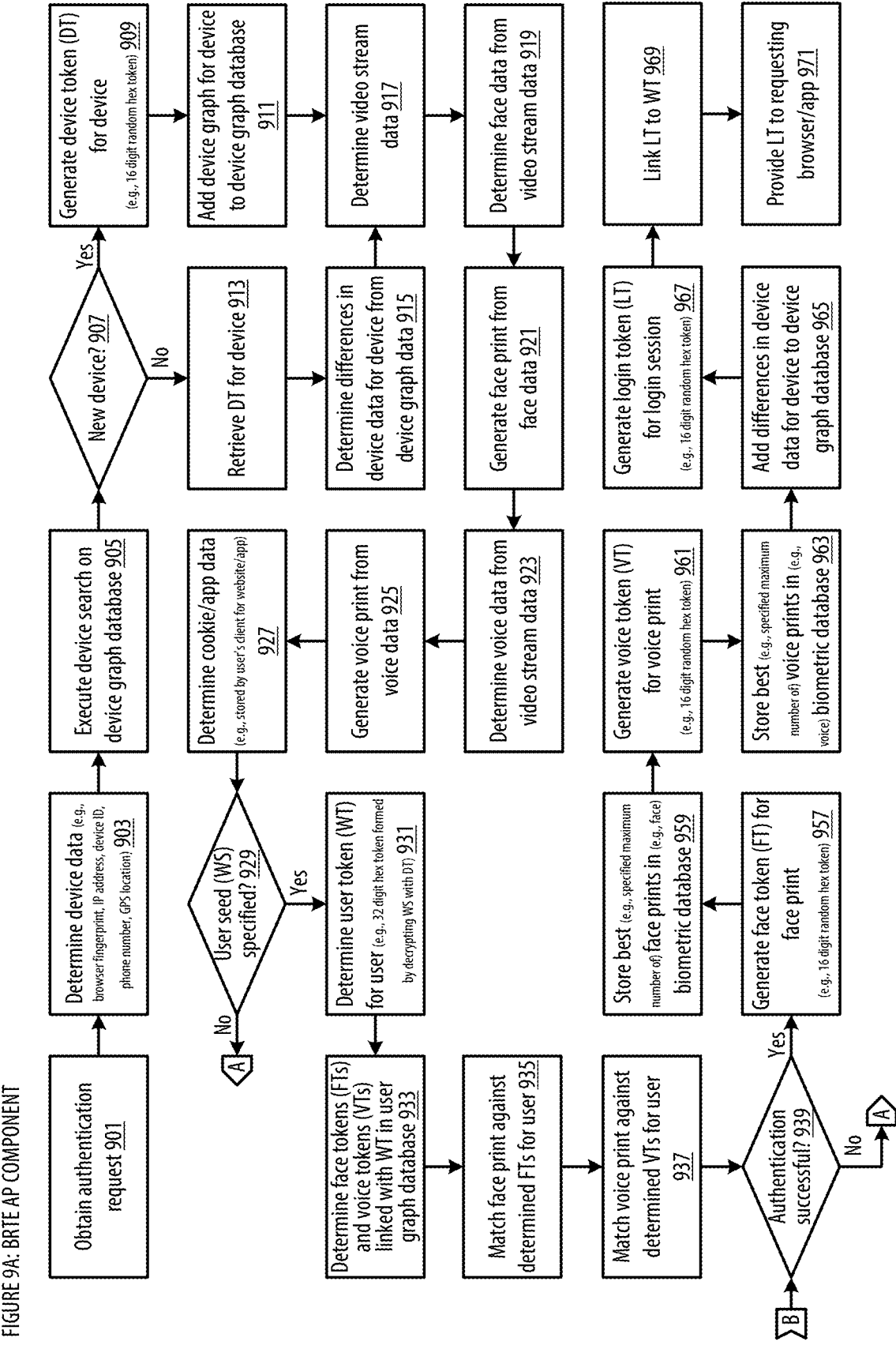

FIGURE 9B: BRTE AP COMPONENT
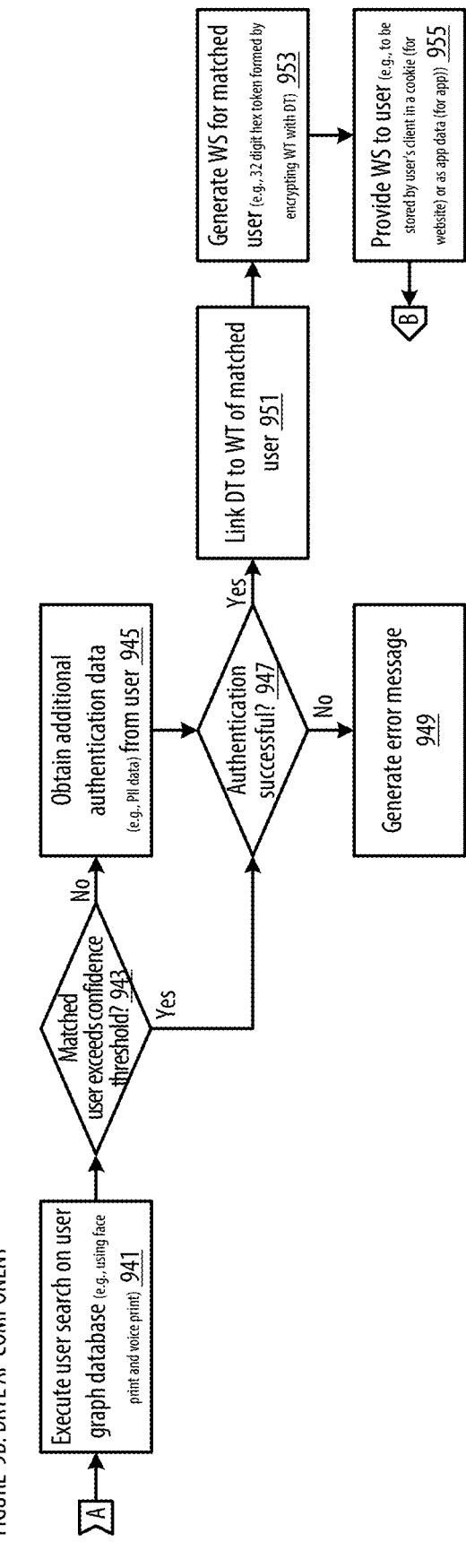

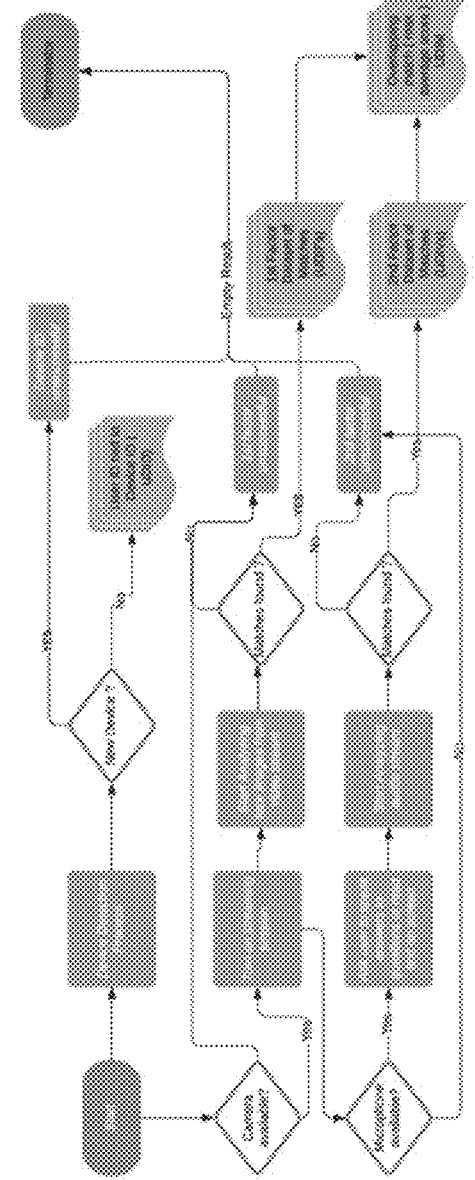
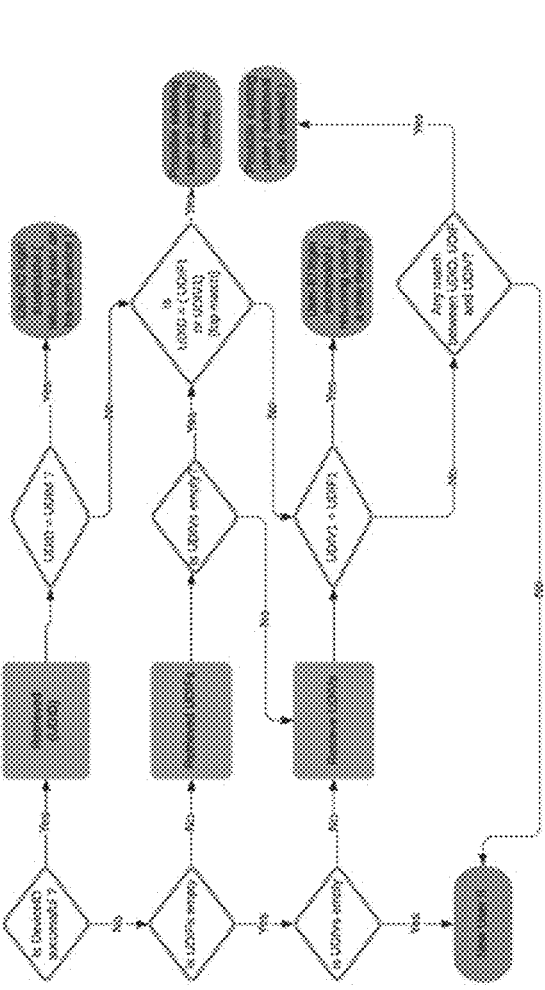
FIGURE 10: BRTE IMPLEMENTATION CASE

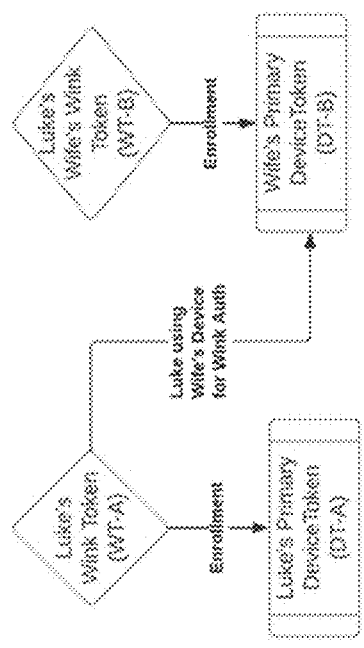
FIGURE 11: BRTE IMPLEMENTATION CASE

FIGURE 12: BRTE IMPLEMENTATION CASE

| Additional Auth Type | | |
|---|---|---|
| Type 1 | AVS | User needs to enter street number and zip code of the address |
| Type 2 | CVV or PayPal login | User needs to re-authenticate payment method by entering CVV code or PayPal pasword |
| Type 3 | 1 Secret Answer | User needs to provide answer to 1 one of the 3 secret QA set during enrollment |
| Type 4 | Strong OTP to phone | User sent a link to registered phone, user clicks link which uses Prove to verify user has phone in his possession |
| Type 5 | Strong Auth | 3rd party SDK like Threatmetrix or Sardine.AI |

| Wink Login Table | Device | Face | Voice | Additional Auth Needed : Auth for login | |
|---|---|---|---|---|---|
| Green | No | >90% | DNC | No | |
| Orange | No | >90% | 50-90% | Yes | Type 3 or higher |
| Orange | Yes | 50-90% | >90% | Yes | Type 3 or higher |
| Yellow | No | 50-90% | >90% | Yes | Type 4 or higher |
| Yellow | No | >90% | <50% | Yes | Type 4 or higher |
| Yellow | Yes | <50% | >90% | Yes | Type 3 or higher |
| Red | Yes | <50% | <50% | Login failed, go to enrollment for new user | |
| Red | No | <50% | <50% | Login failed, go to enrollment for new user | |
| Red | No | 50-90% | <50% | Login failed, go to enrollment for new user | |
| Red | No | <50% | 50-90% | Login failed, go to enrollment for new user | |
| Special Case | No | <50% | >90% | Try to redo face by asking user to adjust | If face does not >90% treat as Yellow |
| Speical Case | Yes | 50-90% | 50-90% | Try to redo face by asking user to adjust | If face does not >90% treat as Yellow |
| Speical Case | Yes | 50-90% | <50% | Try to redo face by asking user to adjust | If face does not >90% treat as Red |
| Speical Case | Yes | <50% | 50-90% | Try to redo face by asking user to adjust | If face does not >90% treat as Red |
| Speical Case | No | 50-90% | 50-90% | Try to redo face by asking user to adjust | If face does not >90% treat as Red |

| Wink Payment Table | Wink Login successful | Additional Auth Needed for Payment | Auth Type |
|---|---|---|---|
| Happy | Green | No | |
| Orange | Orange | No | |
| Yellow | Yellow | Yes | Type 1 and 2 |
| Red | Red | Not allowed | |

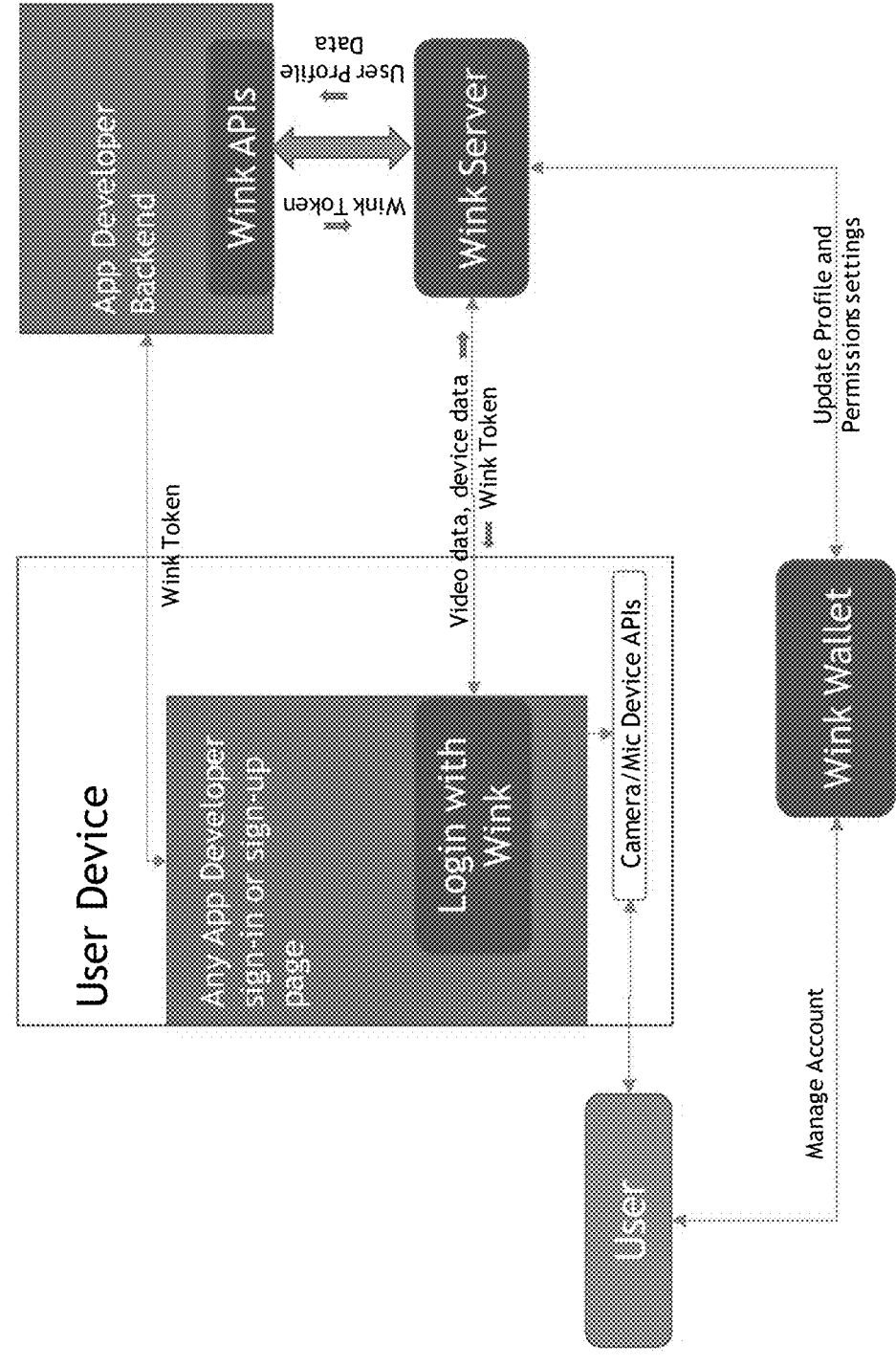
FIGURE 13: BRTE IMPLEMENTATION CASE

FIGURE 14: BRTE IMPLEMENTATION CASE
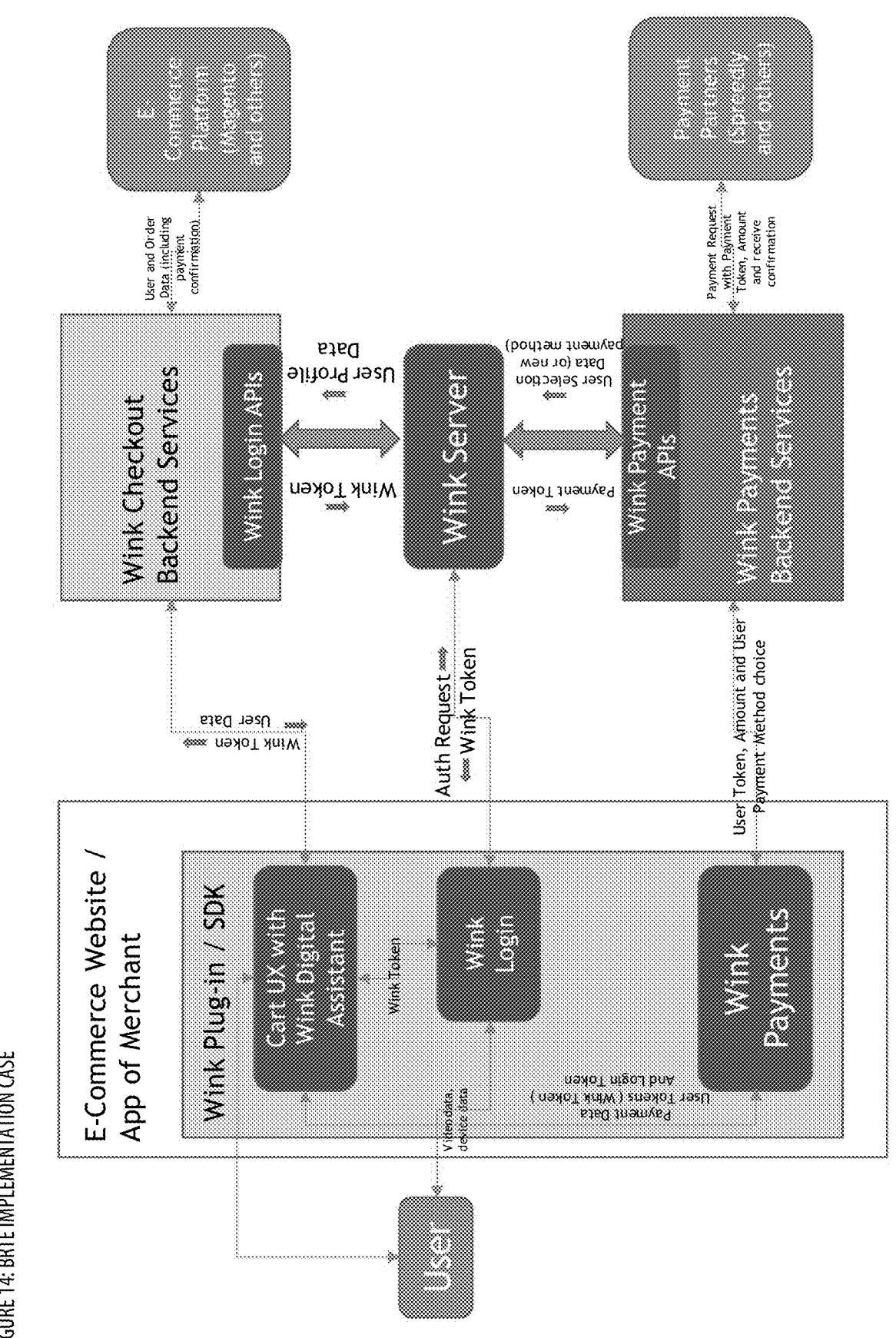

FIGURE 15A: BRTE SCREENSHOT
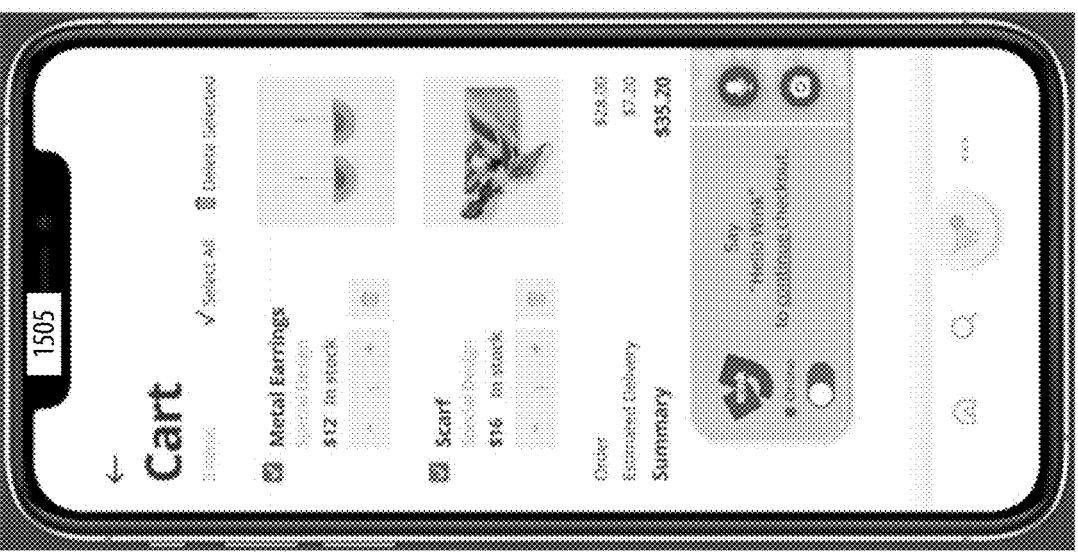
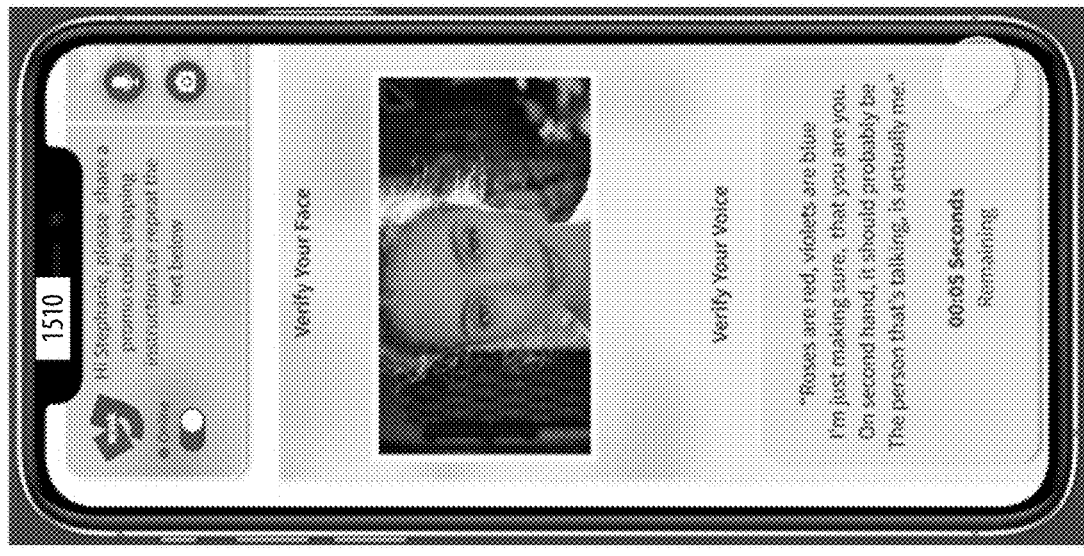
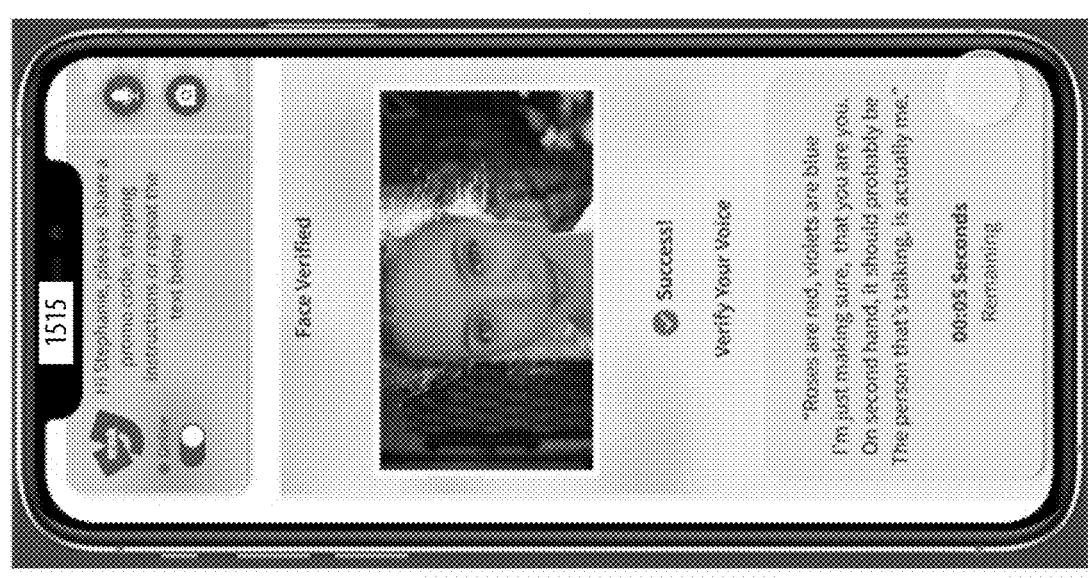

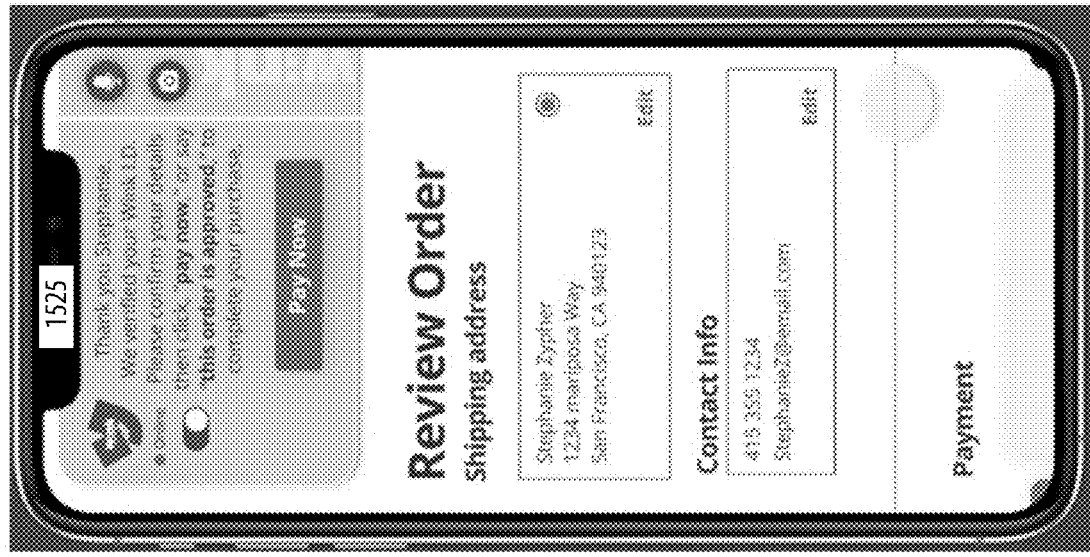
FIGURE 15B: BRTE SCREENSHOT
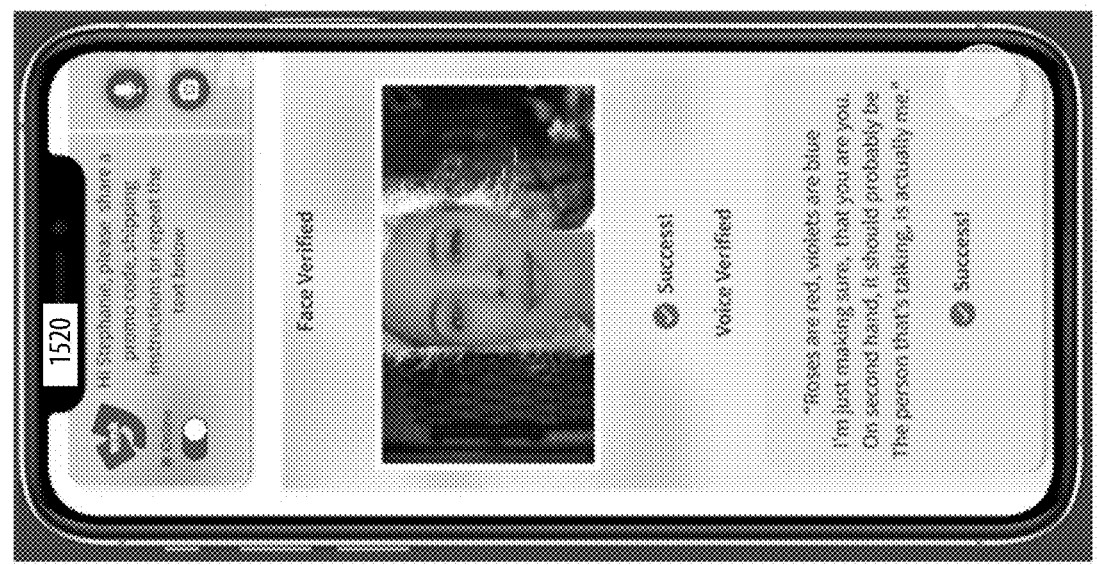

FIGURE 15C: BRTE SCREENSHOT
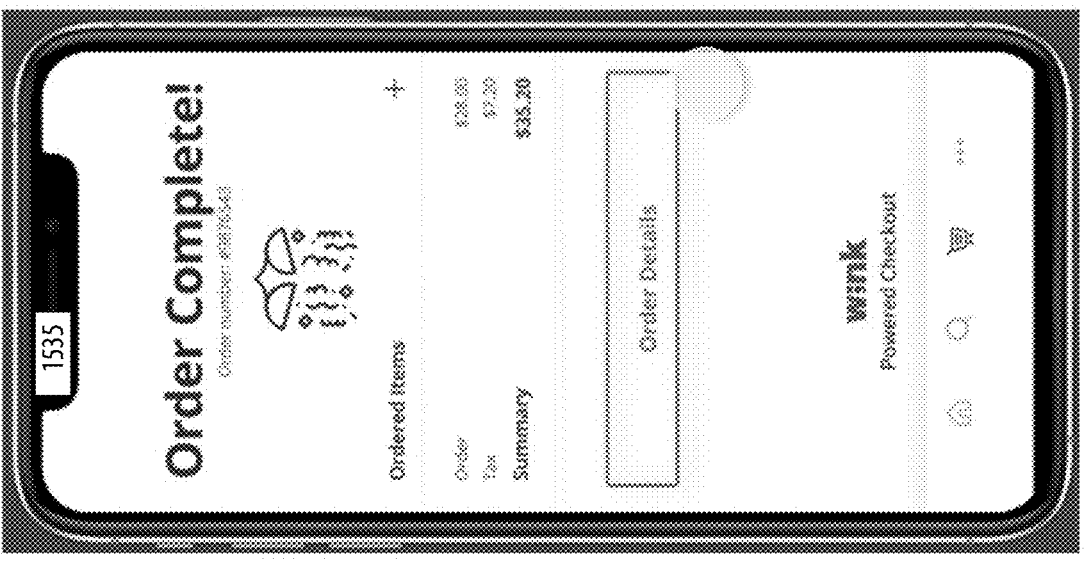

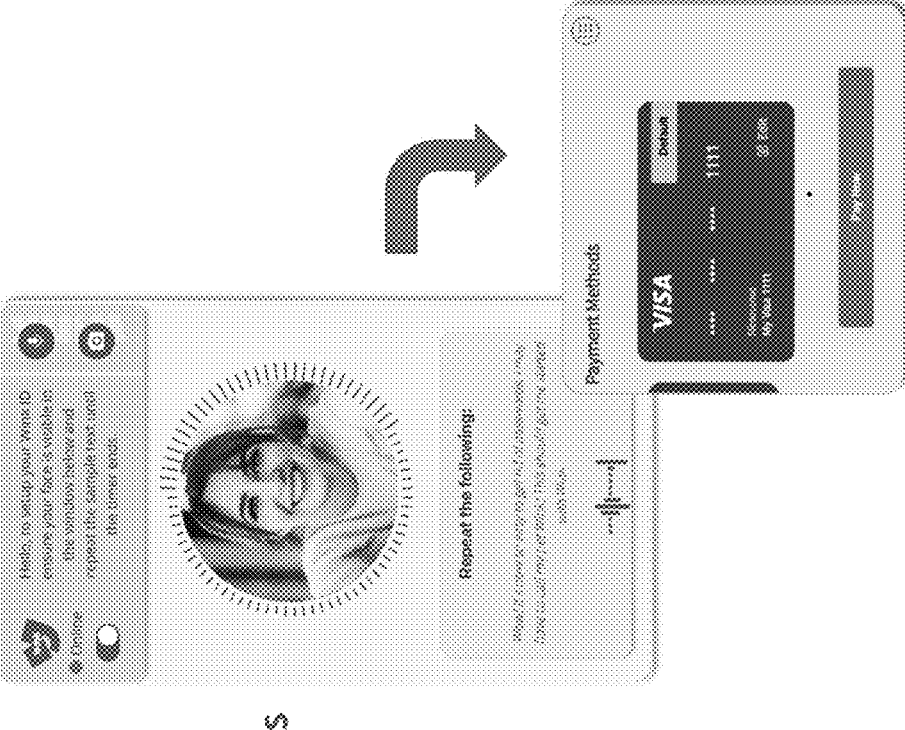

FIGURE 16A: BRTE IMPLEMENTATION CASE wink | Payment

Handsfree Payments On Camera Enabled Devices

- Integrated With Authentication Via Wink Login
- Visa, MC, Amex, Discover tokenized debit/credit cards
- PCI Compliant Payment Infrastructure & Service
- Includes Card Tokenization And Vaulting
- Over 200 Payment Gateways/PSPs Supported
- Route Tokenized Payment Transaction For Processing

Alternative Implementation Cases

- PayPal, Apple/Google/Amazon Pay, FedNow/A2A, BNPL
- Payment Orchestration to multiple PGs per merchant

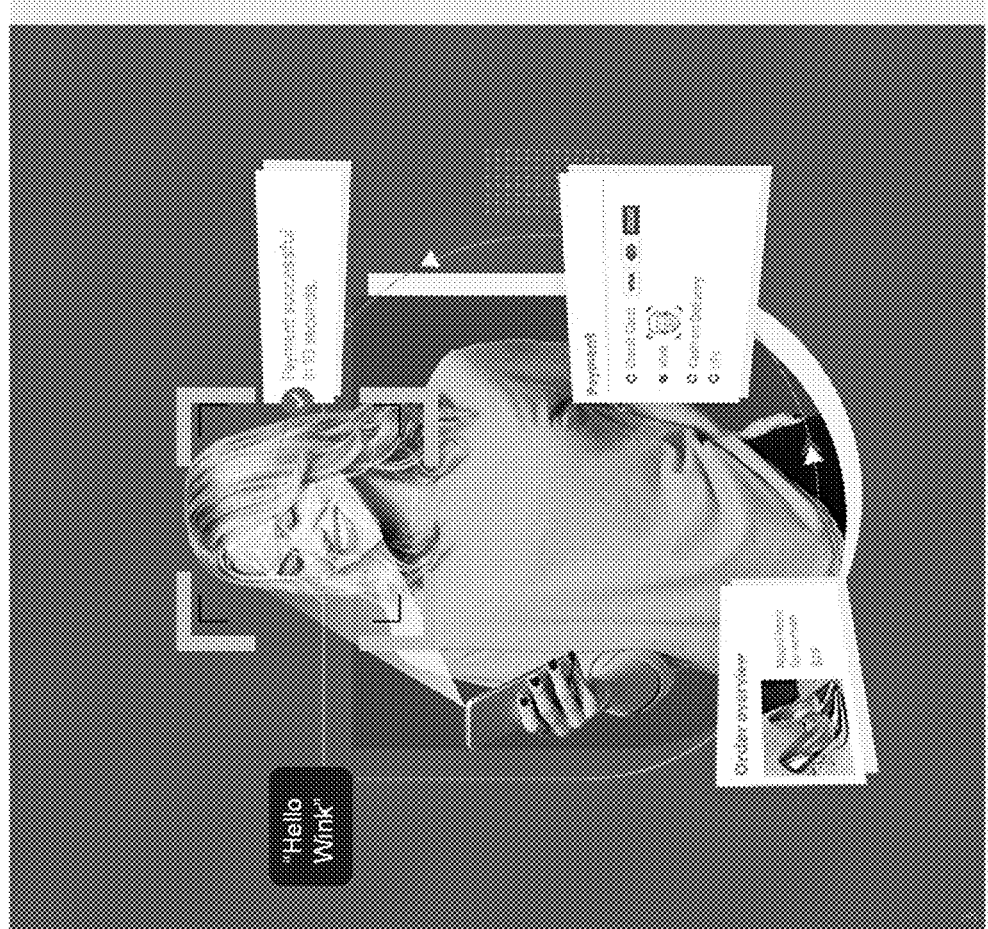
FIGURE 16B: BRTE IMPLEMENTATION CASE

Figure 16C:
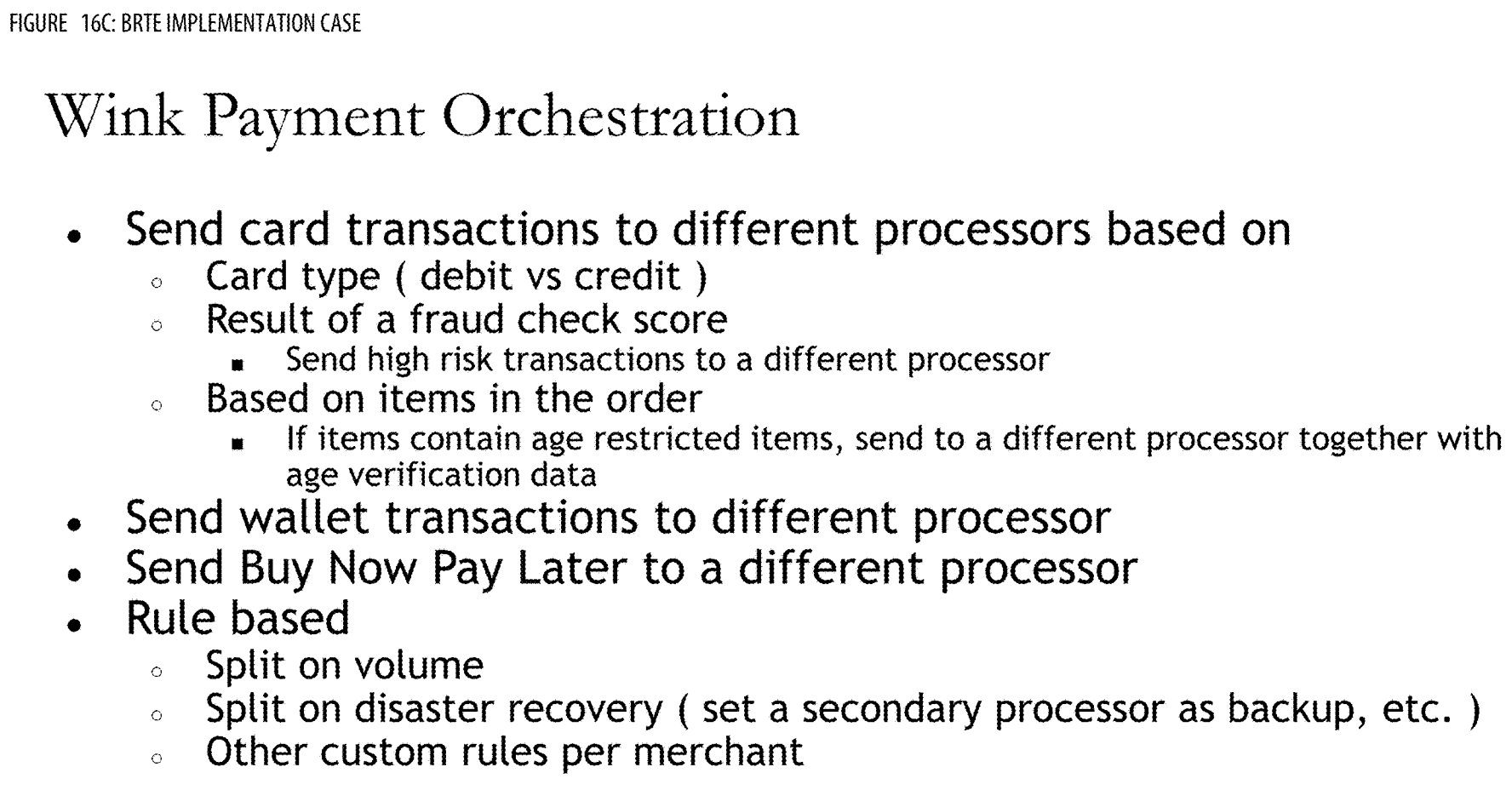

FIGURE 16C: BRITE IMPLEMENTATION CASE

Wink Payment Orchestration

- Send card transactions to different processors based on
  - Card type ( debit vs credit )
  - Result of a fraud check score
    - Send high risk transactions to a different processor
  - Based on items in the order
    - If items contain age restricted items, send to a different processor together with age verification data
- Send wallet transactions to different processor
- Send Buy Now Pay Later to a different processor
- Rule based
  - Split on volume
  - Split on disaster recovery ( set a secondary processor as backup, etc. )
  - Other custom rules per merchant

FIGURE 17A: BRTE IMPLEMENTATION CASE

Wink Biometric Tokenization and Enrollment

Incoming video and device data

Extract Images, Audio and Device Data

Facial Quality and Liveness Check

Device Fingerprinting and Fraud Check

Speech Quality and Liveness check

Anonymous face vectors added to FaceAI Model (on FaceNode )

Vectorization into 30 facial vectors, original image deleted

Device Data added to Device Database on MainNode

VoicePrint Generation, Original audio deleted

Anonymous VoicePrint Added to VoiceAI model ( on VoiceNode )

User Face Token (FT) assigned, pointing to face vectors

User Device Token (DT) assigned pointing to device data

User Voice Token (VT) assigned pointing to VoicePrint

Unique WinkID assigned, mapped to FT, VT and DT (in Token Vault)

Patented and Copyrighted NDA Share

FIGURE 17B: BRITE IMPLEMENTATION CASE

Notes on Biometric Enrollment

- ## Zero Knowledge
  - Wink has no knowledge of user's actual face or voice data

- ## Decentralized
  - FaceNode, VoiceNode, MainNode and Token Vault are separated under NDA
  - Each Node is anonymous
    - Looking into data contained inside FaceNode or VoiceNode will just reveal anonymous vector files and tokens without any information on how they are linked to any specific Wink user

- ## Partial and Continuous Enrollment
  - Each Node is independent of each other.
  - User enrollment can be done with 2 out of 3 factors, and the 3rd factor can be added later (partial enrollment)
  - User enrollment learns difference in the 3rd factor upon authentication by the other 2 factor ( Continuous enrollment )

FIGURE 17 C: BRTE IMPLEMENTATION CASE
Adding User PII to Biometric Enrollment
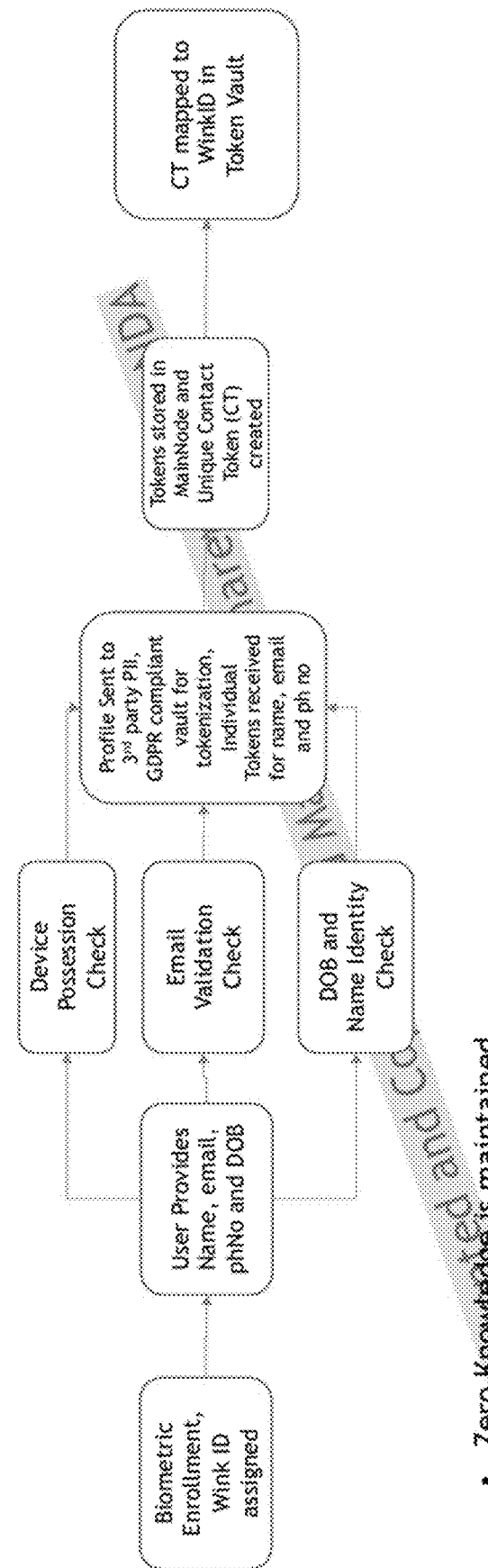

FIGURE 17D: BRTE IMPLEMENTATION CASE

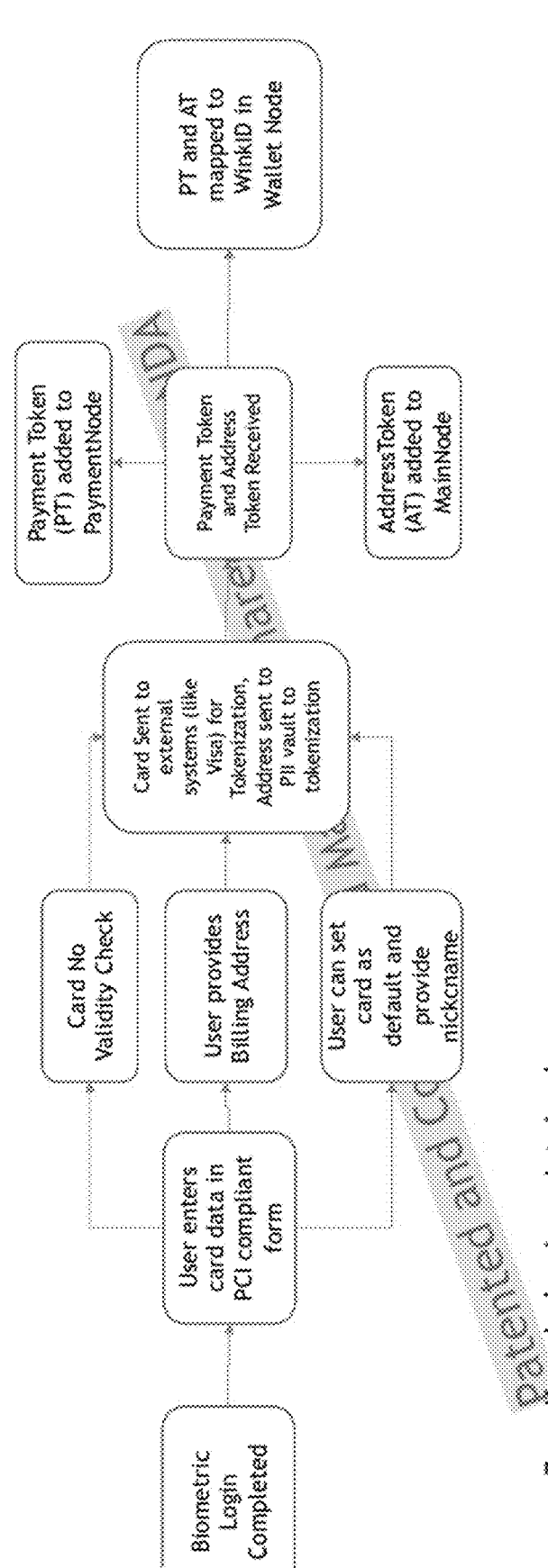

Adding Payment Methods to Biometric Enrollment

* Zero knowledge is maintained
  * Wink has no knowledge of user's clear card or address data
* Same process can apply to other payment methods such as PayPal
  * User provides PayPal username and password instead of card number for 1 time connection
  * PayPal token is stored as Payment Token FIGURE 18: BRTE Controller
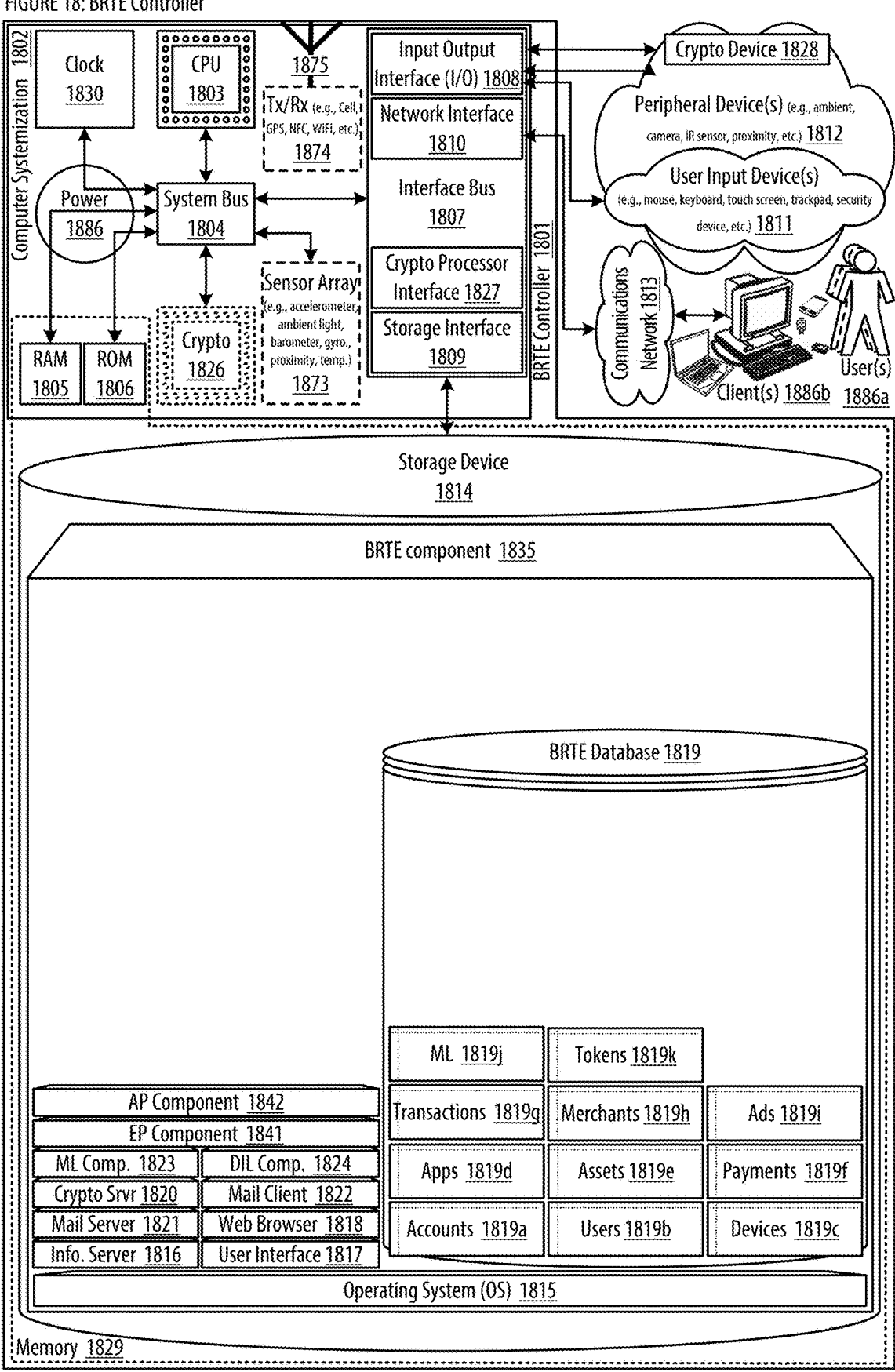

BIOMETRIC RECOGNITION AND TRANSACTION ENGINE APPARATUSES, PROCESSES AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 120 as a continuation-in-part of: U'S patent application Ser. No. 17/853,897, filed Jun. 29, 2022, entitled "Biometric Recognition and Transaction Engine Apparatuses, Processes and Systems"; and which in turn:

0002.1. claims benefit to priority under 35 USC § 119 as a non-provisional conversion of: U.S. provisional patent application Ser. No. 63/217,711, filed Jul. 1, 2021, entitled "Biometric Recognition and Transaction Engine Apparatuses, Processes and Systems".

0002.2. claims benefit to priority under 35 USC § 119 as a non-provisional conversion of: U.S. provisional patent application Ser. No. 63/297,203, filed Jan. 6, 2022, entitled "Biometric Recognition and Transaction Engine Apparatuses, Processes and Systems".

The entire contents of the aforementioned applications are herein expressly incorporated by reference.

FIELD

The present innovations generally address biometric recognition and cryptographic tokens, and more particularly, include Biometric Recognition and Transaction Engine Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Encryption technologies include digital certificates, which can use public key encryption technology to identify an owner of the digital certificate. Payment systems include credit card processing networks like American Express®, MasterCard®, Visa® and interconnect merchant payee's with credit card issuing banks for consumer transactions.

BRIEF DESCRIPTION OF THE DRAWINGS

Appendices and/or drawings illustrating various, non-limiting, example, innovative aspects of the Biometric Recognition and Transaction Engine Apparatuses, Processes and Systems (hereinafter "BRTE") disclosure, include:

FIG. 1 shows non-limiting, example embodiments of an architecture for the BRTE;

FIG. 2 shows non-limiting, example embodiments of an architecture for the BRTE;

FIG. 3 shows non-limiting, example embodiments of an architecture for the BRTE;

FIG. 4 shows non-limiting, example embodiments of a datagraph illustrating data flow(s) for the BRTE;

FIG. 5 shows non-limiting, example embodiments of a logic flow illustrating an enrollment processing (EP) component for the BRTE;

FIG. 6 shows non-limiting, example embodiments of implementation case(s) for the BRTE;

FIG. 7 shows non-limiting, example embodiments of implementation case(s) for the BRTE;

FIG. 8 shows non-limiting, example embodiments of a datagraph illustrating data flow(s) for the BRTE;

FIGS. 9A-B show non-limiting, example embodiments of a logic flow illustrating an authentication processing (AP) component for the BRTE;

FIG. 10 shows non-limiting, example embodiments of implementation case(s) for the BRTE;

FIG. 11 shows non-limiting, example embodiments of implementation case(s) for the BRTE;

FIG. 12 shows non-limiting, example embodiments of implementation case(s) for the BRTE;

FIG. 13 shows non-limiting, example embodiments of implementation case(s) for the BRTE;

FIG. 14 shows non-limiting, example embodiments of implementation case(s) for the BRTE;

FIGS. 15A-C show non-limiting, example embodiments of screenshots illustrating user interface(s) of the BRTE;

FIGS. 16A-C show non-limiting, example embodiments of implementation case(s) for the BRTE;

FIGS. 17A-D show non-limiting, example embodiments of implementation case(s) for the BRTE;

FIG. 18 shows a block diagram illustrating non-limiting, example embodiments of a BRTE controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Biometric Recognition and Transaction Engine Apparatuses, Processes and Systems (hereinafter "BRTE") transforms enrollment input, authentication input datastructure/inputs, via BRTE components (e.g., EP, AP, etc. components), into enrollment output, authentication output outputs. The BRTE components, in various embodiments, implement advantageous features as set forth below.

INTRODUCTION

The BRTE provides unconventional features that were never before available in biometric recognition and cryptographic tokens (e.g., a biometric transaction token apparatus, comprising at least one memory, a component collection stored in the at least one memory, at least one processor disposed in communication with the at least one memory, the at least one processor executing processor-executable instructions from the component collection, the component collection storage structured with processor-executable instructions, the instructions may include instructions to obtain, ria the at least one processor, a user identifying media datastructure, analyze the user identifying media datastructure, and recognize identifying objects from the analyzed user identifying media datastructure; the BRTE may then search for a match in a user biometric token database with the recognized identifying objects, recognize an identified user record from the search of the user biometric token database, obtain a payment mechanism token from the recognized identified user record based on the identifying gesture, and provide an identified payment transaction datastructure to a payment processor). In one embodiment, the BRTE may include components including: biometric tokenization, payment orchestration, fraud management, and connected device presence.

Biometric Tokenization

In one embodiment, the BRTE recognize a user by voice and other biometrics. For example, the user may use their voice to choose a the payment source for "use my Blue Amex". The BRTE may employ voice recognition for biometrics, and pull a network token for that payment source, e.g., an American Express Blue account. Then token may be supplied to merchant payment processor for a merchant transaction to be processed.

In one embodiment, the first time the BRTE is used, one might read out payment card number, expiration date, and use voice to name the card "my Blue Amex", and then the BRTE may create a biometric token for that payment source and it may be stored in the cloud and linked to original network card by, e.g., American Express. Later, American Express may recognize that token. The BRTE may perform translation between the biometric token the user provided to the network token American Express issued. In such an example embodiment, the transaction need not ever provide a card number to the merchant which may greatly reduce fraud. In such an example, the merchant would not see the card number, nor would anyone in the course of transaction.

In another embodiment, the BRTE may work with and recognize gestures. For example, in one embodiment the BRTE may engage with a video camera stream and a user may flash two fingers, e.g., indicating the user wishes to use the $2^{nd}$ card in their electronic wallet, e.g., which might be their Blue Amex card. As such, in one embodiment, a transaction may take place employing only a one way communication: a user engages with a camera/mic, and just says what they want to pay with, and do not need interact nor respond to any prompts from the merchant, issuer, nor payment processor; in other words, the user may employ "the wallet in their head" and instruct the BRTE to select a payment source from memory without every showing a wallet or any other payment mechanism.

In one embodiment, the BRTE may employ payment mechanism including a plug-in or an API call from a merchant to the BRTE where it transfers control for payment, and then control reverts back to the merchant.

Payment Orchestration

In one embodiment, the BRTE may allow a merchant to provision their identifier (merchant ID, account number, digital certificate, keys, etc.) issued to them by their payment processor, and the BRTE may emulate the merchant when sending payment through payment processor. As such, the payment processor will see the transaction as coming from the merchant, e.g., with the BRTE acting as a proxy relay. In one embodiment, this allows automated payment methods via biometrics (e.g., "I would like to pay with ApplePay, or Blue Amex, or Paypal, etc."). For example, payment methods may include credit cards (e.g., American Express®, MasterCard®, Visa®), digital wallets (e.g., PayPal, Google Pay, Apple Pay), banking networks (e.g., Zelle, ACH), mobile money apps, gift cards, cryptocurrency, buy now pay later apps, and/or the like. In various embodiments, the BRTE may manage multiple payment methods and/or rules to split transactions across multiple providers, etc. on behalf of the merchant. For example, if a user says "pay with my Amex", the BRTE may send that payment to a credit card processor, but if the user says "use my PayPal account", the BRTE may automatically switch to the connection to PayPal and send the payment there. See FIGS. 16A-C for additional details regarding the BRTE's payment orchestration capabilities.

Fraud Management

In one embodiment, the BRTE may employ: baseline atmospheric history, historic cross referencing in aiding against fraud, and live person detection.

Baseline atmospheric history. In one embodiment, the BRTE may hold a repository of, e.g., audio, photo, videos of known locations, stores, users, etc. and match current feeds with those on file.

Historic cross reference. In one embodiment, the BRTE may hold a repository of, e.g., a browser's fingerprint, caller ID, mobile app, pin card numbers, public available data (e.g., including: social media, tax records, etc.). Thus, for example, when a user is checking out from Nike.com, the user's billing address may be used to get tax records, look at social media, and further retrieve audio, photos, videos to match against the person engaging in the online transaction.

Lire person detection. Detecting live person increase resilient against recordings and many other types of fraud. In one embodiment, the BRTE may ask a person to make a gesture that the user needs to comply with (e.g., wave with 3 fingers showing, tug your ear, tap your nose, say this phrase, answer this question (e.g., "what's the time and/or date right now"), etc.). Depending on the response, the BRTE may assigning fraud scores to responses demonstrating confidence in presence. In another embodiment, the BRTE may introduce a challenge phrase with certain secret keywords that the user should repeat. Presence of the secret keyword is checked using AI analysis of the spoken words to ensure detection of fraud that can be conducted using recorded audio or AI generated text to speech phrases.

Also, fraud management may vary with the payment source.

Connected Devices Presence

In one embodiment, the BRTE may interact with devices and assistants connected to devices already recognizing a user. For example, voice assistants like Amazon's Alexa, Apple's Siri, etc. may already be interacting with a user providing data that may be used by the BRTE to help identify identity and presence. In one embodiment, voice assistant may have already recognized the user, and checked you for identity and for presence. The BRTE may interact with the voice assistant and employ checks verifying a trusted place (e.g., in your home/car with a voice assistant, etc.). In one embodiment, the BRTE allows the user to say "get me a parking spot" and the car will take you to a parking garage with the BRTE transacting payment in advance the user's arrival at the parking garage.

Decentralized Transaction Non-Number Presentment

In one embodiment, the BRTE includes a decentralized transaction non-number presentment mechanism. In one embodiment, banks open accounts and accounts may be, e.g., of 2 types (credit or debit); e.g., credit accounts-you spend first and pay the bank (load the account) later; debit accounts-you pay the bank (load the account) first and spend later.

Accounts have account numbers which are ledger entries in a bank's private system. These account numbers are semi-private (not shared by the bank with someone else without user permission but can be shared by the user with others).

Cards-Provide access to these accounts for merchants to send charges to these accounts (user typically presents these cards to merchants as a promise to pay these merchants from these accounts). Cards have 16 digit numbers. These numbers are public but unsafe as they can be misused by others who have them (along with some other semi private info).

The process of issuing these cards, process of presenting the card to the merchant and the merchant getting paid by the bank (3 main parties of the transaction) has introduced many other middle men who makes billions of $s funded by fees paid by the merchants (and interest charges/fees paid by the users to the banks). These are the payment networks (Visa/ MC etc.), payment acquirers (First Data, TSY'S etc.), payment gateways (Stripe, Adyen), wallets (PayPal etc.), payment processors (banks themselves), POS terminals (Verifone etc.) and many others. There is an entire industry also involved in making sure the card is not used by an unauthorized person (ID) verification) and yet another industry making sure that if it does get used, the merchant doesn't suffer (chargeback and fraud management).

While the physical card is in the process of being eliminated, the 16 digit card number and the above middle-men are not. In fact, the industry's solution is to use yet another number (tokenization) that represents the card number which can be generated/owned by one of these middlemen. This introduces even more middlemen (those who issue, manage and orchestrate these tokens), which creates more potential vulnerabilities. The BRTE provides an alternative and new solution to these problems.

Decentralized

In one embodiment, the BRTE, potentially owned by no-one (Decentralized) but employs on technology that can be standardized.

0046.1. Each user has a unique face and voice that can be tokenized using a Cloud Software C, e.g., into a face token and a voice token. When banks issue a new account to a user, they add these tokens as the mechanism for the user to access these accounts. No more passwords.

0046.2. These tokens may be broken into 2 halves (1 half that is public, other half private and retained by the bank) using an algorithm.

0046.3. These public token pairs are circulated on a blockchain accessible to anyone.

0046.4. When the user wants to pay a merchant, he presents himself and uses his own face and voice to commit to pay the merchant a particular amount X. This presentment can happen using a camera on the user device (remote payment) or a camera owned by the merchant (physical payment) or a hybrid environment (connected car, home, kiosk, Smart-TV, IoT device etc.).

0046.5. The user's face and voice presentment is processed by the same cloud software C, with the difference that this version accessible to merchants may only generate the public portion of the token.

0046.6. A transaction is submitted to the blockchain now with the identity of the merchant, amount X and the public half of the token pair (generated from face and voice token presented by the user).

0046.7. All the banks participating in this mechanism can watch the blockchain for when a posted transaction by the merchant contains a public token pair that matches and is associated with a private token pair held by them for a particular user account.

0046.8. As soon a match is detected the bank signs the transaction. The signature from the bank contains either an approval or a decline (based on other parameters of the transaction, state of the user account etc.).

0046.9. If the signature contains an authorization, the merchant is able to take the signature to the bank and get paid by them Settlement 0047.1. In one embodiment, the blockchain network is underpinned by a stable US digital dollar.

0047.2. All participating banks anchor this stable US dollar by real US dollar liquidity which means that anytime anyone holding the stable dollar can approach any of the participating bank and get real dollars.

0047.3. For the successful transactions where the signature from the bank contains an authorization for amount X, it can represent a promise by the bank to distribute stable dollar to the merchant for X. What follows is an example embodiment:

0047.3.1. The same Cloud Software C can also tokenize the merchant (merchant opening an account with a participating bank) and generate the private and public token pair for the merchant (using the owner's face and voice data).

0047.3.2. When the merchant posts the transaction to the blockchain, they submit their public token pair with the transaction (as their identification)

0047.3.3. The merchant is then able to take the signed transaction containing their own public pair and the bank signatures along with their private token pair to a digital wallet connected to Cloud Software C 0047.3.4. The Cloud Software C and the Digital Wallet D can match the public and private token pairs and the signature of the issuing bank to deposit the stable US $ into the merchant account and debit the same from anyone offering liquidity for the transaction (their stable $)

0047.3.5. The participating bank receives the info that their signature has been claimed by the merchant and they can post the digital dollars txn to the users account (and pay the liquidity provider the same amount of $s if someone other than the user's issuing bank was the liquidity provider).

0047.3.6. Refunds can be processed in the same way 0047.4. This settlement methodology can ensure that merchants are paid instantly by the bank 0047.5. The Digital $ and Real Time payments flows between various participating banks can also ensure that the merchant doesn't have to be paid by the same bank that signed the transaction on the Blockchain (democratize the liquidity and treasury pool backing the digital $).

Conclusion 0048.1. The 16 digital card number is entirely eliminated from the industry 0048.2. Payment networks have no role to play 0048.3. Fraud is eliminated from the system as hackers don't have the 16 digit number to target 0048.4. An effective biometric tokenization technology that can process a user's face and voice together (using a video stream) interspersed by knowledge based Q&A with the user (information only possible to be known by the user) along with other standard techniques can ensure that fraud cannot target the tokenization process also. All mathematical tokens are eliminated 0048.5. A standardized protocol on the Blockchain can allow for different tech providers to offer the Cloud Software C (for tokenization) and Digital Wallet D (for stable $ distribution and settlements). This ensures no single company owns and monologizes the system Additional Benefits 0049.1. User and merchants can login to their respective accounts with participating banks using their face and voice thereby eliminating passwords 0049.2. Rewards and Offers can be handled by the system for merchants and the banks using the same blockchain as well The BRTE provides unconventional features that were never before available in biometric recognition and cryptographic tokens (e.g., a priority matching feature that authenticates the user quickly (e.g., in less than 1 second) independent of how many users bare enrolled in BRTE using biometric tokenization).

BRTE Login

In some embodiments, the BRTE provides an AI enabled biometric login and authentication system comprised of multi-factors:

0051.1. Face Recognition 0051.2. Voice Recognition and Verification 0051.3. Device Identification and Authentication 0051.4. Optional Knowledge Based Authentication 0051.4.1. Secret Q&A setup by the user upon enrollment 0051.4.2. Dynamic out of band Q&A based on other information available to the BRTE such as personally identifiable information (PII) (e.g., contact info), connected payment methods, past transactions, etc.

In some embodiments, the BRTE uses a priority matching feature that quickly matches a user's face with device data using biometric tokenization:

0052.1. Security architecture ensures biometric data is tokenized and stored separately 0052.1.1. This ensures complete anonymity 0052.1.1.1. Compromise of biometric database only exposes anonymous face models and voice models which are not linked to each other. No way to reproduce face images or voice files from face models or voice models as they are created using 1-way transformation/tokenization 0052.1.1.2. Compromise of BRTE database (e.g., token vault) only exposes a mapping of BRTE ID with encrypted face, voice, contact and payment tokens. No PII data available in BRTE database 0052.1.1.3. Actual contact tokens (e.g., PII data) are stored in a PCI/GDPR compliant vault 0052.1.1.4. Actual card numbers are stored by payment providers or payment networks who issue corresponding payment tokens 0052.2. BRTE tokenization architecture maps a user BRTE ID (e.g., user token) with their biometric tokens, contact tokens and face tokens 0052.3. BRTE Login can hence achieve <1 second performance in optimal conditions (e.g., user logging in to their personal device with face clear in login window)

BRTE FaceAI, VoiceAI and Tokenization structure exemplary embodiments:

0053.1. Ensures cloud performance in a device agnostic way 0053.2. User can use camera on his own device (e.g., fastest match) or a guest device or the camera can be on a shared receptacle (e.g., kiosk, smartTV, POS terminal, connected car, etc.)

0053.3. The system learns the user's face with every authentication via new face tokens added to their biometric token graph 0053.4. Entire face doesn't have to be enrolled at the same time. Different perspectives of the face (e.g., with hat, with sunglasses, profile view etc. can be tokenized and learnt in separate authentication transactions).

0053.5. Same with voice 0053.6. It may be possible for user to login with any 2 of the 4 factors described above 0053.6.1. This makes the system backward compatible with non-biometric devices that only have a keyboard or screen for text input 5. BRTE FaceAI and VoiceAI exemplary features:

0054.1. Ability to process a live video stream for both face and voice identification in a simultaneous multi-threaded cloud architecture unlike other systems that process face recognition via comparing images followed by voice recognition by comparing audio files 0054.2. FaceAI able to distinguish between live person vs. faces presented for recognition via recorded media (e.g., pic or videos)

0054.3. VoiceAI able to perform voice recognition (matching incoming voice against millions of registered voices to find best match) vs. other systems that only do voice verification (matching incoming voice against previously enrolled voice data of a user identified by another identity claim such as username or phone number)

0054.4. VoiceAI able to distinguish between live persons speaking in front of the camera vs. presentment of recorded audio or AI generated text to speech presentment 0054.5. The combination of FaceAI and VoiceAI providing a foolproof mechanism to achieve "impersonation resistance" where one person is completely blocked from logging into another person's account even if account In some embodiments, the BRTE biometric authentication may have the following exemplary features:

0055.1. Web 3 compatible. The biometric database may be implemented using a Blockchain wallet based system where a particular user's data is only accessible to that user (e.g., not even BRTE may have access to the user's original face and/or voice).

0055.2. Privacy architecture. The process of reducing a person's original face and/or voice into vectors using a one way vectorization technique and the AI model of the person using such one way vectors of face and voice as enrolled model for subsequent matching and searching.

0055.3. Lip reading AI. The biometric authentication may utilize a lip reading AI that can match the voice coming out of the microphone to movement of the lips of the face in the camera for another layer of spoof and liveness detection BRTE Login additional exemplary features:

0056.1. Only authentication scheme that can work without an identity claim (e.g., username/UID of any kind)

0056.2. Completely passwordless and PINless (other passwordless systems send codes or links to emails/ phones which are themselves protected by passwords and PINs)

0056.3. Only system that can truly prevent account sharing while permitting family access:

0056.3.1. No individual user can log into another user's account by sharing their assigned credentials 0056.3.2. A user can log into their account from multiple devices without explicitly enrolling each device Exemplary BRTE Login process:

0057.1. User logs in via BRTE Login using their device, face and/or voice biometrics. This generated a BRTE ID (may be referred to elsewhere as Wink Token or user token).

0057.2. A BRTE ID represents a digital persona of the user in the digital metaverse 0057.3. A user can voluntarily enroll in BRTE (e.g., via the BRTE Wallet (may be referred to elsewhere as Wink Wallet)) or can be enrolled automatically the 1st time they use BRTE Checkout (may be referred to elsewhere as Wink Checkout) at a participating merchant.

0057.4. Upon Enrollment 0057.4.1. A user might provide only his biometrics and device information. Such a user can use BRTE Login to login and authenticate into any app that uses BRTE Login. This eliminates passwords.

0057.4.2. A user might also connect their payment methods to their BRTE biometric profile. Such a user can now also use their biometrics to pay inside an app or merchant that uses BRTE Checkout.

BRTE

FIG. 1 shows non-limiting, example embodiments of an architecture for the BRTE. In FIG. 1, an embodiment of how BRTE components may be utilized to implement biometric login and authentication is illustrated. In one implementation, a video-based user session (e.g., that includes face, voice, and/or device biometrics) may be initiated at a user device (e.g., mobile browser/app, desktop browser, kiosk/ATM/POS, connected car, smart speaker/IoT/voice assistants). BRTE biometric tokenization (e.g., utilizing facial recognition, voice verification, and/or device fingerprint) and/or backup knowledge based authentication may be utilized to facilitate AI and/or ML based multi-factor authentication provided by BRTE enrollment, login, and/or authentication component(s).

FIG. 2 shows non-limiting, example embodiments of an architecture for the BRTE. In FIG. 2, an embodiment of how BRTE tokenization may be implemented is illustrated. In one implementation, a user (e.g., Luke) may provide the user's device, face, and/or voice data to a BRTE biometric authentication component to utilize BRTE biometric authentication. A BRTE token vault may store a user token (WT) that is linked with a set of other tokens (e.g., face token (FT), voice token (VT), device token (DT), contact token (CT), payment token (PT), and/or the like). A face token may be associated with face print data (e.g., face model datastructure). A voice token may be associated with voice print data (e.g., voice model datastructure). A device token may be associated with device data (e.g., IP address, browser fingerprint). A contact token may be associated with PII data stored in a (e.g., external) PCI/GDPR compliant PII data vault. A payment token may correspond to an externally generated payment token (e.g., generated by an issuer, a payment network, a payment processor, and/or the like).

In one implementation, BRTE tokenization may map the user's identity and credentials (the user token WT) that are issued and managed by the BRTE to the user's payment credentials (e.g., owned and issued by various financial institutions). For example, the BRTE may integrate with various financial institutions such as Chase, Visa, Master-Card, PayPal, WorldPay, Dwolla, and/or the like each having their own tokenization platforms. Exemplary supported tokenization schemes may include:

0060.1. Issuer Tokenization: For example, Luke's Chase Visa Credit and Debit Cards issued by Chase are tokenized by Chase. These payment tokens are issued and managed by Chase. The BRTE may request such tokens from Chase when Luke links his Chase credit and debit cards to his WT. In order to decrypt such tokens during payment processing, acquirers (such as Chase Payment Services) may connect to the Chase tokenization platform and request the decryption so that a payment transaction can be processed with such tokens.

0060.2. Acquirer/Processor/Gateway Tokenization: For example, Luke's Chase Visa credit card can be tokenized by a Payment processor or Gateway provider (such as Worldpay). Such tokens are usable across merchants who use Worldpay as their payment provider.

0060.3. Network Tokenization: For example, Luke's Chase Visa Credit Card can be tokenized by the Payment Networks such as Visa, MasterCard, Amex or Discover. These tokens may be merchant or platform specific. In this particular case, the same card can have multiple tokens issued to various different merchants/ platforms to support card on file use case (where the token is usable at a single merchant or platform). The BRTE may be setup as a "Platform" that allows merchants connected to the BRTE cloud to be able to share the same token assigned by Visa for Luke's Chase Visa Card.

0060.4. Wallet Tokenization: For example, Luke's Chase Visa Credit card can be tokenized by other wallet providers such as PayPal. Such tokens are usable across merchants who accept PayPal as a payment method (e.g., Luke can pay such merchants with his email ID or phone number registered with PayPal).

0060.5. Alternate Payment Method Tokenization: For example, Luke can have alternate payment tokens issued by non-card based payment providers (e.g., ACH/RTP, BNPL, Crypto, and/or the like). These tokens may be proprietary and designed to co-exist alongside card based payment methods.

FIG. 3 shows non-limiting, example embodiments of an architecture for the BRTE. In FIG. 3, an embodiment of how BRTE components may be utilized to facilitate enrollment and authentication is illustrated. A user may enroll into BRTE using a user device via a BRTE biometric multi-factor authentication front end (e.g., browser widget, iOS/Android app), a user data enrollment page (e.g., using an autofill component), an enrollment internal API, an enrollment service, and/or the like components. A user profile database (e.g., a graph database such as Neo4j, JanusGraph, and/or the like) and/or other associated databases (e.g., PCI/GDPR compliant PII data vault) may be updated (e.g., with generated tokens and/or associated data) upon user enrollment. A user may authenticate with BRTE using a user device via a BRTE biometric multi-factor authentication front end (e.g., browser widget, iOS/Android app), an authentication internal API, an authentication service, and/or the like components. The enrollment service and/or the authentication service may utilize a Symbio API (e.g., to facilitate using Symbio backend, Phonexia engine, face and/or voice biometric database(s), and/or the like).

FIG. 4 shows non-limiting, example embodiments of a datagraph illustrating data flow(s) for the BRTE. In FIG. 4, dashed lines indicate data flow elements that may be more likely to be optional. In FIG. 4, a client 402 (e.g., of a user) may send an enrollment input 421 to an enrollment website/ app 404 (e.g., a third party website/app utilizing a BRTE biometric multi-factor authentication front end) to facilitate user enrollment with the BRTE. For example, the client may be a desktop, a laptop, a tablet, a smartphone, a smartwatch, a kiosk, an ATM, a point of sale (POS) system, a connected car, a smart speaker, an IoT device, a voice assistant device, and/or the like that is executing a client application. In one implementation, the enrollment input may include data such as a request identifier, a user identifier, device data, cookie data, video stream data, PII data, payment methods data, and/or the like. In one embodiment, the client may provide the following example enrollment input, substantially in the form of a (Secure) Hypertext Transfer Protocol ("HTTP(S)") POST message including extensible Markup Language ("XML") formatted data, as provided below:

```
POST /authrequest.php HTTP/1.1
Host: www.server.com
Content-Type: Application/XML
Content-Length: 667
<? XML version="1.0" encoding="UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.
                com</user_name>
            <password>abc123</password>
            //OPTIONAL <cookie>cookieID</cookie>
            //OPTIONAL
                <digital_cert_link>www.mydigitalcertificate.
                com/JohnDoeDaDoeDoe@gmail.com/mycerti-
                fcate.dc</digital_cert_link>
            //OPTIONAL        <digital_certificate>_DATA_
                </digital_certificate>
        </user_account_credentials>
    </user_accounts_details>
    <client_details>//iOS Client with App and Webkit
        //it should be noted that although several client
            details
        //sections are provided to show example variants of
            client
        //sources, further messages will include only on to
            save
        //space
        <client_IP>10.0.0.123</client_IP>
        <user_agent_string>Mozilla/5.0 (iPhone; CPU
            iPhone OS 7_1_1 like Mac OS X) AppleWebKit/
            537.51.2 (KHTML, like Gecko) Version/7.0
            Mobile/11D201        Safari/9537.53</user_agent_
            string>
        <client_product_type>iPhone6, 1</client_product_
            type>
        <client_serial_number>DNXXX1X1XXXX</cli-
            ent_serial_number>
        <client_UDID>3XXXXXXXXXXXXXXXXXXXX
            XXXXXD</client_UDID>
```

12

```
        <client_OS>iOS</client_OS>
        <client_OS_version>7.1.1</client_OS_version>
        <client_app_type>app with webkit</client_app_
            type>
        <app_installed_flag>true</app_installed_flag>
        <app_name>BRTE.app</app_name>
        <app_version>1.0</app_version>
        <app_webkit_name>Mobile Safari</client_webkit_
            name>
        <client_version>537.51.2</client_version>
    </client_details>
    <client_details>//iOS Client with Webbrowser
        <client_IP>10.0.0.123</client_IP>
        <user_agent_string>Mozilla/5.0 (iPhone; CPU
            iPhone OS 7_1_1 like Mac OS X) AppleWebKit/
            537.51.2 (KHTML, like Gecko) Version/7.0
            Mobile/11D201        Safari/9537.53</user_agent_
            string>
        <client_product_type>iPhone6, 1</client_product_
            type>
        <client_serial_number>DNXXX1X1XXXX</cli-
            ent_serial_number>
        <client_UDID>3XXXXXXXXXXXXXXXXXXXX
            XXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android
            4.0.4; en-us; Nexus S Build/IMM76D) AppleWeb-
            Kit/534.30 (KHTML, like Gecko) Version/4.0
            Mobile Safari/534.30</user_agent_string>
        <client_product_type>Nexus S</client_product_
            type>
        <client_serial_number>YXXXXXXXXXZ</client_
            serial_number>
        <client_UDID>FXXXXXXXXX-XXXX-XXXX-
            XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel
            Mac OS X 10_9_3) AppleWebKit/537.75.14
            (KHTML, like Gecko) Version/7.0.3 Safari/
            537.75.14</user_agent_string>
        <client_product_type>MacPro5, 1</client_product_
            type>
        <client_serial_number>YXXXXXXXXXZ</client_
            serial_number>
        <client_UDID>FXXXXXXXXX-XXXX-XXXX-
            XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
```

```
<enrollment_input>
    <request_identifier>ID_request_1</request_identi-
        fier>
    <user_identifier>ID_Luke</user_identifier>
    <device_data>
        <browser_fingerprint>FingerprintJS     fingerprint
            </browser_fingerprint>
        <IP_address>10.0.0.123</IP_address>
        <device_ID>FXXXXXXXXX-XXXX-XXXX-
            XXXX-XXXXXXXXXXXXX</device_ID>
        <phone_number>123-456-7890</phone_number>
        <location>GPS Location</location>
    </device_data>
    <cookie_data>empty</cookie_data>
    <video_stream_data>video     stream     from     cLient
        </video_stream_data>
    <PII_data>
    <name>Luke</name>
    <address>123 Main St., City, State, ZIP</address>
    <email>JohnDaDoeDoeDoooe@gmail.com
        </email>
    <phone>123-456-7890</phone>
    </PII_data>
    </enrollment_input>
    </auth_request>
```

The enrollment website/app 404 may send an enrollment request 425 to a BRTE server 406 to facilitate user enrollment with the BRTE. In one implementation, the enrollment request may include data such as a request identifier, a website/app identifier, a user identifier, device data, cookie data, video stream data, PII data, payment methods data, and/or the like. In one embodiment, the enrollment website/app may provide the following example enrollment request, substantially in the form of a HTTP(S) POST message including XML-formatted data, as provided below:

```
POST /enrollment_request.php HTTP/1.1
Host: www.server.com
Content-Type: Application/XML
Content-Length: 667
<?XML version="1.0" encoding="UTF-8" ?>
<enrollment_request>
    <request_identifier>ID_request_2</request_identifier>
    <website_app_identifier>ID_merchant_app_1</web-
        site_app_identifier>
    <user_identifier>ID_Luke</user_identifier>
    <device_data>
        <browser_fingerprint>FingerprintJS     fingerprint
            </browser_fingerprint>
        <IP_address>10.0.0.123</IP_address>
        <device_ID>FXXXXXXXXX-XXXX-XXXX-
            XXXX-XXXXXXXXXXXXX</device_ID>
        <phone_number>123-456-7890</phone_number>
        <location>GPS Location</location>
    </device_data>
    <cookie_data>empty</cookie_data>
    <video_stream_data>video stream from cLient</vid-
        eo_stream_data>
    <PII_data>
        <name>Luke</name>
        <address>123 Main St., City, State, ZIP</address>
        <email>JohnDaDoeDoeDoooe@gmail.com
            </email>
        <phone>123-456-7890</phone>
    </PII_data>
</enrollment_request>
```

An enrollment processing (EP) component 429 may utilize data provided in the enrollment request to enroll the user with the BRTE. See FIG. 5 for additional details regarding the EP component.

The BRTE server 406 may send a token data store request 433 to a token vault 408 (e.g., a graph database such as Neo4j, JanusGraph, and/or the like) to facilitate storing tokenized data associated with the user. In one implementation, the token data store request may include data such as a request identifier, a request type, tokenized data associated with the user, and/or the like. In one embodiment, the BRTE server may provide the following example token data store request, substantially in the form of a HTTP(S) POST message including XML-formatted data, as provided below:

```
POST /token_data_store_request.php HTTP/1.1
Host: www.server.com
Content-Type: Application/XML
Content-Length: 667
<?XML version="1.0" encoding="UTF-8" ?>
<token_data_store_request>
    <request_identifier>ID_request_3</request_identifier>
    <request_type>STORE</request_type>
    <node>
        <node_identifier>ID_WT_Luke</node_identifier>
        <node_properties>
            <property>node_type: WT</property>
            <property>token:    0x1234567890a12345</prop-
                erty>
            <property>user_identifier: ID_Luke</property>
        </node_properties>
        <node_links>
            <link>linked_to: ID_FT_1</link>
            <link>linked_to: ID_VT_1</link>
            <link>linked_to: ID_CT_1</link>
            <link>linked_to: ID_DT_1</link>
        </node_links>
    </node>
    <node>
        <node_identifier>ID_FT_1</node_identifier>
        <node_properties>
            <property>node_type: FT</property>
            <property>token:    0x2234567890a12345</prop-
                erty>
            <property>face_model: face print_datastructure</
                property>
        </node_properties>
        <node_links>
            <link>linked_to: ID_VT_1</link>
        </node_links>
    </node>
    <node>
        <node_identifier>ID_VT_1</node_identifier>
        <node_properties>
            <property>node_type: VT</property>
            <property>token:    0x3234567890a12345</prop-
                erty>
            <property>voice_model:  voice  print_datastruc-
                ture</property>
        </node_properties>
        <node_links>
            <link>linked_to: ID_FT_1</link>
        </node_links>
    </node>
    <node>
        <node_identifier>ID_CT_1</node_identifier>
        <node_properties>
            <property>node_type: CT</property>
```

```
        <property>token:   0x4234567890a12345</prop-
           erty>
     </node_properties>
  </node>
  <node>
     <node_identifier>ID_DT_1</node_identifier>
     <node_properties>
        <property>node_type: DT</property>
        <property>token:   0x5234567890a12345</prop-
           erty>
        <property>device_type: iPhone</property>
     </node_properties>
     <node_links>
        <link>linked_to:        ID_browser_fingerpint_1
           </link>
        <link>linked_to: ID_IP_address_1</link>
        <link>linked_to: ID_device_identifier_1</link>
     </node_links>
  </node>
  <node>
     <node_identifier>ID_browser_fingerpint_1</node_
        identifier>
     <node_properties>
        <property>node_type: browser_fingerpint</prop-
           erty>
        <property>data: Fingerprint3S fingerprint</prop-
           erty>
     </node_properties>
  </node>
  <node>
     <node_identifier>ID_IP_address_1</node_identi-
        fier>
     <node_properties>
        <property>node_type: IP_address</property>
        <property>data: 10.0.0.123</property>
     </node_properties>
  </node>
  <node>
     <node_identifier>ID_device_identifier_1</node_
        identifier>
     <node_properties>
        <property>node_type:   device_identifier</prop-
           erty>
        <property>data:        FXXXXXXXXX-XXXX-
           XXXX-XXXX-XXXXXXXXXXXXX</prop-
           erty>
     </node_properties>
  </node>
</token_data_store_request>
```

The token vault 408 may send a token data store response 437 to the BRTE server 406 to confirm whether the tokenized data associated with the user was stored successfully. In one implementation, the token data store response may include data such as a response identifier, a status, and/or the like. In one embodiment, the token vault may provide the following example token data store response, substantially in the form of a HTTP(S) POST message including XML-formatted data, as provided below:

```
POST /token_data_store_response.php HTTP/1.1
Host: www.server.com
Content-Type: Application/XML
Content-Length: 667
<?XML version="1.0" encoding="UTF-8" ?>
<token_data_store_response>
   <response_identifier>ID_response_3</response_iden-
      tifier>
   <status>OK</status>
</token_data_store_response>
```

The BRTE server 406 may send a PII data store request 441 to a PII data vault 410 (e.g., a PCI/GDPR compliant database) to facilitate storing PII data associated with the user. In one implementation, the PII data store request may include data such as a request identifier, a request type, an associated contact token (CT), PII data associated with the user, and/or the like. In one embodiment, the BRTE server may provide the following example PII data store request, substantially in the form of a HTTP(S) POST message including XML-formatted data, as provided below:

```
POST /PII_data_store_request.php HTTP/1.1
Host: www.server.com
Content-Type: Application/XML
Content-Length: 667
<?XML version="1.0" encoding="UTF-8" ?>
<PII_data_store_request>
   <request_identifier>ID_request_4</request_identifier>
   <request_type>STORE</request_type>
   <CT>0x4234567890a12345</CT>
   <PII_data>
      <name>Luke</name>
      <address>123 Main St., City, State, ZIP</address>
      <email>JohnDaDoeDoeDoooe@gmail.com
         </email>
      <phone>123-456-7890</phone>
   </PII_data>
</PII_data_store_request>
```

The PII data vault 410 may send a PII data store response 445 to the BRTE server 406 to confirm whether the PII data associated with the user was stored successfully. In one implementation, the PII data store response may include data such as a response identifier, a status, and/or the like. In one embodiment, the PII data vault may provide the following example PII data store response, substantially in the form of a HTTP(S) POST message including XML-formatted data, as provided below:

```
POST /PII_data_store_response.php HTTP/1.1
Host: www.server.com
Content-Type: Application/XML
Content-Length: 667
<?XML version="1.0" encoding="UTF-8" ?>
<PII_data_store_response>
   <response_identifier>ID_response_4</response_iden-
      tifier>
   <status>OK</status>
</PII_data_store_response>
```

The BRTE server 406 may send an enrollment response 449 to the enrollment website/app 404 to confirm whether the user was enrolled with the BRTE successfully and/or to provide a user seed (WS) associated with the user. In one implementation, the enrollment response may include data such as a response identifier, a WS associated with the user, a status, and/or the like. In one embodiment, the BRTE server may provide the following example enrollment response, substantially in the form of a HTTP(S) POST message including XML-formatted data, as provided below:

```
POST /enrollment_response.php HTTP/1.1
Host: www.server.com
Content-Type: Application/XML
Content-Length: 667
<?XML version="1.0" encoding="UTF-8" ?>
<enrollment_response>
   <response_identifier>ID_response_2</response_iden-
      tifier>
   <WS>0x9876543210b543218876543210c54321
      </WS>
   <status>OK</status>
</enrollment_response>
```

The enrollment website/app 404 may send an enrollment output 453 to the client 402 to inform the user whether the user was enrolled with the BRTE successfully and/or to provide the WS associated with the user. In one implementation, the enrollment output may include data such as a response identifier, a WS associated with the user, a status, and/or the like. In one embodiment, the enrollment website/app may provide the following example enrollment output, substantially in the form of a HTTP(S) POST message including XML-formatted data, as provided below:

POST /enrollment_output.php HTTP/1.1
Host: www.server.com
Content-Type: Application/XML
Content-Length: 667
<?XML version="1.0" encoding="UTF-8" ?>
<enrollment_output>
    <response_identifier>ID_response_1</response_identifier>
    <WS>0x9876543210b543218876543210c54321</WS>
    <status>OK</status>
</enrollment_output>

FIG. 5 shows non-limiting, example embodiments of a logic flow illustrating an enrollment processing (EP) component for the BRTE. In FIG. 5, an enrollment request datastructure may be obtained at 501. For example, the enrollment request datastructure may be obtained as a result of a user request to enroll with the BRTE.

Device data associated with the enrollment request datastructure may be determined at 505. For example, device data may include a browser fingerprint, an IP address, a manufacturer device ID, a phone number, a GPS location, and/or the like. In one embodiment, device data may be used to identify a client device utilized by the user. In one implementation, the enrollment request datastructure may be parsed (e.g., using PHP commands) to determine the device data (e.g., based on the value of the device_data field). For example, the browser fingerprint may be determined using an SDK such as FingerprintJS. For example, the IP address may be further resolved into an IP location using an SDK such as IPInfo. For example, the device ID may be an OS provided device identifier (e.g., for iPhones and Android phones). For example, the phone number and/or GPS location may be determined depending on user permissions.

A device search on a device graph database may be executed at 509 to ascertain if the device has been seen previously. For example, the device graph database may be implemented using a graph database such as Neo4j, Janus-Graph, and/or the like. In one embodiment, the device search on the device graph database may be executed to determine whether the device data indicates that the device has been seen previously. For example, the device search on the device graph database may be executed via a Cypher Query Language (Cypher) database command. In one implementation, an AI/ML technique may be utilized to determine whether the device data matches a previously seen device by evaluating a subset of the device data that is found in the device graph database (e.g., using a rules-based ML system). For example, the AI/ML technique may utilize the following rules (e.g., learned through training):

Rules to decide whether the device has been previously

If a browser fingerprint is found then it's a device that has been seen before

If an IP address is found, then it may (or may not) be the same device

Multiple devices behind a home or work network could have the same IP address

Evaluate additional data to decide

If a phone number is found, then it is highly likely to be the same device

However, a hacker could use an emulator to spoof the phone number

Evaluate additional data to decide

If Apple or Google supplied Device ID is found, it is most likely a device that has been seen before Evaluate additional data to decide If IPinfo location indicates a foreign location then it could be a VPN Evaluate additional data to decide Make a decision based on whether the probability that the combination of matched device data fields indicates a previously seen device exceeds a threshold A determination may be made at 513 whether the device is a new device. If the device has not been seen previously, a device token (DT) for the device may be generated at 517. In one embodiment, the determination that the device has not been seen previously may be made because a new user is enrolling using a new device. For example, the DT may be a 16 digit random hex token. In one embodiment, the DT may be treated as a secret that is not revealed in the clear. In one implementation, the DT may be generated using a token generation service. For example, the token generation service may generate the DT in a way that avoids generating duplicate DT values. In another example, the token generation service may generate the DT value randomly and regenerate it if the DT already exists in the device graph database.

A device graph for the user's device may be added to the device graph database at 521. In one embodiment, the device graph may contain the device data linked to the DT. See FIG. 7 for an example of a device graph (e.g., shown as part of a user graph). In one implementation, the device graph may be stored in the device graph database. For example, the device graph may be stored in the device graph database via a Cypher database command.

If the device has been seen previously, a DT for the device may be retrieved at 525. In one embodiment, the determination that the device has been seen previously may be made because a new user is enrolling using a previously seen device (e.g., a shared device shared with another user). In one implementation, the DT may be retrieved as part of the device search on the device graph database. For example, if the device search indicates that the device has been seen previously, the device search may provide the DT of the matching device graph in the device graph database.

Video stream data associated with the enrollment request datastructure may be determined at 529. For example, video stream data may include video data and/or audio data provided by the user's device. In one embodiment, video stream data may be used to identify the user using biometric data. For example, the BRTE may be implemented to enroll the user using fewer than 10 seconds of useful video stream capture of the user (e.g., the user's face is available in good quality in the camera capture for approximately 2-3 seconds and/or a good quality audio of the user's voice is captured for approximately 5-7 seconds). In one implementation, the enrollment request datastructure may be parsed (e.g., using PHP commands) to determine the video stream data (e.g., based on the value of the video_stream_data field). In some implementations, anti-spoof mechanisms (e.g., for video and/or audio capture) may be used to ensure that real live users are accepted while recorded images and audio are rejected. For example, a lip reading AI that can match the voice coming out of the microphone to movement of the lips of the face in the camera may be utilized as an anti-spoof mechanism.

Face data associated with the user may be determined from the video stream data at 533. In one embodiment, face data may be processed using a multi-threaded cloud architecture structured to process the video stream data for both face and voice identification simultaneously. In one implementation, the video data portion of the video stream data may be determined and/or further analyzed to determine the face data (e.g., to separate the user's face from the background).

A face print may be generated from the face data at 537. In one embodiment, the face print may be a (e.g., 3D) model datastructure of the user's face. In one implementation, the face print may be generated by transforming aspects of the user's facial features into a face print model datastructure. In some implementations, the face print may be generated using a 1-way transformation function that precludes reconstruction of a face image from the face print model datastructure.

A face token (FT) for the face print may be generated at 541. For example, the FT may be a 16 digit random hex token. In one embodiment, the FT may be treated as a secret that is not revealed in the clear. In one implementation, the FT may be generated using a token generation service. For example, the token generation service may generate the FT in a way that avoids generating duplicate FT values. In another example, the token generation service may generate the FT value randomly and regenerate it if the FT already exists in a user graph database.

The face print may be stored in a (e.g., face) biometric database at 545. It is to be understood that this may be the same or a different biometric database that stores voice prints. In one implementation, the FT may be used as a key for the face print. For example, the face print may be stored in the biometric database via a MySQL database command similar to the following:

INSERT INTO FacePrintsTable (FacePrintID, FacePrintData)
    VALUES (FT. FacePrintModelDatastructure);

Voice data associated with the user may be determined from the video stream data at 549. In one embodiment, voice data may be processed using a multi-threaded cloud architecture structured to process the video stream data for both face and voice identification simultaneously. In one implementation, the audio data portion of the video stream data may be determined and/or further analyzed to determine the voice data (e.g., to separate the user's voice from background noise).

A voice print may be generated from the voice data at 553. In one embodiment, the voice print may be a (e.g., 3D) model datastructure of the user's voice. In one implementation, the voice print may be generated by transforming aspects of the user's voice waveform into a voice print model datastructure. In some implementations, the voice print may be generated using a 1-way transformation function that precludes reconstruction of a voice file from the voice print model datastructure.

A voice token (VT) for the voice print may be generated at 557. For example, the VT may be a 16 digit random hex token. In one embodiment, the VT may be treated as a secret that is not revealed in the clear. In one implementation, the VT may be generated using a token generation service. For example, the token generation service may generate the VT in a way that avoids generating duplicate VT values. In another example, the token generation service may generate the VT value randomly and regenerate it if the VT already exists in the user graph database.

The voice print may be stored in a (e.g., voice) biometric database at 561. It is to be understood that this may be the same or a different biometric database that stores face prints. In one implementation, the VT may be used as a key for the voice print. For example, the voice print may be stored in the biometric database via a MySQL database command similar to the following:

INSERT INTO VoicePrintsTable (VoicePrintID, VoicePrintData)
    VALUES (VT, VoicePrintModelDatastructure);

A user token (WT) for the user may be generated at 565. In one embodiment, the WT may be treated as a secret that is not revealed in the clear. In one implementation, the WT may be (e.g., a 16 digit random hex token) generated using a token generation service. For example, the token generation service may generate the WT in a way that avoids generating duplicate WT values. In another example, the token generation service may generate the WT value randomly and regenerate it if the WT already exists in the user graph database. In another implementation, the WT may be a 32 digit hex token formed by appending the FT and the VT.

A user graph for the user may be added to the user graph database at 569. In one embodiment, the user graph may contain tokens (e.g., DTs, FTs, VTs, contact tokens, and/or the like) and/or associated data (e.g., device data, biometric data) linked to the WT. See FIG. 7 for an example of a user graph (e.g., shown including a device graph). In one implementation, the user graph may be stored in the user graph database. For example, the user graph may be stored in the user graph database via a Cypher database command.

A determination may be made at 573 whether personally identifiable information (PII) data was provided by the user. If so, a contact token (CT) for the PII data may be generated at 577. For example, the CT may be a 16 digit random hex token. In one embodiment, the CT may be treated as a secret that is not revealed in the clear. In one implementation, the CT may be generated using a token generation service. For example, the token generation service may generate the CT in a way that avoids generating duplicate CT values. In another example, the token generation service may generate the CT value randomly and regenerate it if the CT already exists in the user graph database.

PII data for the user may be stored in a PII data vault at 581. In one embodiment, the PII data vault may be a PCI/GDPR compliant database. In one implementation, the CT may be used as a key for the (e.g., encrypted) PII data. For example, the (e.g., encrypted) PII data may be stored in the PII data vault via a MySQL database command similar to the following:

INSERT INTO PII_DataTable (PII_DataID, name, address, phone, . . . )
    VALUES (CT, "Luke", "123 Main St., City, State, ZIP", "123-456-7890", . . . );

The CT may be linked to the WT at 585. In one implementation, a node corresponding to the CT may be added to the user graph database and a link to the CT node may be added to a node corresponding to the WT. For example, the CT may be linked to the WT via a Cypher database command.

A user seed (WS) for the user may be generated at 589. In one implementation (e.g., when the WT is a 16 digit random hex token), the WS may be generated by appending the FT and the VT, and encrypting the result with the DT (e.g., using Triple DES (TDES), Advanced Encryption Standard (AES), and/or the like encryption technique) to create another 32 digit hex token. In another implementation (e.g., when the WT is a 32 digit hex token formed by appending the FT and the VT), the WS may be generated by encrypting the WT with the DT (e.g., using TDES, AES, and/or the like encryption technique) to create another 32 digit hex token.

The WS may be provided to the user at 593. In one embodiment, the WS is provided to the user to be stored by the user's device in a cookie (e.g., for a website) or as app data (e.g., for an app). In one implementation, the WS may be provided to the user's device (e.g., directly or via an enrollment website/app) via an enrollment response.

FIG. 6 shows non-limiting, example embodiments of implementation case(s) for the BRTE. In FIG. 6, an exemplary flow to facilitate user enrollment with the BRTE is illustrated. When a user attempts to enroll with the BRTE, device data associated with the user is collected and a determination is made whether the user's device is a new device. If a new device a detected, the user is asked to provide microphone and/or camera permissions. A streaming session is started, and, depending on available hardware and/or permissions, the user's face and/or voice may be enrolled with the BRTE. The user's device may be verified (e.g., via email, SMS, and/or the like) and the device token (e.g., DeviceID) of the device may be attached to the user token (e.g., WinkID) of the user.

FIG. 7 shows non-limiting, example embodiments of implementation case(s) for the BRTE. In FIG. 7, an exemplary user graph associated with a user is illustrated. The user graph may identify the user using the WT node. The WT node may be linked to various biometric and contact tokens nodes (e.g., FT nodes, VT nodes, CT nodes). The WT node may also be linked to DT nodes. The user graph also shows a device graph of a linked DT node. The device graph may identify a device associated with the user using the DT node. The DT node may be linked to various device data nodes (e.g., a browser fingerprint node, an IP address node, a manufacturer device ID node, a phone number node, a GPS location node).

FIG. 8 shows non-limiting, example embodiments of a datagraph illustrating data flow(s) for the BRTE. In FIG. 8, dashed lines indicate data flow elements that may be more likely to be optional. In FIG. 8, a client 802 (e.g., of a user) may send an authentication input 821 to an authentication website/app 804 (e.g., a third party website/app utilizing a BRTE biometric multi-factor authentication front end) to facilitate user authentication with the BRTE. For example, the client may be a desktop, a laptop, a tablet, a smartphone, a smartwatch, a kiosk, an ATM, a point of sale (POS) system, a connected car, a smart speaker, an IoT device, a voice assistant device, and/or the like that is executing a client application. In one implementation, the authentication input may include data such as a request identifier, a user identifier, device data, cookie data, video stream data, PII data, payment methods data, and/or the like. In one embodiment, the client may provide the following example authentication input, substantially in the form of a HTTP(S) POST message including XML-formatted data, as provided below:

POST /authentication_input.php HTTP/1.1
Host: www.server.com
Content-Type: Application/XML
Content-Length: 667
<?XML version="1.0" encoding="UTF-8" ?>

<authentication_input>
　<request_identifier>ID_request_11</request_identifier>
　<user_identifier>ID_Luke</user_identifier>
　<device_data>
　　<browser_fingerprint>FingerprintJS　fingerprint</browser_fingerprint>
　　<IP_address>10.0.0.123</IP_address>
　　<device_ID>FXXXXXXXXX-XXXX-XXXX-XXXX-XXXXXXXXXXXXX</device_ID>
　　<phone_number>123-456-7890</phone_number>
　　<location>GPS Location</location>
　</device_data>
　<cookie_data>
　　<WS>0x9876543210b543218876543210c54321</WS>
　</cookie_data>
　<video_stream_data>video stream from cLient</video_stream_data>
　<PII_data>
　　<address>123 Main St., City, State, ZIP</address>
　</PII_data>
</authentication_input>

The authentication website/app 804 may send an authentication request 825 to a BRTE server 806 to facilitate user authentication with the BRTE. In one implementation, the authentication request may include data such as a request identifier, a website/app identifier, a user identifier, device data, cookie data, video stream data, PII data, payment methods data, and/or the like. In one embodiment, the authentication website/app may provide the following example authentication request, substantially in the form of a HTTP(S) POST message including XML-formatted data, as provided below:

POST /authentication_request.php HTTP/1.1
Host: www.server.com
Content-Type: Application/XML
Content-Length: 667
<?XML version="1.0" encoding="UTF-8" ?>
<authentication_request>
　<request_identifier>ID_request_12</request_identifier>
　<website_app_identifier>ID_merchant_app_1</website_app_identifier>
　<user_identifier>ID_Luke</user_identifier>
　<device_data>
　　<browser_fingerprint>FingerprintJS　fingerprint</browser_fingerprint>
　　<IP_address>10.0.0.123</IP_address>
　　<device_ID>FXXXXXXXXX-XXXX-XXXX-XXXX-XXXXXXXXXXXXX</device_ID>
　　<phone_number>123-456-7890</phone_number>
　　<location>GPS Location</location>
　</device_data>
　<cookie_data>
　　<WS>0x9876543210b543218876543210c54321</WS>
　</cookie_data>
　<video_stream_data>video stream from cLient</video_stream_data>
　<PII_data>
　　<address>123 Main St., City, State, ZIP</address>
　</PII_data>
</authentication_request>

An authentication processing (AP) component 829 may utilize data provided in the authentication request to authenticate the user with the BRTE. See FIGS. 9A-B for additional details regarding the AP component.

The BRTE server 806 may send a token data retrieve request 833 to a token vault 808 (e.g., a graph database such as Neo4j, JanusGraph, and/or the like) to facilitate retrieving tokenized data associated with the user. In one implementation, the token data retrieve request may include data such as a request identifier, a request type, specification of tokenized data associated with the user to retrieve, and/or the like. In one embodiment, the BRTE server may provide the following example token data retrieve request, substantially in the form of a HTTP(S) POST message including XML-formatted data, as provided below:

```
POST /token_data_retrieve_request.php HTTP/1.1
Host: www.server.com
Content-Type: Application/XML
Content-Length: 667
<?XML version="1.0" encoding="UTF-8" ?>
<token_data_retrieve_request>
    <request_identifier>ID_request_13</request_identi-
        fier>
    <request_type>RETRIEVE</request_type>
    <search_parameters>
        <search_on>
            <node_type>DT</node_type>
            <node_identifier>ID_DT_1</node_identifier>
        </search_on>
        <requested_data>
            <node_links>ALL</node_links>
        </requested_data>
    </search_parameters>
    <search_parameters>
        <search_on>
            <node_type>WT</node_type>
            <node_identifier>ID_WT_Luke</node_identi-
                fier>
        </search_on>
        <requested_data>
            <node_type>FT</node_type>
            <node_identifier>ALL</node_identifier>
        </requested_data>
        <requested_data>
            <node_type>VT</node_type>
            <node_identifier>ALL</node_identifier>
        </requested_data>
    </search_parameters>
</token_data_retrieve_request>
```

The token vault 808 may send a token data retrieve response 837 to the BRTE server 806 with the requested tokenized data associated with the user. In one implementation, the token data retrieve response may include data such as a response identifier, the requested tokenized data associated with the user, and/or the like. In one embodiment, the token vault may provide the following example token data retrieve response, substantially in the form of a HTTP(S) POST message including XML-formatted data, as provided below:

```
POST /token_data_retrieve_response.php HTTP/1.1
Host: www.server.com
Content-Type: Application/XML
Content-Length: 667
<?XML version="1.0" encoding="UTF-8" ?>
<token_data_retrieve_response>
    <response_identifier>ID_response_13</response_
        identifier>
    <requested_data>
        <node>
            <node_identifier>ID_browser_fingerpint_1</no-
                de_identifier>
```

```
            <node_properties>
                <property>node_type:    browser_fingerpint</
                property>
                <property>data:   Fingerprint3S   fingerprint</
                property>
            </node_properties>
        </node>
        <node>
            <node_identifier>ID_IP_address_1</node_iden-
                tifier>
            <node_properties>
                <property>node_type: IP_address</property>
                <property>data: 10.0.0.123</property>
            </node_properties>
        </node>
        <node>
            <node_identifier>ID_device_identifier_1</node_
                identifier>
            <node_properties>
                <property>node_type: device_identifier</prop-
                erty>
                <property>data:       FXXXXXXXXX-XXXX-
                XXXX-XXXX-XXXXXXXXXXXX</prop-
                erty>
            </node_properties>
        </node>
    </requested_data>
    <requested_data>
        <node>
            <node_identifier>ID_FT_1</node_identifier>
            <node_properties>
                <property>node_type: FT</property>
                <property>token:       0x2234567890a12345
                </property>
                <property>face_model:  face  print_datastruc-
                ture</property>
            </node_properties>
            <node_links>
                <link>linked_to: ID_VT_1</link>
            </node_links>
        </node>
        <node>
            <node_identifier>ID_FT_2</node_identifier>
            <node_properties>
                <property>node_type: FT</property>
                <property>token:       0x2334567890a12345
                </property>
                <property>face_model:  face  print_datastruc-
                ture</property>
            </node_properties>
            <node_links>
                <link>linked_to: ID_VT_2</link>
            </node_links>
        </node>
    </requested_data>
    <requested_data>
        <node>
            <node_identifier>ID_VT_1</node_identifier>
            <node_properties>
                <property>node_type: VT</property>
                <property>token:       0x3234567890a12345
                </property>
```

```
        <property>voice_model: voice print_datastruc-
            ture</property>
    </node_properties>
    <node_links>
        <link>linked_to: ID_FT_1</link>
    </node_links>
</node>
<node>
    <node_identifier>ID_VT_2</node_identifier>
    <node_properties>
        <property>node_type: VT</property>
        <property>token:        0x3334567890a12345</
            property>
        <property>voice_model: voice print_datastruc-
            ture</property>
    </node_properties>
    <node_links>
        <link>linked_to: ID_FT_2</link>
    </node_links>
</node>
</requested_data>
</token_data_retrieve_response>
```

The BRTE server 806 may send a PII data retrieve request 841 to a PII data vault 810 (e.g., a PCI/GDPR compliant database) to facilitate retrieving PII data associated with the user (e.g., for additional authentication). In one implementation, the PII data retrieve request may include data such as a request identifier, a request type, specification of PII data associated with the user to retrieve, and/or the like. In one embodiment, the BRTE server may provide the following example PII data retrieve request, substantially in the form of a HTTP(S) POST message including XML-formatted data, as provided below:

```
POST /PII_data_retrieve_request.php HTTP/1.1
Host: www.server.com
Content-Type: Application/XML
Content-Length: 667
<?XML version="1.0" encoding="UTF-8" ?>
<PII_data_retrieve_request>
    <request_identifier>ID_request_14</request_identi-
        fier>
    <request_type>RETRIEVE</request_type>
    <search_parameters>
        <search_on>
            <CT>0x4234567890a12345</CT>
        </search_on>
        <requested_data>address</requested_data>
    </search_parameters>
</PII_data_retrieve_request>
```

The PII data vault 810 may send a PII data retrieve response 845 to the BRTE server 806 with the requested PII data associated with the user. In one implementation, the PII data retrieve response may include data such as a response identifier, the requested PII data associated with the user, and/or the like. In one embodiment, the PII data vault may provide the following example PII data retrieve response, substantially in the form of a HTTP(S) POST message including XML-formatted data, as provided below:

```
POST /PII_data_retrieve_response.php HTTP/1.1
Host: www.server.com
Content-Type: Application/XML
Content-Length: 667
<?XML version="1.0" encoding="UTF-8" ?>
```

```
<PII_data_retrieve_response>
    <response_identifier>ID_response_14</response_
        identifier>
    <requested_data>
        <address>123 Main St., City, State, ZIP</address>
    </requested_data>
</PII_data_retrieve_response>
```

The BRTE server 806 may send an authentication response 849 to the authentication website/app 804 to confirm whether the user was authenticated with the BRTE successfully and/or to provide a login token (LT) for a login session. In one implementation, the authentication response may include data such as a response identifier, a LT for the login session, a status, and/or the like. In one embodiment, the BRTE server may provide the following example authentication response, substantially in the form of a HTTP(S) POST message including XML-formatted data, as provided below:

```
POST /authentication_response.php HTTP/1.1
Host: www.server.com
Content-Type: Application/XML
Content-Length: 667
<?XML version="1.0" encoding="UTF-8" ?>
<authentication_response>
    <response_identifier>ID_response_12</response_
        identifier>
    <LT>0x5555543210b543218876543210d12345</LT>
    <status>OK</status>
</authentication_response>
```

The authentication website/app 804 may send an authentication output 853 to the client 802 to inform the user whether the user was authenticated with the BRTE successfully and/or to provide the LT for the login session. In one implementation, the authentication output may include data such as a response identifier, a LT for the login session, a status, and/or the like. In one embodiment, the authentication website/app may provide the following example authentication output, substantially in the form of a HTTP(S) POST message including XML-formatted data, as provided below:

```
POST /authentication_output.php HTTP/1.1
Host: www.server.com
Content-Type: Application/XML
Content-Length: 667
<?XML version="1.0" encoding="UTF-8" ?>
<authentication_output>
    <response_identifier>ID_response_11</response_
        identifier>
    <LT>0x5555543210b543218876543210d12345</LT>
    <status>OK</status>
</authentication_output>
```

FIGS. 9A-B show non-limiting, example embodiments of a logic flow illustrating an authentication processing (AP) component for the BRTE. In FIGS. 9A-B, an authentication request datastructure may be obtained at 901. For example, the authentication request datastructure may be obtained as a result of a user request to authenticate with the BRTE.

Device data associated with the authentication request datastructure may be determined at 903. For example, device data may include a browser fingerprint, an IP address, a manufacturer device ID, a phone number, a GPS location, and/or the like. In one embodiment, device data may be used to identify a client device utilized by the user. In one implementation, the authentication request datastructure may be parsed (e.g., using PHP commands) to determine the device data (e.g., based on the value of the device_data field). For example, the browser fingerprint may be determined using an SDK such as FingerprintJS. For example, the IP address may be further resolved into an IP location using an SDK such as IPInfo. For example, the device ID may be an OS provided device identifier (e.g., for iPhones and Android phones). For example, the phone number and/or GPS location may be determined depending on user permissions.

A device search on a device graph database may be executed at 905 to ascertain if the device has been seen previously. For example, the device graph database may be implemented using a graph database such as Neo4j, Janus-Graph, and/or the like. In one embodiment, the device search on the device graph database may be executed to determine whether the device data indicates that the device has been seen previously. For example, the device search on the device graph database may be executed via a Cypher database command. In one implementation, an AI/ML technique may be utilized to determine whether the device data matches a previously seen device by evaluating a subset of the device data that is found in the device graph database (e.g., using a rules-based ML system). For example, the AI/ML technique may utilize the following rules (e.g., learned through training):

Rules to decide whether the device has been seen previously

If a browser fingerprint is found then it's a device that has been seen before

If an IP address is found, then it may (or may not) be the same device

Multiple devices behind a home or work network could have the same IP address

Evaluate additional data to decide

If a phone number is found, then it is highly likely to be the same device

However, a hacker could use an emulator to spoof the phone number

Evaluate additional data to decide

If Apple or Google supplied Device ID is found, it is most likely a device that has been seen before Evaluate additional data to decide If IPinfo location indicates a foreign location then it could be a VPN Evaluate additional data to decide Make a decision based on whether the probability that the combination of matched device data fields indicates a previously seen device exceeds a threshold A determination may be made at 907 whether the device is a new device. If the device has not been seen previously, a device token (DT) for the device may be generated at 909. In various embodiments, the determination that the device has not been seen previously may be made because the user returns for authentication on a new device, because a cookie or app data is absent from the device (e.g., the cookie or app data may have been cleared by the user or automatically by merchant app, browser, OS update, etc.), and/or the like. For example, the DT may be a 16 digit random hex token. In one embodiment, the DT may be treated as a secret that is not revealed in the clear. In one implementation, the DT may be generated using a token generation service. For example, the token generation service may generate the DT in a way that avoids generating duplicate DT values. In another example, the token generation service may generate the DT value randomly and regenerate it if the DT already exists in the device graph database.

A device graph for the user's device may be added to the device graph database at 911. In one embodiment, the device graph may contain the device data linked to the DT. See FIG.

7 for an example of a device graph (e.g., shown as part of a user graph). In one implementation, the device graph may be stored in the device graph database. For example, the device graph may be stored in the device graph database via a Cypher database command.

If the device has been seen previously, a DT for the device may be retrieved at 913. In one embodiment, the determination that the device has been seen previously may be made because the user returns for authentication using a previously seen device (e.g., a device the user used to enroll, a shared device shared with another user). In one implementation, the DT may be retrieved as part of the device search on the device graph database. For example, if the device search indicates that the device has been seen previously, the device search may provide the DT of the matching device graph in the device graph database.

Differences between the device data associated with the authentication request datastructure and device data identified by the DT in the device graph database may be determined at 915. For example, the device's browser fingerprint, IP address, phone number, GPS location, and/or the like may have changed since the last time the device has been seen (e.g., IP address is different but Apple ID and Browser Fingerprint are the same, IP address and Apple ID are the same but Browser Fingerprint is different). In one implementation, the determined differences may be stored temporarily (e.g., to be added to the device graph identified by the DT upon successful authentication). For example, a device graph with the determined differences may be stored temporarily (e.g., while the authentication of the user is in progress) in the device graph database.

Video stream data associated with the authentication request datastructure may be determined 917. For example, video stream data may include video data and/or audio data provided by the user's device. In one embodiment, video stream data may be used to identify the user using biometric data. In one implementation, the authentication request datastructure may be parsed (e.g., using PHP commands) to determine the video stream data (e.g., based on the value of the video_stream_data field). In some implementations, anti-spoof mechanisms (e.g., for video and/or audio capture) may be used to ensure that real live users are accepted while recorded images and audio are rejected. For example, a lip reading AI that can match the voice coming out of the microphone to movement of the lips of the face in the camera may be utilized as an anti-spoof mechanism.

Face data associated with the user may be determined from the video stream data at 919. In one embodiment, face data may be processed using a multi-threaded cloud architecture structured to process the video stream data for both face and voice identification simultaneously. In one implementation, the video data portion of the video stream data may be determined and/or further analyzed to determine the face data (e.g., to separate the user's face from the background).

A face print may be generated from the face data at 921. In one embodiment, the face print may be a (e.g., 3D) model datastructure of the user's face. In one implementation, the face print may be generated by transforming aspects of the user's facial features into a face print model datastructure. In some implementations, the face print may be generated using a 1-way transformation function that precludes reconstruction of a face image from the face print model datastructure.

Voice data associated with the user may be determined from the video stream data at 923. In one embodiment, voice data may be processed using a multi-threaded cloud architecture structured to process the video stream data for both face and voice identification simultaneously. In one implementation, the audio data portion of the video stream data may be determined and/or further analyzed to determine the voice data (e.g., to separate the user's voice from background noise).

A voice print may be generated from the voice data at 925. In one embodiment, the voice print may be a (e.g., 3D) model datastructure of the user's voice. In one implementation, the voice print may be generated by transforming aspects of the user's voice waveform into a voice print model datastructure. In some implementations, the voice print may be generated using a 1-way transformation function that precludes reconstruction of a voice file from the voice print model datastructure.

Cookie (e.g., for a website) and/or app (e.g., for an app) data may be determined at 927. In one embodiment, the cookie and/or app data may be stored by the device for a website or app (e.g., a merchant website/app) that implements BRTE authentication. For example, the cookie and/or app data may be specific to each website/app that implements BRTE authentication. In another example, the cookie and/or app data may be shared between websites/apps that implement BRTE authentication. In one implementation, the authentication request datastructure may be parsed (e.g., using PHP commands) to determine the cookie and/or app data (e.g., based on the value of the cookie_data field). For example, the cookie and/or app data may be structured to specify a user seed (WS) of the last user who successfully enrolled and/or authenticated with the BRTE (e.g., via the merchant website/app) on the device.

A determination may be made at 929 whether a WS was specified in the cookie and/or app data. If a WS was specified in the cookie and/or app data, a user token (WT) for a corresponding user (e.g., the last user who successfully enrolled and/or authenticated with the BRTE on the device) may be determined at 931. In one implementation (e.g., when the WT is a 16 digit random hex token), the WT may be determined by decrypting the WS with the DT (e.g., using TDES, AES, and/or the like decryption technique) to determine a face token (FT) and/or a voice token (VT), and then executing a search on a user graph database (e.g., using a Cypher database command) to determine the WT that corresponds to the determined FT and/or VT. In another implementation (e.g., when the WT is a 32 digit hex token formed by appending the FT and the VT), the WT may be determined by decrypting the WS with the DT (e.g., using TDES, AES, and/or the like decryption technique).

Face tokens (FTs) and/or voice tokens (VTs) linked with the WT in the user graph database may be determined at 933. In one embodiment, a priority matching feature that authenticates the user quickly (e.g., in less than 1 second) independent of how many users have enrolled in BRTE using biometric tokenization may be implemented by matching the generated face print against the determined FTs and/or the generated voice print against the determined VTs. In one implementation, FT nodes and/or VT nodes linked to a node corresponding to the WT may be determined. For example, FTs and/or VTs linked with the WT in the user graph database may be determined via a Cypher database command.

The generated face print may be matched against face prints corresponding to the determined FTs at 935. In one embodiment, the generated face print may be compared against a stored face print corresponding to each of the determined FTs to determine whether the respective FT is associated with a matching stored face print (e.g., the face match score (e.g., the probability that the two face prints being compared identify the same user) of the matching stored face print exceeds a threshold). In one implementation, a stored face print corresponding to a determined FT may be retrieved from a (e.g., face) biometric database for comparison against the generated face print. For example, a stored face print corresponding to a determined FT may be retrieved from the biometric database via a MySQL database command similar to the following:

SELECT FacePrintData
FROM FacePrintsTable
WHERE FacePrintID=FT;

In one implementation, matching against multiple stored face prints may provide improved robustness to facial recognition. For example, different face prints may belong to the same user but may be different in pose, angle, light conditions, clothing (e.g., hat), accessories (e.g., sunglasses, jewelry), and/or the like. In some implementations, an AI technique may be utilized for matching the generated face print against the stored face prints knowing that the stored face prints previously matched each other.

The generated voice print may be matched against voice prints corresponding to the determined VTs at 937. In one embodiment, the generated voice print may be compared against a stored voice print corresponding to each of the determined VTs to determine whether the respective VT is associated with a matching stored voice print (e.g., the voice match score (e.g., the probability that the two voice prints being compared identify the same user) of the matching stored voice print exceeds a threshold). In one implementation, a stored voice print corresponding to a determined VT may be retrieved from a (e.g., voice) biometric database for comparison against the generated voice print. For example, a stored voice print corresponding to a determined VT may be retrieved from the biometric database via a MySQL database command similar to the following:

SELECT VoicePrintData
FROM VoicePrintsTable
WHERE VoicePrintID=VT;

In one implementation, matching against multiple stored voice prints may provide improved robustness to voice verification. For example, different voice prints may belong to the same user but may be different in content, volume, background noise level, and/or the like. In some implementations, an AI technique may be utilized for matching the generated voice print against the stored voice prints knowing that the stored voice prints previously matched each other.

A determination may be made at 939 whether authentication of the user (e.g., priority matching) was successful. In one embodiment, the user may be considered to be authenticated if a matching stored face print and/or a matching stored voice print are found. See FIG. 10 for an example of an authentication flow. In one implementation, the face match score of the best matching (e.g., having the highest face match score) stored face print and/or the voice match score of the best matching (e.g., having the highest voice match score) stored voice print may be utilized to determine whether to authenticate the user. In another implementation, a face match score determined by an AI technique based on evaluation of face prints corresponding to the determined FTs and/or a voice match score determined by an AI technique based on evaluation of voice prints corresponding to the determined VTs may be utilized to determine whether to authenticate the user. See FIG. 12 for an example of an authentication rules table that shows how a face match score and/or a voice match score are utilized to determine whether to authenticate the user and/or whether to request additional authentication data (e.g., PII data) from the user using a set of authentication rules.

If authentication of the user was not successful (e.g., because the user is using a shared device shared with another user and the specified WS corresponds to the other user) or if a WS was not specified in the cookie and/or app data (e.g., because the user returns for authentication on a new device, because a cookie or app data is absent from the device), a user search on the user graph database may be executed at 941 to ascertain if the user is enrolled with the BRTE. In one embodiment, a normal matching feature that authenticates the user (e.g., in less than 10 seconds) may be implemented by matching the generated face print against face prints stored in the (e.g., face) biometric database and/or the generated voice print against voice prints stored in the (e.g., voice) biometric database. In one implementation, the best matching (e.g., having the highest face match score) stored face print may be utilized to determine a corresponding FT and/or the best matching (e.g., having the highest voice match score) stored voice print may be utilized to determine a corresponding VT, and a search on the user graph database may be executed (e.g., using a Cypher database command) to determine a WT linked with the determined FT and/or VT. For example, the WT may identify a matched user.

A determination may be made at 943 whether the matched user exceeds an authentication confidence threshold. In one embodiment, the matched user exceeds an authentication confidence threshold if the BRTE has high confidence in ascertaining the user's identity. In one implementation, the matched user exceeds a confidence threshold if the face match score and/or the voice match score satisfy a "green" rule shown in the authentication rules table of FIG. 12. If the matched user exceeds an authentication confidence threshold, the matched user may be considered to be authenticated.

If the matched user does not exceed an authentication confidence threshold, additional authentication data may be obtained from the user at 945 for additional authentication. For example, additional authentication data may include PII data (e.g., street number and zip code of the matched user's address). In another example, additional authentication data may include payment method data, secret question answer, a registration link sent to the device, and/or the like. In one implementation, the user may be prompted to provide the additional authentication data via a GUI, via an audio response, and/or the like of a website or app that implements BRTE authentication.

A determination may be made at 947 whether authentication of the user (e.g., normal matching) was successful. If authentication of the user was not successful (e.g., because the user failed to provide requested authentication information), an error message may be generated at 949. For example, the user may be informed that authentication failed and/or may be prompted to try authenticating again and/or to enroll with the BRTE.

If authentication of the user was successful, the DT of the user's device may be linked to the WT of the matched user at 951. In one implementation, a link to a node corresponding to the DT may be added to a node corresponding to the WT. For example, the DT may be linked to the WT via a Cypher database command. See FIG. 11 for an example, of how device tokens and user tokens may be linked if the user's device is a shared device shared with another user.

A WS for the matched user may be generated at 953. In one implementation (e.g., when the WT is a 16 digit random hex token), the WS may be generated by appending a FT and a VT linked with the WT of the matched user, and encrypting the result with the DT (e.g., using Triple DES (TDES), Advanced Encryption Standard (AES), and/or the like encryption technique) of the user's device to create another 32 digit hex token. In another implementation (e.g., when the WT is a 32 digit hex token formed by appending a FT and a VT), the WS may be generated by encrypting the WT of the matched user with the DT (e.g., using TDES, AES, and/or the like encryption technique) of the user's device to create another 32 digit hex token.

The WS may be provided to the user at 955. In one embodiment, the WS is provided to the user to be stored by the user's device in a cookie (e.g., for a website) or as app data (e.g., for an app). In one implementation, the WS may be provided to the user's device (e.g., directly or via an authentication website/app) via an authentication response (e.g., along with a login token).

If authentication of the user was successful (e.g., priority matching, normal matching), a FT for the generated face print may be generated at 957. For example, the FT may be a 16 digit random hex token. In one embodiment, the FT may be treated as a secret that is not revealed in the clear. In one implementation, the FT may be generated using a token generation service. For example, the token generation service may generate the FT in a way that avoids generating duplicate FT values. In another example, the token generation service may generate the FT value randomly and regenerate it if the FT already exists in the user graph database.

The best face prints may be stored in the (e.g., face) biometric database at 959. In one embodiment, a specified maximum number of face prints per user (e.g., up to 5 face prints per user) may be stored to make the priority matching fast. In one implementation, a quality metric associated with a face print (e.g., determined using an AI technique when generating a face print based on image resolution, light conditions, face occlusion, etc.) may be evaluated for the the generated face print and the stored face prints, and the face prints with the highest quality metrics may be stored in the biometric database and/or the corresponding FTs may be stored in the user graph database (e.g., while the face print with the lowest quality metric may be removed from the biometric database and/or the corresponding FT may be removed from the user graph database).

A VT for the generated voice print may be generated at 961. For example, the VT may be a 16 digit random hex token. In one embodiment, the VT may be treated as a secret that is not revealed in the clear. In one implementation, the VT may be generated using a token generation service. For example, the token generation service may generate the VT in a way that avoids generating duplicate VT values. In another example, the token generation service may generate the VT value randomly and regenerate it if the VT already exists in the user graph database.

The best voice prints may be stored in the (e.g., voice) biometric database at 963. In one embodiment, a specified maximum number of voice prints per user (e.g., up to 5 voice prints per user) may be stored to make the priority matching fast. In one implementation, a quality metric associated with a voice print (e.g., determined using an AI technique when generating a voice print based on sound quality, background noise level, etc.) may be evaluated for the generated voice print and the stored voice prints, and the voice prints with the highest quality metrics may be stored in the biometric database and/or the corresponding VTs may be stored in the user graph database (e.g., while the voice print with the lowest quality metric may be removed from the biometric database and/or the corresponding VT may be removed from the user graph database).

Differences in device data for the device may be added to the device graph database at 965. In one implementation, the determined differences (e.g., stored temporarily) may be added to the device graph identified by the DT (e.g., stored persistently) of the device in the device graph database (e.g., via a Cypher database command). For example, the device graph identified by the DT may be updated to have 2 IP addresses and/or 2 browser fingerprints once the determined differences are merged into the device graph.

A login token (LT) for a login session may be generated at 967. For example, the LT may be a 16 digit random hex token. In one implementation, the LT may be generated using a token generation service. For example, the token generation service may generate the LT in a way that avoids generating duplicate LT values. In another example, the token generation service may generate the LT value randomly and regenerate it if the LT already exists in the user graph database.

The LT may be linked to the WT at 969. In one implementation, a node corresponding to the LT (e.g., structured to be valid for a specified duration (e.g., 100 minutes)) may be added to the user graph database (e.g., with the duration stored as a property of the node (e.g., as an expiration date and/or time)) and a link to the LT node may be added to a node corresponding to the WT. For example, the LT may be linked to the WT via a Cypher database command.

The LT may be provided to the requesting browser/app at 971. In one embodiment, the LT may be provided to indicate successful authentication and may be utilized during a login session. In one implementation, the LT may be provided (e.g., directly or via an authentication website/app) via an authentication response.

FIG. 10 shows non-limiting, example embodiments of implementation case(s) for the BRTE. In FIG. 10, an exemplary flow to facilitate user authentication with the BRTE is illustrated. When a user attempts to authenticate with the BRTE, device data associated with the user is collected and a determination is made whether the user's device is a new device. A streaming session is started, and, depending on available hardware and/or permissions, the user's face and/or voice may be matched with stored face prints and/or voice prints, respectively. Depending on whether the user's device is recognized and/or whether matches have been found for the user's face and/or voice, the user may be authenticated, may be prompted to provide additional authentication data, may be prompted to enroll with the BRTE, and/or the like.

FIG. 11 shows non-limiting, example embodiments of implementation case(s) for the BRTE. In FIG. 11, an exemplary user graph showing how device tokens and user tokens may be linked if a user's device is a shared device shared with another user is illustrated. The user graph shows user tokens for user Luke associated with user token WT-A and for another user Luke's wife associated with user token WT-B. During enrollment, Luke enrolled with his device (e.g., Device A) associated with device token DT-A and Luke's wife enrolled with her device (e.g., Device B) associated with device token DT-B. When Luke uses his wife's device to authenticate with the BRTE, the user graph may be updated to link Luke's user token WT-A with device token DT-B of Device B. Cookie and/or app data on Device B may be updated with a new user seed that points to Luke's user token WT-A.

FIG. 12 shows non-limiting, example embodiments of implementation case(s) for the BRTE. In FIG. 12, an exem-plary authentication rules table that shows how a face match score and/or a voice match score are utilized to determine whether to authenticate a user using a set of authentication rules is illustrated. If the face match score and/or the voice match score satisfy a "green" rule shown in the authentica-tion rules table, the user may be authenticated. If the face match score and/or the voice match score satisfy an "orange" rule or a "yellow" rule shown in the authentication rules table, the user may be prompted to provide additional authentication data. If the face match score and/or the voice match score satisfy a "red" rule shown in the authentication rules table, the user may be prompted to enroll with the BRTE. If the face match score and/or the voice match score satisfy a "special case" rule shown in the authentication rules table, the user may be prompted to try authenticating again.

FIG. 13 shows non-limiting, example embodiments of implementation case(s) for the BRTE. In FIG. 13, an exem-plary implementation of BRTE authentication in a login system is illustrated. Using the login system, any developer can support biometric multi-factor authentication (MFA) based account creation, login and authentication scheme as an alternative to password or device-certificate based sys-tems. This allows any institution to securely use BRTE's biometric technology and biometric tokens to safeguard their user's private data and eliminate reliance on passwords and one-time passwords (OTPs) that are regularly compro-mised.

FIG. 14 shows non-limiting, example embodiments of implementation case(s) for the BRTE. In FIG. 14, an exem-plary implementation of BRTE authentication in a zero click checkout system is illustrated. Using the zero click checkout system, any merchant can accept payment from a user without the user entering their payment information on the merchant checkout page. In this system, the BRTE may also provide merchants a service to move to token based pay-ments processing by acting as a platform that sits between the merchant and the payments ecosystem and managing the tokenization process on merchant's behalf. In this use case, Luke's payments (e.g., Chase Visa credit card) may be automatically tokenized by the BRTE (e.g., utilizing the BRTE's integration with various issuers, acquirers, payment networks and payment gateways) depending on the mer-chant's technology setup and contracts. The BRTE may then appropriately pick the correct payment token to be used for a payment transaction depending on the originating mer-chant and the receiving payment provider preference and choice of tokenization technology.

FIGS. 15A-C show non-limiting, example embodiments of screenshots illustrating user interface(s) of the BRTE. In FIGS. 15A-C, an exemplary user interface (e.g., for a mobile device, for a website) utilized for BRTE authentication during a purchase transaction is illustrated. Screen 1505 shows that a user may add some items to a shopping cart, and may be prompted to say "Hello Wink" to continue checkout. Screen 1510 shows that the user may be prompted to verify the user's face and voice. Screen 1515 shows that the user's face was successfully verified. Screen 1520 shows that the user's voice was successfully verified. Screen 1525 shows that the user may review order details such as shipping address and contact info. Screen 1530 shows that the user may review order details such as payment infor-mation, promotions, ordered items and an order summary. Screen 1535 shows that the user may view an order confir-mation page.

Additional Alternative Embodiment Examples

The following alternative example embodiments provide a number of variations of some of the already discussed principles for expanded color on the abilities of the BRTE.

FIGS. 16A-C show non-limiting, example embodiments of implementation case(s) for the BRTE. In FIGS. 16A-C, alternative implementation cases of BRTE payment orchestration are illustrated.

FIGS. 17A-D show non-limiting, example embodiments of implementation case(s) for the BRTE. In FIGS. 17A-D, alternative implementation cases of BRTE privacy architecture are illustrated.

Additional embodiments may include:

1. A biometric transaction token apparatus, comprising:
at least one memory;
a component collection stored in the at least one memory;
at least one processor disposed in communication with the at least one memory, the at least one processor executing processor-executable instructions from the component collection, the component collection storage structured with processor-executable instructions comprising:
obtain, via the at least one processor, a user identifying media datastructure,
in which, the user identifying media datastructure is structured as any of: a media stream, in which the media stream is structured as any of: at least one photographic image file, an audio stream, a video stream;
analyze the user identifying media datastructure;
recognize identifying objects from the analyzed user identifying media datastructure,
in which the recognized identifying objects are structured as any of: an identifying biometric datastructure, an identifying device datastructure, an identifying digital certificate datastructure,
in which the identifying biometric datastructure is any of: a voice print, an identifying face image, an identifying face finger print, a finger print, an identifying video, an identifying video fingerprint, an identifying gesture,
in which an identifying gesture is any of: vocal repetition of a provided phrase, answering a challenge query, a textual selection of a payment method, a verbal selection of a payment method, a visual gesture selection of a payment method, a textual selection of a target payee, a verbal selection of a target payee, a visual selection of a target payee, a textual selection of at least one purchase item, a verbal selection of at least one purchase item, a visual selection of at least one purchase item,
in which the identifying device structure is structured as any of: a UUID, a MAC address, a browser fingerprint,
in which the identifying digital certificate datastructure is structured as any of: a token, a digital certificate, a cryptographic key;
search for a match in a user biometric token database with the recognized identifying objects;
recognize an identified user record from the search of the user biometric token database;
obtain a payment mechanism token from the recognized identified user record based on the identifying gesture;

provide an identified payment transaction datastructure to a payment processor,
in which the identified user payment transaction datastructure is structured including: the payment mechanism token,
the target payment method from the identifying gesture,
in which the identifying gesture is structured.
2. The apparatus of embodiment 1, in which the identified user payment transaction datastructure is structured to include the at least one purchase item.
3. The apparatus of embodiment 1, further comprising, in which the target payee provided to the payment processor is an intermediary proxy structured to obtain an authorization approval from the payment processor;
relaying the authorization approval to the target payee.
4. A biometric transaction token processor-readable, nontransient medium, the medium storing a component collection, the component collection storage structured with processor-executable instructions comprising:
obtain, via the at least one processor, a user identifying media datastructure,
in which, the user identifying media datastructure is structured as any of: a media stream, in which the media stream is structured as any of: at least one photographic image file, an audio stream, a video stream;
analyze the user identifying media datastructure;
recognize identifying objects from the analyzed user identifying media datastructure,
in which the recognized identifying objects are structured as any of: an identifying biometric datastructure, an identifying device datastructure, an identifying digital certificate datastructure,
in which the identifying biometric datastructure is any of: a voice print, an identifying face image, an identifying face finger print, a finger print, an identifying video, an identifying video fingerprint, an identifying gesture,
in which an identifying gesture is any of: vocal repetition of a provided phrase, answering a challenge query, a textual selection of a payment method, a verbal selection of a payment method, a visual gesture selection of a payment method, a textual selection of a target payee, a verbal selection of a target payee, a visual selection of a target payee, a textual selection of at least one purchase item, a verbal selection of at least one purchase item, a visual selection of at least one purchase item,
in which the identifying device structure is structured as any of: a UUID, a MAC address, a browser fingerprint,
in which the identifying digital certificate datastructure is structured as any of: a token, a digital certificate, a cryptographic key;
search for a match in a user biometric token database with the recognized identifying objects;
recognize an identified user record from the search of the user biometric token database;
obtain a payment mechanism token from the recognized identified user record based on the identifying gesture;
provide an identified payment transaction datastructure to a payment processor, in which the identified user payment transaction datastructure is structured including:
the payment mechanism token,
the target payee from the identifying gesture,
in which the identifying gesture is structured.

5. The medium of embodiment 4, in which the identified user payment transaction datastructure is structured to include the at least one purchase item.

6. The medium of embodiment 4, further comprising, in which the target payee provided to the payment processor is an intermediary proxy structured to obtain an authorization approval from the payment processor; relaying the authorization approval to the target payee.

7. A biometric transaction token processor-implemented system, comprising:
means to store a component collection;
means to process processor-executable instructions from the component collection, the component collection storage structured with processor-executable instructions including:
obtain, via the at least one processor, a user identifying media datastructure,
in which, the user identifying media datastructure is structured as any of: a media stream,
in which the media stream is structured as any of: at least one photographic image file, an audio stream, a video stream;
analyze the user identifying media datastructure;
recognize identifying objects from the analyzed user identifying media datastructure,
in which the recognized identifying objects are structured as any of: an identifying biometric datastructure, an identifying device datastructure, an identifying digital certificate datastructure,
in which the identifying biometric datastructure is any of: a voice print, an identifying face image, an identifying face finger print, a finger print, an identifying video, an identifying video fingerprint, an identifying gesture,
in which an identifying gesture is any of: vocal repetition of a provided phrase, answering a challenge query, a textual selection of a payment method, a verbal selection of a payment method, a visual gesture selection of a payment method, a textual selection of a target payee, a verbal selection of a target payee, a visual selection of a target payee, a textual selection of at least one purchase item, a verbal selection of at least one purchase item, a visual selection of at least one purchase item,
in which the identifying device structure is structured as any of: a UUID, a MAC address, a browser fingerprint,
in which the identifying digital certificate datastructure is structured as any of: a token, a digital certificate, a cryptographic key;
search for a match in a user biometric token database with the recognized identifying objects;
recognize an identified user record from the search of the user biometric token database;
obtain a payment mechanism token from the recognized identified user record based on the identifying gesture;
provide an identified payment transaction datastructure to a payment processor, in which the identified user payment transaction datastructure is structured including:
the payment mechanism token,
the target payee from the identifying gesture,
in which the identifying gesture is structured.

8. The system of embodiment 7, in which the identified user payment transaction datastructure is structured to include the at least one purchase item.

9. The system of embodiment 7, further comprising, in which the target payee provided to the payment processor is an intermediary proxy structured to obtain an authorization approval from the payment processor; relaying the authorization approval to the target payee.

10. A biometric transaction token process, including processing processor-executable instructions via at least one processor from a component collection stored in at least one memory, the component collection storage structured with processor-executable instructions comprising:
obtain, via the at least one processor, a user identifying media datastructure,
in which, the user identifying media datastructure is structured as any of: a media stream,
in which the media stream is structured as any of: at least one photographic image file, an audio stream, a video stream;
analyze the user identifying media datastructure;
recognize identifying objects from the analyzed user identifying media datastructure,
in which the recognized identifying objects are structured as any of: an identifying biometric datastructure, an identifying device datastructure, an identifying digital certificate datastructure,
in which the identifying biometric datastructure is any of: a voice print, an identifying face image, an identifying face finger print, a finger print, an identifying video, an identifying video fingerprint, an identifying gesture,
in which an identifying gesture is any of: vocal repetition of a provided phrase, answering a challenge query, a textual selection of a payment method, a verbal selection of a payment method, a visual gesture selection of a payment method, a textual selection of a target payee, a verbal selection of a target payee, a visual selection of a target payee, a textual selection of at least one purchase item, a verbal selection of at least one purchase item, a visual selection of at least one purchase item,
in which the identifying device structure is structured as any of: a UUID, a MAC address, a browser fingerprint,
in which the identifying digital certificate datastructure is structured as any of: a token, a digital certificate, a cryptographic key;
search for a match in a user biometric token database with the recognized identifying objects;
recognize an identified user record from the search of the user biometric token database;
obtain a payment mechanism token from the recognized identified user record based on the identifying gesture;
provide an identified payment transaction datastructure to a payment processor, in which the identified user payment transaction datastructure is structured including:

the payment mechanism token, the target payment method from the identifying gesture, in which the identifying gesture is structured.

11. The process of embodiment 10, in which the identified user payment transaction datastructure is structured to include the at least one purchase item.

12. The process of embodiment 10, further comprising, in which the target payee provided to the payment processor is an intermediary proxy structured to obtain an authorization approval from the payment processor;

relaying the authorization approval to the target payee.

101. A biometric authentication engine apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a device identifying datastructure associated with a user's device, in which the device identifying datastructure is structured as a set of datastructure fields specifying device data;

execute, via the at least one processor, a device search on a device graph database, with the device data as a set of search parameters, to determine a device record corresponding to the device in the device graph database;

retrieve, via the at least one processor, a device token specified via the device record from the device graph database;

obtain, via the at least one processor, a user identifying media datastructure, in which the user identifying media datastructure is structured as a media stream;

generate, via the at least one processor, a face print datastructure associated with the user from the media stream, in which the face print datastructure is generated by transforming aspects of the user's facial features with an image transformation function;

generate, via the at least one processor, a voice print datastructure associated with the user from the media stream, in which the voice print datastructure is generated by transforming aspects of the user's voice waveform with an audio transformation function;

obtain, via the at least one processor, a user seed identifying datastructure associated with the device, in which the user seed identifying datastructure is structured to specify a user seed;

determine, via the at least one processor, a user token by analyzing the user seed, in which the user seed analysis includes decrypting the user seed with the device token;

execute, via the at least one processor, a face token search on a user graph database, with the user token as a set of search parameters, to determine a set of face token records linked with a user token record corresponding to the user token;

determine, via the at least one processor, a face match score by matching the generated face print datastructure against a set of stored face print datastructures specified via the set of face token records;

execute, via the at least one processor, a voice token search on the user graph database, with the user token as a set of search parameters, to determine a set of voice token records linked with the user token record corresponding to the user token;

determine, via the at least one processor, a voice match score by matching the generated voice print datastructure against a set of stored voice print datastructures specified via the set of voice token records;

authenticate, via the at least one processor, the user by analyzing the face match score and the voice match score;

generate, via the at least one processor, a login token indicating successful authentication; and provide, via the at least one processor, the login token for the device.

102. The apparatus of embodiment 101, in which the device data is structured to include any of: a browser fingerprint, an IP address, a manufacturer device ID, a phone number, a GPS location.

103. The apparatus of embodiment 101, in which the device graph database and the user graph database are implemented via at least one graph database.

104. The apparatus of embodiment 101, in which the device search is executed using a rules-based machine learning system.

105. The apparatus of embodiment 101, in which the component collection storage is further structured with processor-executable instructions, comprising:

determine, via the at least one processor, a set of device data differences between the device data specified in the device identifying datastructure and device data specified in a device graph identified by the device token;

store, via the at least one processor, a temporary device graph that specifies the determined set of device data differences; and merge, via the at least one processor, the temporary device graph into the device graph identified by the device token upon successfully authenticating the user.

106. The apparatus of embodiment 101, in which the media stream is structured as at least one of: a video stream, an audio stream, a photographic image file, a voice audio file.

107. The apparatus of embodiment 101, in which the image transformation function is a 1-way transformation function that precludes reconstruction of a face image from the face print datastructure.

108. The apparatus of embodiment 101, in which the audio transformation function is a 1-way transformation function that precludes reconstruction of a voice file from the voice print datastructure.

109. The apparatus of embodiment 101, in which the user seed corresponds to the last user who was successfully authenticated while utilizing the device.

110. The apparatus of embodiment 101, in which the user seed is formed by appending a face token and a voice token, and encrypting the result with the device token.

111. The apparatus of embodiment 101, in which the set of stored face print datastructures and the set of stored voice print datastructures are stored in at least one relational database.

112. The apparatus of embodiment 101, in which the analysis of the face match score and the voice match score includes evaluating the face match score and the voice match score with a set of rules.

113. The apparatus of embodiment 101, in which the analysis of the face match score and the voice match score includes obtaining additional authentication data from the user, in which the additional authentication data is at least one of: personally identifiable information data, payment method data, secret question answer, actuation of a registration link.

114. The apparatus of embodiment 101, in which the login token is structured to be valid for a specified duration.

115. The apparatus of embodiment 101, in which the component collection storage is further structured with processor-executable instructions, comprising:
add, via the at least one processor, a login token record corresponding to the login token to the user graph database; and
link, via the at least one processor, the login token record to the user token record corresponding to the user token.

116. A biometric authentication engine processor-readable, non-transient medium, the medium storing a component collection, the component collection storage structured with processor-executable instructions comprising:
obtain, via the at least one processor, a device identifying datastructure associated with a user's device, in which the device identifying datastructure is structured as a set of datastructure fields specifying device data;
execute, via the at least one processor, a device search on a device graph database, with the device data as a set of search parameters, to determine a device record corresponding to the device in the device graph database;
retrieve, via the at least one processor, a device token specified via the device record from the device graph database;
obtain, via the at least one processor, a user identifying media datastructure, in which the user identifying media datastructure is structured as a media stream;
generate, via the at least one processor, a face print datastructure associated with the user from the media stream, in which the face print datastructure is generated by transforming aspects of the user's facial features with an image transformation function;
generate, via the at least one processor, a voice print datastructure associated with the user from the media stream, in which the voice print datastructure is generated by transforming aspects of the user's voice waveform with an audio transformation function;
obtain, via the at least one processor, a user seed identifying datastructure associated with the device, in which the user seed identifying datastructure is structured to specify a user seed;
determine, via the at least one processor, a user token by analyzing the user seed, in which the user seed analysis includes decrypting the user seed with the device token;
execute, via the at least one processor, a face token search on a user graph database, with the user token as a set of search parameters, to determine a set of face token records linked with a user token record corresponding to the user token;
determine, via the at least one processor, a face match score by matching the generated face print datastructure against a set of stored face print datastructures specified via the set of face token records;
execute, via the at least one processor, a voice token search on the user graph database, with the user token as a set of search parameters, to determine a set of voice token records linked with the user token record corresponding to the user token;
determine, via the at least one processor, a voice match score by matching the generated voice print datastructure against a set of stored voice print datastructures specified via the set of voice token records;
authenticate, via the at least one processor, the user by analyzing the face match score and the voice match score;
generate, via the at least one processor, a login token indicating successful authentication; and
provide, via the at least one processor, the login token for the device.

117. The medium of embodiment 116, in which the device data is structured to include any of: a browser fingerprint, an IP address, a manufacturer device ID, a phone number, a GPS location.

118. The medium of embodiment 116, in which the device graph database and the user graph database are implemented via at least one graph database.

119. The medium of embodiment 116, in which the device search is executed using a rules-based machine learning system.

120. The medium of embodiment 116, in which the component collection storage is further structured with processor-executable instructions, comprising:
determine, via the at least one processor, a set of device data differences between the device data specified in the device identifying datastructure and device data specified in a device graph identified by the device token;
store, via the at least one processor, a temporary device graph that specifies the determined set of device data differences; and
merge, via the at least one processor, the temporary device graph into the device graph identified by the device token upon successfully authenticating the user.

121. The medium of embodiment 116, in which the media stream is structured as at least one of: a video stream, an audio stream, a photographic image file, a voice audio file.

122. The medium of embodiment 116, in which the image transformation function is a 1-way transformation function that precludes reconstruction of a face image from the face print datastructure.

123. The medium of embodiment 116, in which the audio transformation function is a 1-way transformation function that precludes reconstruction of a voice file from the voice print datastructure.

124. The medium of embodiment 116, in which the user seed corresponds to the last user who was successfully authenticated while utilizing the device.

125. The medium of embodiment 116, in which the user seed is formed by appending a face token and a voice token, and encrypting the result with the device token.

126. The medium of embodiment 116, in which the set of stored face print datastructures and the set of stored voice print datastructures are stored in at least one relational database.

127. The medium of embodiment 116, in which the analysis of the face match score and the voice match score includes evaluating the face match score and the voice match score with a set of rules.

128. The medium of embodiment 116, in which the analysis of the face match score and the voice match score includes obtaining additional authentication data from the user, in which the additional authentication data is at least one of: personally identifiable information data, payment method data, secret question answer, actuation of a registration link.

129. The medium of embodiment 116, in which the login token is structured to be valid for a specified duration.

130. The medium of embodiment 116, in which the component collection storage is further structured with processor-executable instructions, comprising:

add, via the at least one processor, a login token record corresponding to the login token to the user graph database; and link, via the at least one processor, the login token record to the user token record corresponding to the user token.

131. A biometric authentication engine processor-implemented system, comprising:

means to store a component collection;

means to process processor-executable instructions from the component collection, the component collection storage structured with processor-executable instructions including:

obtain, via the at least one processor, a device identifying datastructure associated with a user's device, in which the device identifying datastructure is structured as a set of datastructure fields specifying device data;

execute, via the at least one processor, a device search on a device graph database, with the device data as a set of search parameters, to determine a device record corresponding to the device in the device graph database;

retrieve, via the at least one processor, a device token specified via the device record from the device graph database;

obtain, via the at least one processor, a user identifying media datastructure, in which the user identifying media datastructure is structured as a media stream;

generate, via the at least one processor, a face print datastructure associated with the user from the media stream, in which the face print datastructure is generated by transforming aspects of the user's facial features with an image transformation function;

generate, via the at least one processor, a voice print datastructure associated with the user from the media stream, in which the voice print datastructure is generated by transforming aspects of the user's voice waveform with an audio transformation function;

obtain, via the at least one processor, a user seed identifying datastructure associated with the device, in which the user seed identifying datastructure is structured to specify a user seed;

determine, via the at least one processor, a user token by analyzing the user seed, in which the user seed analysis includes decrypting the user seed with the device token;

execute, via the at least one processor, a face token search on a user graph database, with the user token as a set of search parameters, to determine a set of face token records linked with a user token record corresponding to the user token;

determine, via the at least one processor, a face match score by matching the generated face print datastructure against a set of stored face print datastructures specified via the set of face token records;

execute, via the at least one processor, a voice token search on the user graph database, with the user token as a set of search parameters, to determine a set of voice token records linked with the user token record corresponding to the user token;

determine, via the at least one processor, a voice match score by matching the generated voice print datastructure against a set of stored voice print datastructures specified via the set of voice token records;

authenticate, via the at least one processor, the user by analyzing the face match score and the voice match score;

generate, via the at least one processor, a login token indicating successful authentication; and provide, via the at least one processor, the login token for the device.

132. The system of embodiment 131, in which the device data is structured to include any of: a browser fingerprint, an IP address, a manufacturer device ID, a phone number, a GPS location.

133. The system of embodiment 131, in which the device graph database and the user graph database are implemented via at least one graph database.

134. The system of embodiment 131, in which the device search is executed using a rules-based machine learning system.

135. The system of embodiment 131, in which the component collection storage is further structured with processor-executable instructions, comprising:

determine, via the at least one processor, a set of device data differences between the device data specified in the device identifying datastructure and device data specified in a device graph identified by the device token;

store, via the at least one processor, a temporary device graph that specifies the determined set of device data differences; and merge, via the at least one processor, the temporary device graph into the device graph identified by the device token upon successfully authenticating the user.

136. The system of embodiment 131, in which the media stream is structured as at least one of: a video stream, an audio stream, a photographic image file, a voice audio file.

137. The system of embodiment 131, in which the image transformation function is a 1-way transformation function that precludes reconstruction of a face image from the face print datastructure.

138. The system of embodiment 131, in which the audio transformation function is a 1-way transformation function that precludes reconstruction of a voice file from the voice print datastructure.

139. The system of embodiment 131, in which the user seed corresponds to the last user who was successfully authenticated while utilizing the device.

140. The system of embodiment 131, in which the user seed is formed by appending a face token and a voice token, and encrypting the result with the device token.

141. The system of embodiment 131, in which the set of stored face print datastructures and the set of stored voice print datastructures are stored in at least one relational database.

142. The system of embodiment 131, in which the analysis of the face match score and the voice match score includes evaluating the face match score and the voice match score with a set of rules.

143. The system of embodiment 131, in which the analysis of the face match score and the voice match score includes obtaining additional authentication data from the user, in which the additional authentication data is at least one of: personally identifiable information data, payment method data, secret question answer, actuation of a registration link.

144. The system of embodiment 131, in which the login token is structured to be valid for a specified duration.

145. The system of embodiment 131, in which the component collection storage is further structured with processor-executable instructions, comprising:
add, via the at least one processor, a login token record corresponding to the login token to the user graph database; and
link, via the at least one processor, the login token record to the user token record corresponding to the user token.

146. A biometric authentication engine processor-implemented process, including processing processor-executable instructions via at least one processor from a component collection stored in at least one memory, the component collection storage structured with processor-executable instructions comprising:
obtain, via the at least one processor, a device identifying datastructure associated with a user's device, in which the device identifying datastructure is structured as a set of datastructure fields specifying device data;
execute, via the at least one processor, a device search on a device graph database, with the device data as a set of search parameters, to determine a device record corresponding to the device in the device graph database;
retrieve, via the at least one processor, a device token specified via the device record from the device graph database;
obtain, via the at least one processor, a user identifying media datastructure, in which the user identifying media datastructure is structured as a media stream;
generate, via the at least one processor, a face print datastructure associated with the user from the media stream, in which the face print datastructure is generated by transforming aspects of the user's facial features with an image transformation function;
generate, via the at least one processor, a voice print datastructure associated with the user from the media stream, in which the voice print datastructure is generated by transforming aspects of the user's voice waveform with an audio transformation function;

obtain, via the at least one processor, a user seed identifying datastructure associated with the device, in which the user seed identifying datastructure is structured to specify a user seed;
determine, via the at least one processor, a user token by analyzing the user seed, in which the user seed analysis includes decrypting the user seed with the device token;
execute, via the at least one processor, a face token search on a user graph database, with the user token as a set of search parameters, to determine a set of face token records linked with a user token record corresponding to the user token;
determine, via the at least one processor, a face match score by matching the generated face print datastructure against a set of stored face print datastructures specified via the set of face token records;
execute, via the at least one processor, a voice token search on the user graph database, with the user token as a set of search parameters, to determine a set of voice token records linked with the user token record corresponding to the user token;
determine, via the at least one processor, a voice match score by matching the generated voice print datastructure against a set of stored voice print datastructures specified via the set of voice token records;
authenticate, via the at least one processor, the user by analyzing the face match score and the voice match score;
generate, via the at least one processor, a login token indicating successful authentication; and provide, via the at least one processor, the login token for the device.

147. The process of embodiment 146, in which the device data is structured to include any of: a browser fingerprint, an IP address, a manufacturer device ID, a phone number, a GPS location.

148. The process of embodiment 146, in which the device graph database and the user graph database are implemented via at least one graph database.

149. The process of embodiment 146, in which the device search is executed using a rules-based machine learning system.

150. The process of embodiment 146, in which the component collection storage is further structured with processor-executable instructions, comprising:
determine, via the at least one processor, a set of device data differences between the device data specified in the device identifying datastructure and device data specified in a device graph identified by the device token;
store, via the at least one processor, a temporary device graph that specifies the determined set of device data differences; and
merge, via the at least one processor, the temporary device graph into the device graph identified by the device token upon successfully authenticating the user.

151. The process of embodiment 146, in which the media stream is structured as at least one of: a video stream, an audio stream, a photographic image file, a voice audio file.

152. The process of embodiment 146, in which the image transformation function is a 1-way transformation function that precludes reconstruction of a face image from the face print datastructure.

153. The process of embodiment 146, in which the audio transformation function is a 1-way transformation function that precludes reconstruction of a voice file from the voice print datastructure.

154. The process of embodiment 146, in which the user seed corresponds to the last user who was successfully authenticated while utilizing the device.

155. The process of embodiment 146, in which the user seed is formed by appending a face token and a voice token, and encrypting the result with the device token.

156. The process of embodiment 146, in which the set of stored face print datastructures and the set of stored voice print datastructures are stored in at least one relational database.

157. The process of embodiment 146, in which the analysis of the face match score and the voice match score includes evaluating the face match score and the voice match score with a set of rules.

158. The process of embodiment 146, in which the analysis of the face match score and the voice match score includes obtaining additional authentication data from the user, in which the additional authentication data is at least one of: personally identifiable information data, payment method data, secret question answer, actuation of a registration link.

159. The process of embodiment 146, in which the login token is structured to be valid for a specified duration.

160. The process of embodiment 146, in which the component collection storage is further structured with processor-executable instructions, comprising:
add, via the at least one processor, a login token record corresponding to the login token to the user graph database; and
link, via the at least one processor, the login token record to the user token record corresponding to the user token.

171. The apparatus of embodiment 101, in which the image transformation function is a one way vectorization function.

172. The medium of embodiment 116, in which the image transformation function is a one way vectorization function.

173. The system of embodiment 131, in which the image transformation function is a one way vectorization function.

174. The process of embodiment 146, in which the image transformation function is a one way vectorization function.

181. The apparatus of embodiment 101, in which the component collection storage is further structured with processor-executable instructions, comprising:
provide, via the at least one processor, a payment token associated with the authenticated user to a checkout apparatus.

182. The apparatus of embodiment 181, in which the payment token corresponds to at least one of: a default payment method, a spoken payment method.

183. The apparatus of embodiment 181, in which the checkout apparatus is at least one of: a website, an app, a point of sale terminal, a kiosk, a car.

184. The medium of embodiment 116, in which the component collection storage is further structured with processor-executable instructions, comprising:
provide, via the at least one processor, a payment token associated with the authenticated user to a checkout apparatus.

185. The medium of embodiment 184, in which the payment token corresponds to at least one of: a default payment method, a spoken payment method.

186. The medium of embodiment 184, in which the checkout apparatus is at least one of: a website, an app, a point of sale terminal, a kiosk, a car.

187. The system of embodiment 131, in which the component collection storage is further structured with processor-executable instructions, comprising:
provide, via the at least one processor, a payment token associated with the authenticated user to a checkout apparatus.

188. The system of embodiment 187, in which the payment token corresponds to at least one of: a default payment method, a spoken payment method.

189. The system of embodiment 187, in which the checkout apparatus is at least one of: a website, an app, a point of sale terminal, a kiosk, a car.

190. The process of embodiment 146, in which the component collection storage is further structured with processor-executable instructions, comprising:
provide, via the at least one processor, a payment token associated with the authenticated user to a checkout apparatus.

191. The process of embodiment 190, in which the payment token corresponds to at least one of: a default payment method, a spoken payment method.

192. The process of embodiment 190, in which the checkout apparatus is at least one of: a website, an app, a point of sale terminal, a kiosk, a car.

199. In some embodiments, a user may enroll into the BRTE using a 1st channel (e.g., using a mobile app in a mobile phone), but may make a transaction on a 2nd channel (e.g., a camera enabled point of sale device in a physical store) or a 3rd channel (e.g., a voice assistant enabled car), where the 2nd and the 3rd channels do not require new enrollments.

BRTE Controller

FIG. 18 shows a block diagram illustrating non-limiting, example embodiments of a BRTE controller. In this embodiment, the BRTE controller 1801 may serve to aggregate, process, store, search, serve, identify, instruct, generate, match, and/or facilitate interactions with a computer through biometric recognition and cryptographic tokens technologies, and/or other related data.

Users, which may be people and/or other systems, may engage information technology systems (e.g., computers) to facilitate information processing. In turn, computers employ processors to process information; such processors 1803 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the BRTE controller 1801 may be connected to and/or communicate with entities such as, but not limited to: one or more users from peripheral devices 1812 (e.g., user input devices 1811); an optional cryptographic processor device 1828; and/or a communications network 1813.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The BRTE controller 1801 may be based on computer systems that may comprise, but are not limited to, components such as: a computer systemization 1802 connected to memory 1829.

Computer Systemization

A computer systemization 1802 may comprise a clock 1830, central processing unit ("CPU(s)" and/or "processor(s)" (these terms are used interchangeably throughout the disclosure unless noted to the contrary)) 1803, a memory 1829 (e.g., a read only memory (ROM) 1806, a random access memory (RAM) 1805, etc.), and/or an interface bus 1807, and most frequently, although not necessarily, are all interconnected and/or communicating through a system bus 1804 on one or more (mother)board(s) 1802 having conductive and/or otherwise transportive circuit pathways through which instructions (e.g., binary encoded signals) may travel to effectuate communications, operations, storage, etc. The computer systemization may be connected to a power source 1886; e.g., optionally the power source may be internal. Optionally, a cryptographic processor 1826 may be connected to the system bus. In another embodiment, the cryptographic processor, transceivers (e.g., ICs) 1874, and/or sensor array (e.g., accelerometer, altimeter, ambient light, barometer, global positioning system (GPS) (thereby allowing BRTE controller to determine its location), gyroscope, magnetometer, pedometer, proximity, ultra-violet sensor, etc.) 1873 may be connected as either internal and/or external peripheral devices 1812 via the interface bus I/O 1808 (not pictured) and/or directly via the interface bus 1807. In turn, the transceivers may be connected to antenna(s) 1875, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1829 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the BRTE controller and beyond through various interfaces. Should processing requirements dictate a greater amount speed and/or capacity, distributed processors (e.g., see Distributed BRTE below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the BRTE may be achieved by implementing a microcontroller such as CAST's® R8051XC2 microcontroller; Diligent's® Basys 3 Artix-7, Nexys A7-100T, U192015125IT, etc.; Intel's® MCS 51 (i.e., 8051 microcontroller); and/or the like. Also, to implement certain features of the BRTE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the BRTE component collection (distributed or otherwise) and/or features may be implemented via the microprocessor and/or via embedded components; e.g., via ASIC, coprocessor, DSP, FPGA, and/or the like. Alternately, some implementations of the BRTE may be implemented with embedded components that are configured and used to achieve a variety of features or signal processing.

Depending on the particular implementation, the embedded components may include software solutions, hardware solutions, and/or some combination of both hardware/software solutions. For example, BRTE features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the BRTE features. A hierarchy of programmable interconnects allow logic blocks to be interconnected as needed by the BRTE system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the BRTE may be developed on FPGAs and then migrated into a fixed version that more resembles ASIC implementations. Alternate or coordinating implementations may migrate BRTE controller features to a final ASIC instead of or in addition to FPGAs. Depending on the implementation all of the aforementioned embedded components and microprocessors may be considered the "CPU" and/or "processor" for the BRTE.

Power Source

The power source 1886 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1886 is connected to at least one of the interconnected subsequent components of the BRTE thereby providing an electric current to all subsequent components. In one example, the power source 1886 is connected to the system bus component 1804. In an alternative embodiment, an outside power source 1886 is provided through a connection across the I/O 1808 interface. For example, Ethernet (with power on Ethernet), IEEE 1394, USB and/or the like connections carry both data and power across the connection and is therefore a suitable source of power.

Interface Adapters

Interface bus(ses) 1807 may accept, connect, and/or communicate to a number of interface adapters, variously although not necessarily in the form of adapter cards, such as but not limited to: input output interfaces (I/O) 1808, storage interfaces 1809, network interfaces 1810, and/or the like. Optionally, cryptographic processor interfaces 1827 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1809 may accept, communicate, and/or connect to a number of storage devices such as, but not limited to: (removable) storage devices 1814, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 1810 may accept, communicate, and/or connect to a communications network 1813. Through a communications network 1813, the BRTE controller is accessible through remote clients 1833*b* (e.g., computers with web browsers) by users 1833*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed BRTE below), architectures may similarly be employed to pool, load balance, and/or otherwise decrease/increase the communicative bandwidth required by the BRTE controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1810 may be used to engage with various communications network types 1813. For example, multiple network interfaces may be employed to allow for the communication over broadcast, multicast, and/or unicast networks.

Input Output interfaces (I/O) 1808 may accept, communicate, and/or connect to user, peripheral devices 1812 (e.g., input devices 1811), cryptographic processor devices 1828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1812 may be connected and/or communicate to I/O and/or other facilities of the like such as network interfaces, storage interfaces, directly to the interface bus, system bus, the CPU, and/or the like. Peripheral devices may be external, internal and/or part of the BRTE controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1811 often are a type of peripheral device 512 (see above) and may include: accelerometers, camaras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the BRTE controller may be embodied as an embedded, dedicated, and/or monitor-less (i.e., headless) device, and access may be provided over a network interface connection.

Cryptographic units such as, but not limited to, microcontrollers, processors 1826, interfaces 1827, and/or devices 1828 may be attached, and/or communicate with the BRTE controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1829. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the BRTE controller and/or a computer systemization may employ various forms of memory 1829. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 1829 will include ROM 1806, RAM 1805, and a storage device 1814. A storage device 1814 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 1829 may contain a collection of processor-executable application/library/program and/or database components (e.g., including processor-executable instructions) and/or data such as, but not limited to: operating system component(s) 1815 (operating system); information server component(s) 1816 (information server); user interface component(s) 1817 (user interface); Web browser component(s) 1818 (Web browser); database(s) 1819; mail server component(s) 1821; mail client component(s) 1822; cryptographic server component(s) 1820 (cryptographic server); machine learning component 1823; distributed immutable ledger component 1824; the BRTE component(s) 1835 (e.g., which may include EP, AP 1841-1842, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 1814, they may also be loaded and/or stored in memory such as: cache, peripheral devices, processor registers, RAM, remote storage facilities through a communications network, ROM, various forms of memory, and/or the like.

Operating System

The operating system component 1815 is an executable program component facilitating the operation of the BRTE controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD@, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like.

An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the BRTE controller to communicate with other entities through a communications network 1813. Various communication protocols may be used by the BRTE controller as a subcarrier transport mechanism for interaction, such as, but not limited to: multicast, TCP/IP, UDP, unicast, and/or the like.

Information Server

An information server component 1816 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the BRTE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the BRTE database 1819, operating systems, other program components, user interfaces, Web browsers, and/or the like.

Access to the BRTE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the BRTE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the BRTE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, and/or the like, any of which may be used and) provide a baseline and mechanism of accessing and displaying information graphically to users.

A user interface component 1817 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1818 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the BRTE enabled nodes. The combined application may be nugatory on systems employing Web browsers.

Mail Server

A mail server component 1821 is a stored program component that is executed by a CPU 1803. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the BRTE. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the BRTE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1822 is a stored program component that is executed by a CPU 1803. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1820 is a stored program component that is executed by a CPU 1803, cryptographic processor 1826, cryptographic processor interface 1827, cryptographic processor device 1828, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the BRTE may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the BRTE component to engage in secure transactions if so desired. The cryptographic component facilitates the secure accessing of resources on the BRTE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the BRTE includes a machine learning component 1823, which may be a stored program component that is executed by a CPU 1803. The machine learning component, alternatively, may run on a set of specialized processors, ASICs, FPGAs, GPUs, and/or the like. The machine learning component may be deployed to execute serially, in parallel, distributed, and/or the like, such as by utilizing cloud computing. The machine learning component may employ an ML platform such as Amazon SageMaker, Azure Machine Learning, DataRobot AI Cloud, Google AI Platform, IBM Watson® Studio, and/or the like. The machine learning component may be implemented using an ML framework such as PyTorch, Apache MXNet, MathWorks Deep Learning Toolbox, scikit-learn, TensorFlow, XGBoost, and/or the like. The machine learning component facilitates training and/or testing of ML prediction logic data structures (e.g., models) and/or utilizing ML prediction logic data structures (e.g., models) to output ML predictions by the BRTE. The machine learning component may employ various artificial intelligence and/or learning mechanisms such as Reinforcement Learning, Supervised Learning, Unsupervised Learning, and/or the like. The machine learning component may employ ML prediction logic data structure (e.g., model) types such as Bayesian Networks, Classification prediction logic data structures (e.g., models), Decision Trees, Neural Networks (NNs), Regression prediction logic data structures (e.g., models), and/or the like.

Distributed Immutable Ledger (DIL)

In one non limiting embodiment, the BRTE includes a distributed immutable ledger component 1824, which may be a stored program component that is executed by a CPU 1803. The distributed immutable ledger component, alternatively, may run on a set of specialized processors, ASICs, FPGAs, GPUs, and/or the like. The distributed immutable ledger component may be deployed to execute serially, in parallel, distributed, and/or the like, such as by utilizing a peer-to-peer network. The distributed immutable ledger component may be implemented as a blockchain (e.g., public blockchain, private blockchain, hybrid blockchain) that comprises cryptographically linked records (e.g., blocks). The distributed immutable ledger component may employ a platform such as Bitcoin, Bitcoin Cash, Dogecoin, Ethereum, Litecoin, Monero, Zcash, and/or the like. The distributed immutable ledger component may employ a consensus mechanism such as proof of authority, proof of space, proof of steak, proof of work, and/or the like. The distributed immutable ledger component may be used to provide functionality such as data storage, cryptocurrency, inventory tracking, non-fungible tokens (NFTs), smart contracts, and/or the like.

The BRTE Database

The BRTE database component 1819 may be embodied in a database and its stored data. The database is a stored program component, which is executed by the CPU; the stored program component portion configuring the CPU to process the stored data. The database may be a fault tolerant, relational, scalable, secure database such as Claris File-Maker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the BRTE database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the BRTE database is implemented as a data-structure, the use of the BRTE database 1819 may be integrated into another component such as the BRTE component 1835. Also, the database may be implemented as a mix of data structures, objects, programs, relational structures, scripts, and/or the like. Databases may be consolidated and/or distributed in countless variations (e.g., see Distributed BRTE below). Portions of databases, e.g., tables, may be exported and/or imported and thus decentralized and/or integrated.

In another embodiment, the database component (and/or other storage mechanism of the BRTE) may store data immutably so that tampering with the data becomes physically impossible and the fidelity and security of the data may be assured. In some embodiments, the database may be stored to write only or write once, read many (WORM) mediums. In another embodiment, the data may be stored on distributed ledger systems (e.g., via blockchain) so that any tampering to entries would be readily identifiable. In one embodiment, the database component may employ the distributed immutable ledger component DIL 1824 mechanism.

In one embodiment, the database component 1819 includes several tables representative of the schema, tables, structures, keys, entities and relationships of the described database 1819*a-k:*

An accounts table 1819*a* includes fields such as, but not limited to: an accountID, accountOwnerID, account-ContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, link-WalletsID, accountPrioritAccaountRatio, accountAddress, accountState, accountZIPcode, accountCountry, accountEmail, accountPhone, accountAuthKey, accountIPaddress, accountURLAccessCode, account-PortNo, accountAuthorizationCode, accountAccess-Privileges, accountPreferences, accountRestrictions, and/or the like;

A users table 1819*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a BRTE)—it is to be understood that, in some embodiments, the actual user data may be stored in a separate GDPR compliant vault while the BRTE database may contain a user data token that points to that external data (e.g., other data in the BRTE database (e.g., as shown in the other database tables) may be tokenized in a similar fashion);

An devices table 1819*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_ location, sensor_value, pin_reading, data length, channel_requirement, sensor_name, sensor_model_no, sensor_manufacturer, sensor_type, sensor_serial_number, sensor_power_requirement, device_power_requirement, location, sensor_associated_tool, sensor_ dimensions, device_dimensions, sensor_communications_type, device_communications_type, power_percentage, power_condition, temperature_setting, speed_ adjust, hold_duration, part_actuation, and/or the like. Device table may, in some embodiments, include fields corresponding to one or more Bluetooth profiles, such as those published at https://www.bluetooth.org/en-us/ specification/adopted-specifications, and/or other device specifications, and/or the like;

An apps table 1819*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1819*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannel-Name, assetTargetChannelID, assetTargetChannel-Type, assetTargetChannelName, assetName, asset-SeriesName, assetSeriesSeason, assetSeriesEpisode, assetCode, assetQuantity, assetCost, assetPrice, assetValue, assetManufactuer, assetModelNo, assetSe-rialNo, assetLocation, assetAddress, assetState, assetZ-IPcode, assetState, assetCountry, assetEmail, assetI-Paddress, assetURLaccessCode, assetOwnerAcco-untID, subscriptionIDs, assetAuthroizationCode, assetAccessPrivileges, assetPreferences, assetRestric-tions, assetAPI, assetAPIconnectionAddress, and/or the like;

A payments table 1819*f* includes fields such as, but not limited to: paymentID, accountID, userID, couponID, couponValue, couponConditions, couponExpiration, paymentType, paymentAccountNo, paymentAccount-Name, paymentAccountAuthorizationCodes, paymen-tExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLac-cessCode, paymentPortNo, paymentAccessPrivileges, paymentPreferences, payementRestrictions, and/or the like—it is to be understood that, in some embodiments, the payment data clear values may be stored by Visa/MC/Amex/Discover/etc. or with other payment issuers while the BRTE database may contain a payment data token that points to that external data;

An transactions table 1819*g* includes fields such as, but not limited to: transactionID, accountID, assetIDs, deviceIDs, paymentIDs, transactionIDs, userID, mer-chantID, transactionType, transactionDate, transaction-Time, transactionAmount, transactionQuantity, trans-actionDetails, productsList, productType, productTitle, productsSummary, productParamsList, transactionNo, transactionAccessPrivileges, transactionPreferences, transactionRestrictions, merchantAuthKey, merchant-AuthCode, and/or the like;

An merchants table 1819*h* includes fields such as, but not limited to: merchantID, merchantTaxID, merchante-Name, merchantContactUserID, accountID, issuerID, acquirerID, merchantEmail, merchantAddress, mer-chantState, merchantZIPcode, merchantCountry, mer-chantAuthKey, merchantIPaddress, portNum, mer-chantURLaccessCode, merchantPortNo, merchantAccessPrivileges, merchantPreferences, mer-chantRestrictions, and/or the like;

An ads table 1819*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTem-plateData, adSourceID, adSourceName, adSource-ServerIP, adSourceURL, adSourceSecurityProtocol, adSourceFTP, adAuthKey, adAccessPrivileges, adPref-erences, adRestrictions, adNetworkXchangeID, adNet-workXchangeName, adNetworkXchangeCost, adNet-workXchangeMetricType (e.g., CPA, CPC, CPM, CTR, etc.), adNetworkXchangeMetricValue, adNet-workXchangeServer, adNetworkXchangePortNumber, publisherID, publisherAddress, publisherURL, pub-lisherTag, publisherIndustry, publisherName, publish-erDescription, siteDomain, siteURL, siteContent, siteTag, siteContext, siteImpression, siteVisits, site-Headline, sitePage, siteAdPrice, sitePlacement, sitePosition, bidID, bidExchange, bidOS, bidTarget, bid-Timestamp, bidPrice, bidImpressionID, bidType, bidScore, adType (e.g., mobile, desktop, wearable, largescreen, interstitial, etc.), assetID, merchantID, deviceID, userID, accountID, impressionID, impres-sionOS, impressionTimeStamp, impressionGeo, impressionAction, impressionType, impressionPub-lisherID, impressionPublisherURL, and/or the like;

An ML table 1819*j* includes fields such as, but not limited to: MLID, predictionLogicStructureID, predictionLog-icStructureType, predictionLogicStructureConfigura-tion, predictionLogicStructureTrainedStructure, pre-dictionLogicStructureTrainingData, prediction-LogicStructureTrainingDataConfiguration, prediction-LogicStructureTestingData, predictionLogicStruc-tureTestingDataConfiguration, predictionLogicStruc-tureOutputData, predictionLogicStructureOutputData-Configuration, and/or the like;

A tokens table 1819*k* includes fields such as, but not limited to: deviceTokenID, deviceData, faceTokenID, facePrintData, facePrintQualityMetric, voiceTokenID, voicePrintData, voicePrintQualityMetric, contactTo-kenID, contactData, paymentTokenID, paymentData, loginTokenID, loginSessionData, userTokenID, user-TokenLinkedTokenIDs, and/or the like.

In one embodiment, the BRTE database may interact with other database systems. For example, employing a distrib-uted database system, queries and data access by search BRTE component may treat the combination of the BRTE database, an integrated data security layer database as a single database entity (e.g., see Distributed BRTE below).

In one embodiment, user programs may contain various user interface primitives, which may serve to update the BRTE. Also, various accounts may require custom database tables depending upon the environments and the types of clients the BRTE may need to serve. It should be noted that any unique fields may be designated as a key field through-out. In an alternative embodiment, these tables have been decentralized into their own databases and their respective database controllers (i.e., individual database controllers for each of the above tables). The BRTE may also be configured to distribute the databases over several computer system-izations and/or storage devices. Similarly, configurations of the decentralized database controllers may be varied by consolidating and/or distributing the various database com-ponents 1819*a*-*k*. The BRTE may be configured to keep track of various settings, inputs, and parameters via database controllers.

The BRTE database may communicate to and/or with other components in a component collection, including itself, and/or facilities of the like. Most frequently, the BRTE database communicates with the BRTE component, other program components, and/or the like. The database may contain, retain, and provide information regarding other nodes and data.

The BRTEs

The BRTE component 1835 is a stored program compo-nent that is executed by a CPU via stored instruction code configured to engage signals across conductive pathways of the CPU and ISICI controller components. In one embodi-ment, the BRTE component incorporates any and/or all combinations of the aspects of the BRTE that were discussed in the previous figures. As such, the BRTE affects accessing, obtaining and the provision of information, services, trans-actions, and/or the like across various communications networks. The features and embodiments of the BRTE discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the BRTE's features and facilities, and in many cases reduce the costs, energy consumption/requirements, and extend the life of BRTE's underlying infrastructure; this has the added benefit of making the BRTE more reliable. Similarly, many of the features and mechanisms are designed to be easier for users to use and access, thereby broadening the audience that may enjoy/employ and exploit the feature sets of the BRTE; such ease of use also helps to increase the reliability of the BRTE. In addition, the feature sets include heightened security as noted via the Cryptographic components 1820, 1826, 1828 and throughout, making access to the features and data more reliable and secure The BRTE transforms enrollment input, authentication input datastructure/inputs, via BRTE components (e.g., EP, AP), into enrollment output, authentication output outputs.

The BRTE component facilitates access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo!® User Interface; and/or the like), WebObjects®, and/or the like. In one embodiment, the BRTE server employs a cryptographic server to encrypt and decrypt communications. The BRTE component may communicate to and/or with other components in a component collection, including itself, and/or facilities of the like. Most frequently, the BRTE component communicates with the BRTE database, operating systems, other program components, and/or the like. The BRTE may contain, communicate, generate, obtain, and/or provide program component, system, user, and/or data communications, requests, and/or responses.

Distributed BRTEs

The structure and/or operation of any of the BRTE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the BRTE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for BRTE controller and/or BRTE component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the BRTE controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
//set ip address and port to listen to for incoming data
$address=192.168.0.100';
$port=255;
//create a server-side SSL socket, listen for/accept incom-
    ing communication
$sock=socket_create(AF_INET, SOCK_STREAM, 0);
socket_bind($sock, $address, $port) or die('Could not
    bind to address');
socket_listen($sock);
$client=socket_accept($sock);
//read input data from client device in 1024 byte blocks
    until end of message do {
    $input=
    $input=socket_read($client, 1024);
    $data=$input;
}while($input !=" ");
//parse data to extract variables
$obj=json_decode($data, true);
//store input data in a database
mysql_connect("201.408.185.132", $DBserver, $pass-
    word); //access database server
mysql_select("CLIENT_DB.SQL"); //select database to
    append
mysql_query("INSERT INTO UserTable (transmission)
VALUES ($data)"); //add data to UserTable table in a
    CLIENT database
mysql_close("CLIENT_DB.SQL"); //close connection to
    database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
    index.jsp?topic=/com.ibm.IBMDI.d
    oc/referenceguide295.htm and other parser implementations:

http://publib.boulder.ibm.com/infocenter/tivihelp/v2r1/
    index.jsp?topic=/com.ibm.IBMDI.d
    oc/referenceguide259.htm all of which are hereby expressly incorporated by reference.

In order to address various issues and advance the art, the entirety of this application for Biometric Recognition and Transaction Engine Apparatuses, Processes and Systems (including the Cover Page, Tide, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such.

Terms such as "attached", "affixed", "connected", "coupled", "interconnected", etc. may refer to a relationship where structures are secured or attached to one another either directly or indirectly through intervening structures, as well as both movable or rigid attachments or relation- ships, unless expressly described otherwise. Furthermore, it is to be understood that such features are not limited to serial execution, but rather, any number of threads, processes, services, servers, and/or the like that may execute asynchro- nously, concurrently, in parallel, simultaneously, synchro- nously, and/or the like are contemplated by the disclosure. As such, some of these features may be mutually contra- dictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/ or the like thereof. As such, it should be understood that advantages, embodiments, examples, functional, features, logical, operational, organizational, structural, topological, and/or other aspects of the disclosure are not to be consid- ered limitations on the disclosure as defined by the claims or limitations on equivalents to the claims. It is to be under- stood that, depending on the particular needs and/or char- acteristics of a BRTE individual and/or enterprise user, database configuration and/or relational model, data type, data transmission and/or network framework, library, syntax structure, and/or the like, various embodiments of the BRTE, may be implemented that allow a great deal of flexibility and customization. For example, aspects of the BRTE may be adapted for voice assistants, encryption payment systems, security systems, etc. While various embodiments and dis- cussions of the BRTE have included biometric recognition and cryptographic tokens, however, it is to be understood that the embodiments described herein may be readily configured and/or customized for a wide variety of other applications and/or implementations.

What is claimed is:

1. A biometric authentication engine apparatus, compris- ing:

at least one memory;

a component collection stored in the at least one memory;

at least one processor disposed in communication with the at least one memory, the at least one processor execut- ing processor-executable instructions from the compo- nent collection, the component collection storage struc- tured with processor-executable instructions, comprising:

obtain, via the at least one processor, a device identi- fying datastructure associated with a user's device, in which the device identifying datastructure is struc- tured as a set of datastructure fields specifying device data;

execute, via the at least one processor, a device search on a device graph database, with the device data as a set of search parameters, to determine a device record corresponding to the device in the device graph database;

retrieve, via the at least one processor, a device token specified via the device record from the device graph database;

obtain, via the at least one processor, a user identifying media datastructure, in which the user identifying media datastructure is structured as a media stream;

generate, via the at least one processor, a face print datastructure associated with the user from the media stream, in which the face print datastructure is gen- erated by transforming aspects of the user's facial features with an image transformation function;

generate, via the at least one processor, a voice print datastructure associated with the user from the media stream, in which the voice print datastructure is generated by transforming aspects of the user's voice waveform with an audio transformation function;

obtain, via the at least one processor, a user seed identifying datastructure associated with the device, in which the user seed identifying datastructure is structured to specify a user seed;

determine, via the at least one processor, a user token by analyzing the user seed, in which the user seed analysis includes decrypting the user seed with the device token;

execute, via the at least one processor, a face token search on a user graph database, with the user token as a set of search parameters, to determine a set of face token records linked with a user token record corresponding to the user token;

determine, via the at least one processor, a face match score by matching the generated face print datastruc- ture against a set of stored face print datastructures specified via the set of face token records;

execute, via the at least one processor, a voice token search on the user graph database, with the user token as a set of search parameters, to determine a set of voice token records linked with the user token record corresponding to the user token;

determine, via the at least one processor, a voice match score by matching the generated voice print data- structure against a set of stored voice print datastruc- tures specified via the set of voice token records;

authenticate, via the at least one processor, the user by analyzing the face match score and the voice match score;

generate, via the at least one processor, a login token indicating successful authentication; and provide, via the at least one processor, the login token for the device.

2. The apparatus of claim 1, in which the device data is structured to include any of: a browser fingerprint, an IP address, a manufacturer device ID, a phone number, a GPS location.

3. The apparatus of claim 1, in which the device graph database and the user graph database are implemented via at least one graph database.

4. The apparatus of claim 1, in which the device search is executed using a rules-based machine learning system.

5. The apparatus of claim 1, in which the component collection storage is further structured with processor-ex- ecutable instructions, comprising:

determine, via the at least one processor, a set of device data differences between the device data specified in the device identifying datastructure and device data specified in a device graph identified by the device token;

store, via the at least one processor, a temporary device graph that specifies the determined set of device data differences; and merge, via the at least one processor, the temporary device graph into the device graph identified by the device token upon successfully authenticating the user.

6. The apparatus of claim 1, in which the media stream is structured as at least one of: a video stream, an audio stream, a photographic image file, a voice audio file.

7. The apparatus of claim 1, in which the image transformation function is a 1-way transformation function that precludes reconstruction of a face image from the face print datastructure.

8. The apparatus of claim 1, in which the audio transformation function is a 1-way transformation function that precludes reconstruction of a voice file from the voice print datastructure.

9. The apparatus of claim 1, in which the user seed corresponds to the last user who was successfully authenticated while utilizing the device.

10. The apparatus of claim 1, in which the user seed is formed by appending a face token and a voice token, and encrypting the result with the device token.

11. The apparatus of claim 1, in which the set of stored face print datastructures and the set of stored voice print datastructures are stored in at least one relational database.

12. The apparatus of claim 1, in which the analysis of the face match score and the voice match score includes evaluating the face match score and the voice match score with a set of rules.

13. The apparatus of claim 1, in which the analysis of the face match score and the voice match score includes obtaining additional authentication data from the user, in which the additional authentication data is at least one of: personally identifiable information data, payment method data, secret question answer, actuation of a registration link.

14. The apparatus of claim 1, in which the login token is structured to be valid for a specified duration.

15. The apparatus of claim 1, in which the component collection storage is further structured with processor-executable instructions, comprising:

add, via the at least one processor, a login token record corresponding to the login token to the user graph database; and link, via the at least one processor, the login token record to the user token record corresponding to the user token.

16. The apparatus of claim 1, in which the image transformation function is a one way vectorization function.

17. The apparatus of claim 1, in which the component collection storage is further structured with processor-executable instructions, comprising:

provide, via the at least one processor, a payment token associated with the authenticated user to a checkout apparatus.

18. The apparatus of claim 17, in which the payment token corresponds to at least one of: a default payment method, a spoken payment method.

19. The apparatus of claim 17, in which the checkout apparatus is at least one of: a website, an app, a point of sale terminal, a kiosk, a car.

20. A biometric authentication engine processor-readable, non-transient medium, the medium storing a component collection, the component collection storage structured with processor-executable instructions comprising:

obtain, via the at least one processor, a device identifying datastructure associated with a user's device, in which the device identifying datastructure is structured as a set of datastructure fields specifying device data;

execute, via the at least one processor, a device search on a device graph database, with the device data as a set of search parameters, to determine a device record corresponding to the device in the device graph database;

retrieve, via the at least one processor, a device token specified via the device record from the device graph database;

obtain, via the at least one processor, a user identifying media datastructure, in which the user identifying media datastructure is structured as a media stream;

generate, via the at least one processor, a face print datastructure associated with the user from the media stream, in which the face print datastructure is generated by transforming aspects of the user's facial features with an image transformation function;

generate, via the at least one processor, a voice print datastructure associated with the user from the media stream, in which the voice print datastructure is generated by transforming aspects of the user's voice waveform with an audio transformation function;

obtain, via the at least one processor, a user seed identifying datastructure associated with the device, in which the user seed identifying datastructure is structured to specify a user seed;

determine, via the at least one processor, a user token by analyzing the user seed, in which the user seed analysis includes decrypting the user seed with the device token;

execute, via the at least one processor, a face token search on a user graph database, with the user token as a set of search parameters, to determine a set of face token records linked with a user token record corresponding to the user token;

determine, via the at least one processor, a face match score by matching the generated face print datastructure against a set of stored face print datastructures specified via the set of face token records;

execute, via the at least one processor, a voice token search on the user graph database, with the user token as a set of search parameters, to determine a set of voice token records linked with the user token record corresponding to the user token;

determine, via the at least one processor, a voice match score by matching the generated voice print datastructure against a set of stored voice print datastructures specified via the set of voice token records;

authenticate, via the at least one processor, the user by analyzing the face match score and the voice match score;

generate, via the at least one processor, a login token indicating successful authentication; and provide, via the at least one processor, the login token for the device.

21. A biometric authentication engine processor-implemented system, comprising:

means to store a component collection;

means to process processor-executable instructions from the component collection, the component collection storage structured with processor-executable instructions including:

obtain, via the at least one processor, a device identifying datastructure associated with a user's device, in which the device identifying datastructure is structured as a set of datastructure fields specifying device data;

execute, via the at least one processor, a device search on a device graph database, with the device data as a set of search parameters, to determine a device record corresponding to the device in the device graph database;

retrieve, via the at least one processor, a device token specified via the device record from the device graph database;

obtain, via the at least one processor, a user identifying media datastructure, in which the user identifying media datastructure is structured as a media stream;

generate, via the at least one processor, a face print datastructure associated with the user from the media stream, in which the face print datastructure is generated by transforming aspects of the user's facial features with an image transformation function;

generate, via the at least one processor, a voice print datastructure associated with the user from the media stream, in which the voice print datastructure is generated by transforming aspects of the user's voice waveform with an audio transformation function;

obtain, via the at least one processor, a user seed identifying datastructure associated with the device, in which the user seed identifying datastructure is structured to specify a user seed;

determine, via the at least one processor, a user token by analyzing the user seed, in which the user seed analysis includes decrypting the user seed with the device token;

execute, via the at least one processor, a face token search on a user graph database, with the user token as a set of search parameters, to determine a set of face token records linked with a user token record corresponding to the user token;

determine, via the at least one processor, a face match score by matching the generated face print datastructure against a set of stored face print datastructures specified via the set of face token records;

execute, via the at least one processor, a voice token search on the user graph database, with the user token as a set of search parameters, to determine a set of voice token records linked with the user token record corresponding to the user token;

determine, via the at least one processor, a voice match score by matching the generated voice print datastructure against a set of stored voice print datastructures specified via the set of voice token records;

authenticate, via the at least one processor, the user by analyzing the face match score and the voice match score;

generate, via the at least one processor, a login token indicating successful authentication; and provide, via the at least one processor, the login token for the device.

22. A biometric authentication engine processor-implemented process, including processing processor-executable instructions via at least one processor from a component collection stored in at least one memory, the component collection storage structured with processor-executable instructions comprising:

obtain, via the at least one processor, a device identifying datastructure associated with a user's device, in which the device identifying datastructure is structured as a set of datastructure fields specifying device data;

execute, via the at least one processor, a device search on a device graph database, with the device data as a set of search parameters, to determine a device record corresponding to the device in the device graph database;

retrieve, via the at least one processor, a device token specified via the device record from the device graph database;

obtain, via the at least one processor, a user identifying media datastructure, in which the user identifying media datastructure is structured as a media stream;

generate, via the at least one processor, a face print datastructure associated with the user from the media stream, in which the face print datastructure is generated by transforming aspects of the user's facial features with an image transformation function;

generate, via the at least one processor, a voice print datastructure associated with the user from the media stream, in which the voice print datastructure is generated by transforming aspects of the user's voice waveform with an audio transformation function;

obtain, via the at least one processor, a user seed identifying datastructure associated with the device, in which the user seed identifying datastructure is structured to specify a user seed;

determine, via the at least one processor, a user token by analyzing the user seed, in which the user seed analysis includes decrypting the user seed with the device token;

execute, via the at least one processor, a face token search on a user graph database, with the user token as a set of search parameters, to determine a set of face token records linked with a user token record corresponding to the user token;

determine, via the at least one processor, a face match score by matching the generated face print datastructure against a set of stored face print datastructures specified via the set of face token records;

execute, via the at least one processor, a voice token search on the user graph database, with the user token as a set of search parameters, to determine a set of voice token records linked with the user token record corresponding to the user token;

determine, via the at least one processor, a voice match score by matching the generated voice print datastructure against a set of stored voice print datastructures specified via the set of voice token records;

authenticate, via the at least one processor, the user by analyzing the face match score and the voice match score;

generate, via the at least one processor, a login token indicating successful authentication; and provide, via the at least one processor, the login token for the device.

* * * * *